United States Patent
Peng et al.

(10) Patent No.: US 12,448,394 B2
(45) Date of Patent: Oct. 21, 2025

(54) HETEROCYCLIC PYRAZOLE DERIVATIVES AS TYPE III RECEPTOR TYROSINE KINASE INHIBITORS

(71) Applicant: DEVELOPMENT CENTER FOR BIOTECHNOLOGY, Taipei (TW)

(72) Inventors: Shao-Zheng Peng, Taipei (TW); Chu-Bin Liao, Taipei (TW); Hung-Jyun Huang, Taipei (TW); Yuan-Ting Cho, Taipei (TW); Yi-Mei Chang, Taipei (TW); Yu-Chih Pan, Taipei (TW)

(73) Assignee: DEVELOPMENT CENTER FOR BIOTECHNOLOGY, Taipei (TW)

( * ) Notice: Subject to any disclaimer, the term of this patent is extended or adjusted under 35 U.S.C. 154(b) by 912 days.

(21) Appl. No.: 17/636,116

(22) PCT Filed: Aug. 22, 2020

(86) PCT No.: PCT/US2020/047552
§ 371 (c)(1),
(2) Date: Feb. 17, 2022

(87) PCT Pub. No.: WO2021/041276
PCT Pub. Date: Mar. 4, 2021

(65) Prior Publication Data
US 2022/0289759 A1 Sep. 15, 2022

Related U.S. Application Data

(60) Provisional application No. 62/891,097, filed on Aug. 23, 2019.

(51) Int. Cl.
C07D 495/04 (2006.01)
A61P 35/00 (2006.01)
C07D 519/00 (2006.01)

(52) U.S. Cl.
CPC ............ *C07D 495/04* (2013.01); *A61P 35/00* (2018.01); *C07D 519/00* (2013.01)

(58) Field of Classification Search
CPC ...... C07D 495/04; C07D 519/00; A61P 35/00
See application file for complete search history.

(56) References Cited

U.S. PATENT DOCUMENTS

| | | |
|---|---|---|
| 2008/0161251 A1 | 7/2008 | Curry et al. |
| 2008/0287475 A1 | 11/2008 | Feng et al. |
| 2013/0072457 A1 | 3/2013 | Saxty et al. |
| 2013/0274255 A1 | 10/2013 | Liao et al. |
| 2017/0158690 A1 | 6/2017 | Wu et al. |

FOREIGN PATENT DOCUMENTS

| | | |
|---|---|---|
| CN | 102811619 A | 12/2012 |
| CN | 104428298 A | 3/2015 |
| EP | 2148874 A1 | 2/2010 |
| JP | 2006-502097 A | 1/2006 |
| JP | 2008-528468 A | 7/2008 |
| JP | 2009-513615 A | 4/2009 |
| JP | 2013-528580 A | 7/2013 |
| JP | 2015-511638 A | 4/2015 |
| RU | 2425677 C2 | 8/2011 |
| RU | 2591195 C2 | 7/2016 |
| WO | 2008/045627 A2 | 4/2008 |
| WO | 2013/142382 A1 | 9/2013 |

OTHER PUBLICATIONS

Office Action with Search Report corresponding to counterpart application R.O.C. (Taiwan) application No. 109128678 dated Jul. 9, 2021.
English translation to Search Report dated Jul. 9, 2021.
Office Action issued on Dec. 27, 2023 for corresponding RU Patent Application No. 2022107496.
Examination Report issued on Mar. 25, 2024 for corresponding IN Patent Application No. 202227009128.
K. Kummerer, Pharmaceuticals in the environment, Annual Review of Environment and Resources, 2010, v. 35, p. 57-75.
Dyson G. et al., Chemistry of synthetic drugs, Publ. "World", Moscow, 1964, pp. 12-19.
Belikov V.G., Pharmaceutical chemistry, textbook, 2007, Moscow, "MED press-inform", pp. 27-29.
Extended European Search Report for counterpart EP Patent Application No. 20856905.3 dated Jul. 27, 2023.
Office Action for counterpart CN Patent Application No. 202080059010.6 mailed Aug. 4, 2023.

(Continued)

*Primary Examiner* — Kortney L. Klinkel
*Assistant Examiner* — Faidat Jyoti
(74) *Attorney, Agent, or Firm* — LADAS & PARRY LLP

(57) ABSTRACT

A compound, which can act as inhibitors of protein kinases, especially Class III RTKs such as FLT3, PDGFRα, c-KIT and/or CSF-1R kinases, for the treatments of diseases or disorders mediated by such kinases, has a structure of formula (I):

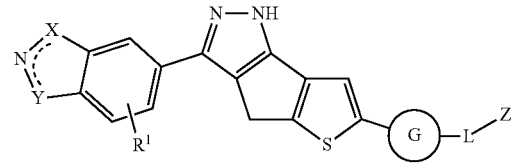

Formula (I)

or a stereoisomer, a tautomer, a pharmaceutically acceptable salt, a binder of a Proteolysis-Targeting Chimera (PROTAC) thereof. The compound can be used in the treatments of diseases or conditions mediated by FLT3, PDGFR, c-KIT, and/or CSF-1R kinases, or mediated by a mutant kinase of FLT3, PDGFR, c-KIT, and/or CSF-1R kinases. Such diseases or conditions may include cancers, autoimmune diseases, and bone resorptive diseases.

14 Claims, No Drawings

(56) References Cited

OTHER PUBLICATIONS

Search Report for counterpart CN Patent Application No. 202080059010.6 dated Jul. 31, 2023 (with English translation attached).
Advances in the research of FLT3 inhibitors for acute myeloid leukemia (with English abstract attached).
ISR for International Application No. PCT/US2020/047552 mailed Jan. 28, 2021.
Written Opinion for International Application No. PCT/US2020/047552 mailed Jan. 28, 2021.
Office Action issued on Jul. 30, 2024 for corresponding Japanese Patent Application No. 2022-511322.
Office Action issued on Sep. 26, 2024 for corresponding Mexican Patent Application No. MX/a/2022/002062.

HETEROCYCLIC PYRAZOLE DERIVATIVES AS TYPE III RECEPTOR TYROSINE KINASE INHIBITORS

RELATED APPLICATION

This application is an application under 35 U.S.C. 371 of International Application No. PCT/US2020/047552 filed on 22 Aug. 2020, which claims priority from U.S. Application Ser. No. 62/891,097 filed 23 Aug. 2019, the disclosures of which are incorporated in their entirety by reference herein.

BACKGROUND OF INVENTION

Field of the Invention

The present invention relates to novel chemical compounds and methods for their uses in therapy and preparation. In particular, the invention relates to certain substituted heterocyclic pyrazole compounds and to their uses in the inhibition, regulation, and/or modulation of type III receptor tyrosine kinases, such as FLT3, PDGFR, c-KIT, and/or CSF-1R, and their related signal transduction pathways.

Background Art

Protein kinases (PKs) play important roles in cellular signal transduction pathways that regulate various cell functions, such as differentiation, proliferation, migration, survival, and apoptosis. These enzymes catalyze the transfer of a phosphate group from ATP to a tyrosine, serine, or threonine residue on a protein substrate. The phosphorylation by kinase and dephosphorylation by phosphatase are involved in countless cellular processes that respond to diverse intracellular or extracellular signals, regulation of cellular functions, and activation or deactivation of cellular operations. Receptor tyrosine kinases (RTKs) are a subfamily of protein kinases, and a class of RTK known as the type III receptor tyrosine kinase family, which includes FLT3, PDGFR, c-KIT and CSF-1R, has been implicated in various proliferative and inflammatory diseases.

Small molecule inhibitors of type III receptor tyrosine kinases provide a rational approach to new therapies for the treatments of autoimmune diseases, and to particularly block the chronic tissue destruction mediated by the innate immune system. Moreover, inhibition of type III receptor tyrosine kinases also provides a rational approach to new therapies for the treatment of cancers, especially for the treatments of cancer invasiveness, cancer angiogenesis or vasculogenesis, cancer metastasis, and cancer immunotolerance.

FLT3 (Fms-like tyrosine kinase 3, also called Flk2) and its ligand (FL) are one of the regulators of normal hematopoiesis, and activating mutation or overexpression of FLT3 is frequently found in AML. More than a dozen known FLT3 inhibitors are being developed, some of which have shown promising clinical effects and got approval for treatments of FLT3 mutant positive AML. The FLT3 receptor is also expressed in a large portion of dendritic cell progenitors and stimulation of the FLT3 receptor causes the proliferation and differentiation of these progenitors into dendritic cells (DC). Because dendritic cells are the main initiators of T-cell mediated immune responses, including autoreactive immune responses, inhibition of FLT3 provides a mechanism for down-regulating DC-mediated inflammatory and autoimmune responses. One study shows the FLT3 inhibitor CEP-701 to be effective in reducing myelin loss in experimental autoimmune encephalomyelitis (EAE), a mouse model for multiple sclerosis. High levels of the FLT3 ligand are found in the sera of patients with Langerhans cell histiocytosis and systemic lupus erythematosus. This observation further implicates FLT3 signaling in the dysregulation of dendritic cell progenitors in those autoimmune diseases.

PDGFR (platelet-derived growth factor receptor) and its ligand (PDGF) regulate cell proliferation, survival, differentiation, and migration of cells primarily of the mesenchymal origin. Abnormalities of the PDGF pathway, including overexpression or amplification of PDGF receptors (PDGFRs), gain of function point mutations, or activating chromosomal translocations, have been observed in a wide array of pathological conditions, such as cancer, fibrosis, neurological conditions, and atherosclerosis, making them potential targets for disease treatments.

c-KIT (also known as stem cell growth factor receptor, SCFR) and its ligand (SCF) induce proliferation, differentiation, or migration of cells within the hematopoietic, gametogenic, and melanogenic lineages at different developmental stages. The presence of c-KIT mutations is a key diagnostic marker for gastrointestinal stromal tumors (GIST). Gleevec (imatinib mesylate or STI571), the first FDA-approved receptor tyrosine kinase (RTK) inhibitor originally approved for c-Abl-mediated chronic myeloid leukemia, gained FDA-approval for c-KIT-mediated GIST in 2002 and has validated the molecular-based approach of c-KIT inhibition for the treatment of GIST. Gain-of-function mutations in c-KIT are also associated with mast cell/myeloid leukemia and seminomas/dysgerminomas. c-KIT mutations have also been identified in certain melanomas and recognized as a potential therapeutic target for melanoma.

CSF-1R (also known as macrophage colony stimulating factor receptor (M-CSFR) or Fms) is a receptor for the macrophage colony stimulating factor (M-CSF or CSF-1). CSF-1/CSF-1R is the primary growth factor regulating the survival, proliferation, and differentiation of cells of the mononuclear phagocytic lineage. Multiple studies have demonstrated that CSF-1/CSF-1R plays a certain role in tumor tissues. Elevated expression or activation of CSF-1R and/or its ligand have been found in a variety of cancers, and elevated levels of M-CSF is associated with poor prognosis in certain cancers. M-CSF is one of several cytokines implicated in the recruitment of tumor-associated macrophages (TAMs) that contribute to tumor angiogenesis and tumor progression to metastasis. Activation of CSF-1R also leads to proliferation and differentiation of osteoclast precursors, thereby mediating the process of bone resorption. Inhibition of CSF-1R therefore provides treatments of cancers, especially cancer invasion, angiogenesis, metastasis, immunotolerance, and bone metastases. Because of its role in osteoclast biology, CSF-1R is also an important therapeutic target for osteoporosis, inflammatory arthritis, and other inflammatory bone erosion.

Although various tyrosine kinase inhibitors are shown to be useful therapeutics, there is still a need for type III kinase inhibitors.

SUMMARY OF INVENTION

The present invention relates to novel inhibitors that inhibit kinases, especially Class III RTKs, such as FLT3, PDGFRα, c-KIT, and/or CSF-1R kinases, for the treatments of diseases or disorders mediated by such kinases. The inhibitors of the present invention also find utility in the treatments of other mammalian diseases, including human diseases mediated by FLT3, PDGFR, c-KIT, or CSF-1R kinase. Such diseases include, without limitation, cancers, autoimmune diseases, and bone resorptive diseases.

Embodiments of the invention are based on unexpected findings that certain heterocyclic pyrazole compounds can inhibit activities of members of type III receptor tyrosine kinase family (e.g., FLT3, PDGFR, c-KIT, and CSF-1R). The compounds are useful in medical treatments, pharmaceutical compositions, and methods for modulating the activities of FLT3, PDGFR, c-KIT, and/or CSF-1R kinases, including wildtype and/or mutated forms of FLT3, PDGFR, c-KIT, and/or CSF-1R kinases. These properties allow these heterocyclic pyrazole compounds to be used in treating protein tyrosine kinase-related diseases and/or conditions.

According to embodiments of this invention, a compound may have the general Formula I.

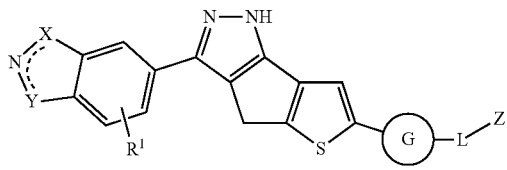

Formula (I)

or a stereoisomer, a tautomer, a pharmaceutically acceptable salt, a binder of a Proteolysis-Targeting Chimera (PROTAC) thereof, wherein X is selected from the group consisting of $CR^2$ and $NR^3$;

Y is selected from the group consisting of $CR^2$ and $NR^3$;

G is selected from the group consisting of optionally substituted aryl, optionally substituted heteroaryl, optionally substituted heterocyclyl, alkynyl and a direct bond;

L is selected from the group consisting of —CH=, —$CHR^4$—, —$(CH_2)_q$—, —$NR^5$—, —O—, —O$(CH_2)_q$—, —C(O)—, —C(O) $(CH_2)_q$—, —C(O)NH—, —$SO_2$—, and a direct bond, wherein each q is individually and independently an integer from 1 to 4;

Z is selected from the group consisting of hydrogen, C1-C4 alkyl, C1-C4 alkylamine, C1-C4 dialkylamine, and optionally substituted heterocyclyl, and heterocyclic spiro compound;

$R^1$ is selected from the group consisting of hydrogen, deuterium, halogen, hydroxyl, amino, cyano, trifluoromethyl, trifluoromethoxy. nitro, C1-C6 alkyl, C1-C6 alkoxy, C1-C6 alkylamino, and C1-C6 dialkylamino;

$R^2$ is selected from the group consisting of hydrogen, deuterium, halogen, C1-C6 alkyl, C2-C6 alkenyl, C2-C6 alkynyl, C3-C6 cycloalkyl, C5-C6 cycloalkenyl, C1-C6 alkylamino, C1-C6 dialkylamino, C3-C6 cycloalkylamino, C1-C6 alkoxy, C3-C6 cycloalkoxy, aryl, a 3-to-6 membered heterocyclyl, and a 5-to-6 membered heteroaryl, wherein the alkylamino, dialkylamino, alkoxy, alkyl, alkenyl, alkynyl, cycloalkyl, cycloalkenyl, cycloalkylamino, cycloalkoxy, heterocyclyl, aryl and heteroaryl are optionally substituted with halogen, amino, hydroxyl, cyano, nitro, acyl, acyloxy, C1-C4 alkyl, hydroxyl C1-C4 alkyl, alkoxy C1-C4 alkyl, acyloxy C1-C4 alkyl, C1-C4 alkoxy, C1-C4 dialkylamino, C3-C6 cycloalkyl, a 3-to-6 membered heterocyclyl, aryl, and a 5-to-6 membered heteroaryl;

$R^3$ is selected from the group consisting of hydrogen, deuterium, C1-C6 alkyl, C1-C6 alkyl carbonyl, C2-C6 alkenyl carbonyl, C1-C6 alkoxy carbonyl, amino carbonyl, C1-C6 alkylamino carbonyl and C1-C6 dialkylamino carbonyl; and $R^4$ is selected from the group consisting of hydrogen, deuterium, and C1-C6 alkyl; and $R^5$ is selected from the group consisting of hydrogen and $C_1$-$C_6$ alkyl.

In another aspect, embodiments of the invention provide pharmaceutical compositions each comprising a compound of Formula I, a stereoisomer, tautomer, solvate, prodrug or a pharmaceutically acceptable salt thereof, and a pharmaceutically acceptable carrier, diluent, or excipient.

In another aspect, embodiments of the invention provide methods for inhibiting type III receptor tyrosine kinases, such as FLT3, PDGFR, c-KIT, and/or CSF-1R kinases in a mammal. A method of the invention comprises: administering to said mammal in need thereof a therapeutically effective amount of a compound of Formula I.

In another aspect of the invention, embodiments of the invention provide a binder of a Proteolysis-Targeting Chimera (PROTAC) for degradation type III receptor tyrosine kinases, such as FLT3, PDGFR, c-KIT, and/or CSF-1R kinases in a mammal via the ubiquitin pathway. Proteolytic targeting chimera (PROTAC) one kind of double-based molecules, it is possible to remove unnecessary proteins induced by intracellular proteolytic selectivity. PROTAC consists of two protein-binding parts, one for E3 ubiquitin ligase and the other for target proteins (a binder described herein). By binding the two proteins, PROTAC brings the target protein to the E3 ligase, resulting in the labeling (i.e. ubiquitination) of the target protein for subsequent degradation by the proteasome. Many molecules are known to bind various E3 ubiquitin ligases, such as nutlin, methylbestatin, VHL ligand, thalidomide, pomalidomide, and lenalidomide, as disclosed in WO 2019/140003 A1, the disclosure of which is incorporated by reference. Any of these E3 ligase binders may be coupled with a compound of the invention. A linker may be used between the two binding moieties to provide spacing and ease of coupling reactions. Some examples of linkers may be found in WO 2019/140003. In addition, Burslem et al. were inspired by the ability of receptor tyrosine kinases to target protein degradation via proteolysis targeting chimeras (PROTACs) at low nanomolar concentrations. They employed a known FLT3 inhibitor quizartinib as recruiting element and installed a von Hippel-Lindau (VHL) ligand via an optimized linker to develop a FLT3 PROTAC. This compound effectively induced FLT3-ITD protein degradation in MOLM-14 cells and MV4-11 cells at low nanomolar concentrations (J. Am. Chem. Soc. 2018; 140: 16428-16432).

In another aspect, embodiments of the invention provide methods for treating a disease or disorder selected from fibrosis, a bone-related disease, cancer, an autoimmune disorder, an inflammatory disease, and a cardiovascular disease in a mammal. A method of the invention comprises: administering to said mammal in need thereof a therapeutically effective amount of a compound of Formula I or a pharmaceutically acceptable salt thereof.

In another aspect, embodiments of the invention provide uses of a compound of Formula I in the manufacture of a medicament for the treatment of a disease or disorder selected from fibrosis, a bone-related disease, cancer, an autoimmune disorder, an inflammatory disease, and a cardiovascular disease in a mammal.

In another aspect, embodiments of the invention provide uses of a compound of Formula I in the treatment of a disease or disorder selected from fibrosis, a bone-related disease, cancer, an autoimmune disorder, an inflammatory disease, and a cardiovascular disease in a mammal.

In another aspect, embodiments of the invention provide intermediates for preparing compounds of Formula I. In one embodiment, certain compounds of Formula I may be used as intermediates for the preparation of other compounds of Formula I.

In another aspect, embodiments of the invention provide processes for preparing, methods of separation, and methods of purification of the compounds described herein.

Other aspects and advantages of the invention will become apparent from the following description and the appended claims.

DETAILED DESCRIPTION

Definition

Reference will now be made in detail to certain embodiments, examples of which are illustrated in the accompanying structures and formulas. While enumerated embodiments will be described, it should be understood that they are not intended to limit the invention to those embodiments. On the contrary, the invention is intended to cover all alternatives, modifications, and equivalents, which may be included within the scope of the present invention as defined by the claims. One skilled in the art would recognize many methods and materials similar or equivalent to those described herein, which could be used in the practice of the present invention. The present invention is in no way limited to the methods and materials described herein. In the event that one or more of the incorporated literatures and similar materials differ from or contradict this application, including but not limited to defined terms, term usage, described techniques, or the like, this application controls.

The term "alkyl" refers to a straight or branched monovalent saturated hydrocarbon containing, unless otherwise stated, 1-20 carbon atoms. The numerical ranges in this description are intended to include any number(s) in the defined range, as if the individual numbers have been separately disclosed. For example, an alkyl group of 1-20 carbons would include C1, C2, . . . C20, as well as C1-C20, C1-C15, C1-C10, C1-C6, C1-C4, etc. Examples of alkyl include, but are not limited to, methyl, ethyl, n-propyl, i-propyl, n-butyl, i-butyl, and t-butyl.

The term "alkenyl" refers to a straight or branched monovalent hydrocarbon containing 2-20 carbon atoms (e.g., C2-C10) and one or more double bonds. Examples of alkenyl include, but are not limited to, ethenyl, propenyl, allyl, and 1,4-butadienyl.

The term "alkynyl" refers to a straight or branched monovalent hydrocarbon containing 2-20 carbon atoms (e.g., C2-C10) and one or more triple bonds. Examples of alkynyl include, but are not limited to, ethynyl, 1-propynyl, 1- and 2-butynyl, and 1-methyl-2-butynyl.

The term "alkoxy" refers to an —O-alkyl radical, wherein the alkyl portion is as defined above. Examples of alkoxy include, but are not limited to, methoxy, ethoxy, n-propoxy, iso-propoxy, n-butoxy, iso-butoxy, sec-butoxy, and tert-butoxy.

The term "acyloxy" refers to an —O—C(O)—R radical in which R can be H, alkyl, alkenyl, alkynyl, cycloalkyl, cycloalkenyl, heterocycloalkyl, heterocycloalkenyl, aryl, or heteroaryl.

The term "amino" refers to $NH_2$. The term "alkylamino" refers to an —N(R)-alkyl radical in which R can be H, alkyl, alkenyl, alkynyl, cycloalkyl, cycloalkenyl, heterocycloalkyl, heterocycloalkenyl, aryl, or heteroaryl.

The term "cycloalkyl" refers to a monovalent saturated hydrocarbon ring system having 3 to 30 carbon atoms (e.g., C3-C6 or C3-C12). Examples of cycloalkyl include, but are not limited to, cyclopropyl, cyclobutyl, cyclopentyl, cyclohexyl, cycloheptyl, cyclooctyl, and adamantanyl.

The term "cycloalkenyl" refers to a monovalent non-aromatic hydrocarbon ring system having 3 to 30 carbons (e.g., C3-C6 or C3-C12) and one or more double bonds. Examples include cyclopentenyl, cyclohexenyl, and cycloheptenyl.

The term "heterocycloalkyl" refers to a monovalent non-aromatic 5-8 membered monocyclic, 8-12 membered bicyclic, or 11-14 membered tricyclic ring system having one or more heteroatoms (such as O, N, S, or Se). Examples of heterocycloalkyl groups include, but are not limited to, piperazinyl, pyrrolidinyl, piperidinyl, dioxanyl, morpholinyl, and tetrahydrofuranyl.

The term "heterocycloalkenyl" refers to a monovalent nonaromatic 5-8 membered monocyclic, 8-12 membered bicyclic, or 11-14 membered tricyclic ring system having one or more heteroatoms (such as O, N, S, or Se) and one or more double bonds.

The term "aryl" refers to a monovalent 6-carbon monocyclic, 10-carbon bicyclic, or 14-carbon tricyclic aromatic ring system. Examples of aryl groups include, but are not limited to, phenyl, naphthyl, and anthracenyl.

The term "aryloxyl" refers to an —O-aryl. The term "arylamino" refers to an —N(R)-aryl, wherein R can be H, alkyl, alkenyl, alkynyl, cycloalkyl, cycloalkenyl, heterocycloalkyl, heterocycloalkenyl, aryl, or heteroaryl. The term "heteroaryl" refers to a monovalent aromatic 5-8 membered monocyclic, 8-12 membered bicyclic, or 11-14 membered tricyclic ring system having one or more heteroatoms (such as O, N, S, or Se). Examples of heteroaryl groups include, but are not limited to, pyridyl, furyl, imidazolyl, benzimidazolyl, pyrimidinyl, thienyl, quinolinyl, indolyl, thiazolyl, pyrrolyl, isoquinolinyl, purinyl, oxazolyl, pyrazolyl, and carbazolyl. In all these terms, "aryl" portion is as defined above.

The term "halogen" refers to F, Cl, Br or I. Preferably, it is F, Cl, or Br.

The above-described alkyl, alkenyl, alkynyl, cycloalkyl, heterocycloalkyl, cycloalkenyl, heterocycloalkenyl, amino, alkylamino, arylamino, alkoxy, aryloxy, aryl, and heteroaryl may be substituted or unsubstituted moieties. Possible substituents on amino, alkylamino, arylamino, alkoxy, aryloxy, cycloalkyl, heterocycloalkyl, cycloalkenyl, heterocycloalkenyl, aryl, and heteroaryl include, but are not limited to, C1-C10 alkyl, C2-C10 alkenyl, C2-C10 alkynyl, C3-C20 cycloalkyl, C3-C20 cycloalkenyl, C1-C20 heterocycloalkyl, C1-C20 heterocycloalkenyl, C1-C10 alkoxy, aryl, aryloxy, heteroaryl, heteroaryloxy, amino, C1-C10 alkylamino, arylamino, hydroxy, halo, oxo (O=), thioxo (S=), thio, C1-C10 alkylthio, arylthio, C1-C10 alkylsulfonyl, arylsulfonyl, acylamino, aminoacyl, aminothioacyl, amidino, mercapto, amido, thioureido, thiocyanato, sulfonamido, guanidine, ureido, cyano, nitro, acyl, thioacyl, acyloxy, carbamido, carbamyl (—C(O)NH$_2$), carboxyl (—COOH), and carboxylic ester. On the other hand, possible substituents on alkyl, alkenyl, or alkynyl include all of the above-recited substituents except C1-C10 alkyl. Cycloalkyl, cycloalkenyl, heterocycloalkyl, heterocycloalkenyl, aryl, and heteroaryl can also be fused with each other.

Provided herein are compounds, and pharmaceutical compositions thereof, that are useful in the treatment or prevention of diseases, conditions and/or disorders modulated/mediated by (or associated with) type III receptor tyrosine kinases, such as FLT3, PDGFR, c-KIT, and/or CSF-1R kinases.

Some embodiments of the invention provide compounds of Formula I.

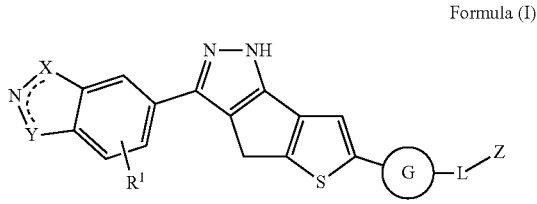

Formula (I)

or a stereoisomer, a tautomer, a pharmaceutically acceptable salt, a binder of a Proteolysis-Targeting Chimera (PROTAC) thereof, wherein X is selected from the group consisting of $CR^2$ and $NR^3$;
Y is selected from the group consisting of $CR^2$ and $NR^3$;
G is selected from the group consisting of optionally substituted aryl, optionally substituted heteroaryl, optionally substituted heterocyclyl, alkynyl and a direct bond;
L is selected from the group consisting of —$CHR^4$—, —$(CH_2)_q$—, —$NR^5$—, —O—, —$O(CH_2)_q$, —C(O)—, —C(O) $(CH_2)_q$—, —C(O)NH—, —$SO_2$—, and a direct bond, wherein each q is individually and independently an integer from 1 to 4;
Z is selected from the group consisting of hydrogen, C1-C4 alkyl, C1-C4 alkylamine, C1-C4 dialkylamine, optionally substituted four-, five- and six-membered cyclic amine, and optionally substituted heterocyclyl, and heterocyclic spiro compound;
$R^1$ is selected from the group consisting of hydrogen, deuterium, halogen, hydroxyl, amino, cyano, trifluoromethyl, trifluoromethoxy. nitro, C1-C6 alkyl, C1-C6 alkoxy, C1-C6 alkylamino and C1-C6 dialkylamino;
$R^2$ is selected from the group consisting of hydrogen, deuterium, halogen, C1-C6 alkyl, C2-C6 alkenyl, C2-C6 alkynyl, C3-C6 cycloalkyl, C5-C6 cycloalkenyl, C1-C6 alkylamino, C1-C6 dialkylamino, C3-C6 cycloalkylamino, C1-C6 alkoxy, C3-C6 cycloalkoxy, aryl, a 3-to-6 membered heterocyclyl, and a 5-to-6 membered heteroaryl, wherein the alkylamino, dialkylamino, alkoxy, alkyl, alkenyl, alkynyl, cycloalkyl, cycloalkenyl, cycloalkylamino, cycloalkoxy, heterocyclyl, aryl and heteroaryl are optionally substituted with halogen, amino, hydroxyl, cyano, nitro, acyl, acyloxy, C1-C4 alkyl, hydroxyl C1-C4 alkyl, alkoxy C1-C4 alkyl, acyloxy C1-C4 alkyl, C1-C4 alkoxy, C1-C4 dialkylamino, C3-C6 cycloalkyl, a 3-to-6 membered heterocyclyl, aryl, and a 5-to-6 membered heteroaryl;
$R^3$ is selected from the group consisting of hydrogen, deuterium, C1-C6 alkyl, C1-C6 alkyl carbonyl, C2-C6 alkenyl carbonyl, C1-C6 alkoxy carbonyl, amino carbonyl, C1-C6 alkylamino carbonyl and C1-C6 dialkylamino carbonyl;
$R^4$ is selected from the group consisting of hydrogen, deuterium, C1-C6 alkyl; and
$R^5$ is selected from the group consisting of hydrogen and $C_1$-$C_6$ alkyl.

One skilled in the art would appreciate that in the above formula (I), all possible combinations or permutations of different substituents are within the scope of the invention. These compounds can be prepared using readily available materials/reagents and known chemical reactions. Based on common knowledge in the art and the teaching in this disclosure, one skilled in the art should be able to prepare and use these compounds without undue experimentation.

The following reaction schemes, Scheme 1 through Scheme 6, provide exemplary procedures that can be used to prepare the compounds of Formula (I). However, one skilled in the art would appreciate that these examples are for illustration only and that modifications or variations are possible without departing from the scope of the invention. A heterocyclic pyrazole compound synthesized in accordance with embodiments of the invention may be purified with any known techniques, such as by flash column chromatography, high performance liquid chromatography, crystallization, or any other suitable methods.

Synthetic Route I

Scheme 1

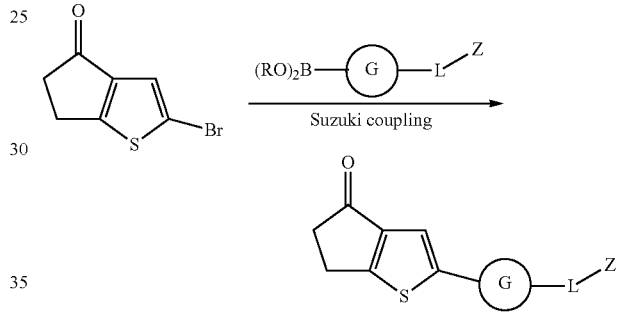

The boronic acid or boronate (1.2 eq.) was added to a solution of 2-Bromo-5,6-dihydro-4H-cyclopenta[b]thiophen-4-one (1.0 eq.) in 1,4-Dioxane/water (5:1). $K_2CO_3$ (2 eq.) and Suzuki coupling Pd(II) or Pd(0) catalyst (5~8 mol %) (ex. Pd(dppf)Cl$_2$, Pd(PPh$_3$)$_4$, or Pd(OAc)$_2$, etc.) were added to the solution. The resulting mixture was then heated under reflux. After reaction was complete, water was added and the solution was extracted with ethyl acetate. The organic layers were dried over MgSO$_4$ and evaporated in vacuum. The final compound was obtained after purification by chromatography.

Scheme 2

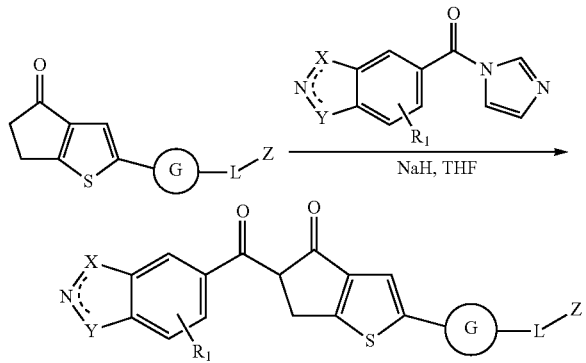

60% Sodium hydride (NaH, 1.3 eq.) was added to a suspension of the imidazole active ester (1.1 eq.) and dihydro-cyclopenta[b]thiophen-4-one derivative (1.0 eq.) in tetrahydrofuran (THF, 0.2 M) under nitrogen atmosphere. The reaction was then heated under reflux for 4 h. After completion of the reaction, the reaction was quenched with acetic acid (HOAc, 1.5 eq.) at 0° C. The resulting yellow precipitate was then filtered and washed with water and cold methanol. The solid was then dried under vacuum to yield the desired 1,3-diketone compound.

Scheme 3

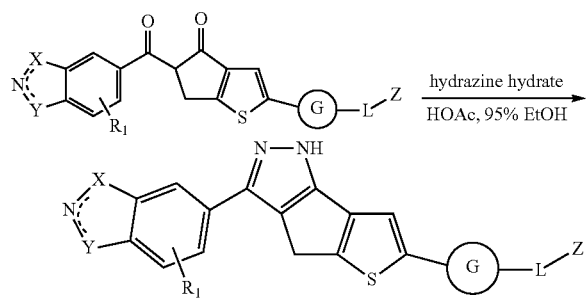

Hydrazine hydrate (3 eq.) was added to a suspension of the diketone (1 eq.) and acetic acid (HOAc, 5 eq.) in ethanol (EtOH, 0.2 M). The reaction was then heated under reflux for 6 h. After reaction was complete, the resulting yellow precipitate was then filtered and washed with water and cold methanol. The solid was then dried under vacuum to yield the desired pyrazole compound.

Synthetic Route II

Scheme 4

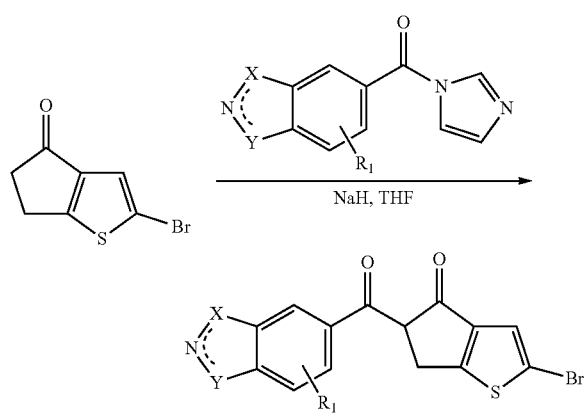

60% Sodium hydride (NaH, 1.3 eq.) was added to a suspension of the imidazole active ester (1.1 eq.) and dihydro-cyclopenta[b]thiophen-4-one derivative (1.0 eq.) in tetrahydrofuran (THF, 0.2 M) under nitrogen atmosphere. The reaction was then heated under reflux for 4 h. After completion of the reaction, the reaction was quenched with acetic acid (AcOH, 1.5 eq.) at 0° C. The resulting precipitate was then filtered and washed with water and cold methanol. The solid was then dried under vacuum to yield the desired 1,3-diketone compound.

Scheme 5

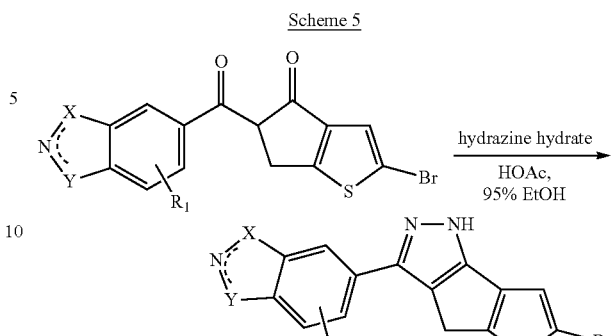

Hydrazine hydrate (3 eq.) was added to a suspension of the diketone (1 eq.) and acetic acid (HOAc, 5 eq.) in ethanol (EtOH, 0.2 M). The reaction was then heated under reflux for 6 h. After reaction was complete, the resulting precipitate was then filtered and washed with water and cold methanol. The solid was then dried under vacuum to yield the desired pyrazole compound.

Scheme 6

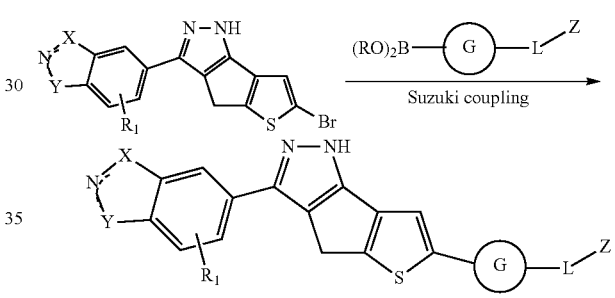

The boronic acid or boronate (1.2 eq.) was added to a solution of pyrazol derivative (1.0 eq.) in 1,4-Dioxane/water (5:1). Potassium carbonate ($K_2CO_3$, 2 eq.) and regular Suzuki coupling Pd(II) or Pd(0) catalyst (5~8 mol %) (ex. Pd(dppf)$Cl_2$, Pd(PPh$_3$)$_4$, or Pd(OAc)$_2$, etc.) were added to the solution. The resulting mixture was then heated under reflux. After reaction was completely, water was added and the solution was extracted with ethyl acetate. The organic layers were dried over MgSO$_4$ and evaporated in vacuum. The final compound was obtained after purification by chromatography.

The above reaction schemes illustrate how heterocyclic pyrazole compounds of the invention may be prepared. One skilled in the art would appreciate that the reactions involved and the reagents used in these reactions are known in the art. Therefore, based on the above teachings and the common knowledge in the art, heterocyclic pyrazole compounds with various substituents, as defined herein, can be prepared by one skilled in the art without inventive efforts.

The compounds of Formula I represent novel potent inhibitors of type III receptor tyrosine kinases, such as FLT3, PDGFR, c-KIT, and/or CSF-1R kinases and may be useful in the prevention and treatment of disorders resulting from actions of these kinases.

Compounds of Formula I may be of therapeutic values in the treatments of diseases or disorders selected from fibrosis, bone-related diseases, cancer, autoimmune disorders, inflammatory diseases, and cardiovascular diseases.

In accordance with some embodiments of the invention, the compounds of Formula I are useful for the treatments of fibrotic diseases. Examples of fibrosis include idiopathic pulmonary fibrosis (IPF), nephrogenic genic systemic fibrosis (NSF), cirrhosis of the liver, diabetic-induced nephropathy, cardiac fibrosis (for example, endomyocardial fibrosis), mediastinal fibrosis, myelofibrosis, retroperitoneal fibrosis, Crohn's disease, keloid formation, scleroderma, and systemic sclerosis. Additional examples of fibrotic diseases include focal segmental glomerular sclerosis (FSGS), interstitial lung disease in systemic sclerosis (SSc-ILD), primary biliary cirrhosis, ethanol cirrhosis, interstitial fibrosis and tubular atrophy (CAD), proliferative vitreoretinopathy, and scarring (hypertrophic and keloid).

In accordance with some embodiments of the invention, the compounds of Formula I are useful for the treatments of bone-related diseases, including metastatic bone disease, treatment-induced bone loss, osteoporosis, rheumatoid arthritis, ankylosing spondylitis, Paget's disease, and periodontal disease. The osteoporosis may be attributed to (1) menopause in women, (2) aging in men or women, (3) suboptimal bone growth during childhood and adolescence that resulted in failure to reach peak bone mass, and/or (4) bone loss secondary to other disease conditions, eating disorders, medications and/or medical treatments (for example, as a result of treatment with glucocorticoids, aromatase inhibition therapy, or anti-androgen therapy).

Other osteolytic diseases that can be treated according to embodiments of the present invention are more localized. A particular example is metastatic tumor-induced osteolysis. In this condition, bone cancers or bone metastases induce localized osteolysis that causes pain, bone weakness and fractures. Such localized osteolysis also permits tumors to grow larger by creating more space for them in the bone and releasing growth factors from the bone matrix. Cancers presently known to cause tumor-induced osteolysis include hematological malignancies (e.g., myeloma and lymphoma) and solid tumors (e.g., breast, prostate, lung, renal and thyroid), all of which the present invention contemplates treating.

In accordance with some embodiments of the invention, the compounds of Formula I are useful for the treatments of cancers and proliferative disorders. Examples include multiple myeloma, acute myeloid leukemia (AML), chronic myeloid leukemia (CML), prostate cancer, breast cancer, ovarian cancer, melanoma, glioblastoma multiforme, giant cell tumor of bone (also known as osteoclastome), giant cell tumor of the tendon sheath (also known as tenosynovial giant cell tumor or TGCT), metastasis of tumors to other tissues, other chronic myeloproliferative diseases, such as myelofibrosis, and pigmented villonodular synovitis (PVNS).

In accordance with some embodiments of the invention, the compounds of Formula I are useful for the treatments of autoimmune disorders and inflammatory diseases, including, but are not limited to, rheumatoid arthritis, osteoarthritis, psoriatic arthritis, ankylosing spondylitis, Adult Still's, glomerulonephritis, osteoporosis, Sjogren's syndrome, inflammatory bowel disease, ulcerative colitis, Crohn's disease, Langerhans cell histiocytosis, hemophagocytic syndrome, multicentric reticulohistiocytosis, and Paget's disease. Additional examples of autoimmune diseases and disorders include primary sclerosing cholangitis and transplant rejection (including hepatic, renal and heart/lung transplants).

In accordance with some embodiments of the invention, the compounds of Formula I are useful for the treatments of cardiovascular diseases. Examples of cardiovascular diseases include atherosclerosis, peripheral vascular disease, coronary artery disease, ischemia/reperfusion, hypertension, restenosis, pulmonary arterial hypertension, and arterial inflammation. Additional examples of cardiovascular diseases include acute respiratory distress syndrome (ARDS), arteriovenous (AV) fistula patency, and veno-occlusive disease (post-HSC/BMT).

The heterocyclic pyrazole compounds described herein may contain a non-aromatic double bond and one or more asymmetric centers, e.g., in the substituents attached to the core aromatic rings. Therefore, these compounds may occur as racemates and racemic mixtures, single enantiomers, individual diastereomers, diastereomeric mixtures, and cis- or trans-isomeric forms. All such isomeric forms are within the scope of the invention. The heterocyclic pyrazole compounds of the invention may have acidic or basic functional groups (e.g., on the substitution groups) that may form salts, particularly pharmaceutically acceptable salts. Formation of such salts is a routine practice in the pharmaceutical industry. Examples of salts that may be used with heterocyclic pyrazole compounds of the invention, for example, include chloride, sulfate, mesylaye, besylate, tosylate, formate, acetate, malate, succinate, etc. for the basic functional groups. Such heterocyclic pyrazole salts are within the scope of the invention. Similarly, the acidic or basic groups may be functionalized, for example into esters. Such functionalized derivatives will be hydrolyzed in vivo. Therefore, such derivatives may function as pro-drugs of the heterocyclic pyrazole compounds of the invention. Formation of pro-drugs involves only routine skills and one skilled in the art would know how to prepare and use such pro-drugs without undue experimentation.

Also within the scope of this invention are (1) a pharmaceutical composition that contains an effective amount of at least one of the heterocyclic pyrazole compounds of the invention and a pharmaceutically acceptable carrier, (2) a method for treating a protein kinase-related disease (e.g., cancer) by administering to a subject in need of such treatment an effective amount of such a heterocyclic pyrazole compound, and (3) a method of decreasing the activity of at least one protein kinase by contacting the at least one protein kinase with at least one of the heterocyclic pyrazole compounds of this invention.

As used herein, the term a "protein kinase-related disease/disorder," or "protein kinase-associated disease/disorder," or "disease/disorder modulated by a protein kinase" refers to a disease or condition that is characterized by an abnormal protein kinase (PK) activity or a disease or condition that can be treated with changes in the activity of at least one PK. Abnormal PK activity can arise from elevated PK expression level or presence of PK expression that does not happen in normal conditions. PK-related disease/disorder described herein include, but are not limited to, cancer, diabetes, a hyper-proliferation disorder, hyperproliferative disorders of the kidney, renal disease, von Hippel-Lindau disease, restenosis, fibrosis, psoriasis, osteoarthritis, rheumatoid arthritis, an inflammatory disorder, immunological disorders such as autoimmune diseases (e.g., AIDS, lupus, etc.), cardiovascular disorders (e.g. atherosclerosis), and blood vessel proliferative disorders such as abnormal vasculogenesis.

The term "treating" refers to administering a heterocyclic pyrazole compound of the invention to a subject that has a protein kinase-related disease/disorder, or has a symptom of or a predisposition toward it, with the purpose to cure, heal, alleviate, relieve, alter, remedy, ameliorate, improve, affect or reduce the risk of the disorder, the symptoms of or the predisposition toward the disorder. For example, treating cancer refers to the treatment results in inhibition of cancer growth or cancer cell growth, regression in cancer growth (i.e. it reduces the size of a detectable cancer), or the disappearance of a cancer.

The term "an effective amount" refers to the amount of the active agent that is required to confer the intended therapeutic effect in the subject. Effective amounts may vary, as recognized by those skilled in the art, depending on routes of administration, excipient usages, and the possibility of co-usage with other agents. Determination of an effective amount requires only routine skills, and one skilled in the art would be able to determine such effective amounts for the intended use without undue experimentation. The subject in need of the treatment can be a mammal. The term "mammal" refers to human or nonhuman mammal, for example, dogs, cats, pigs, cows, sheep, goats, horses, rats, or mice.

To practice a method of this invention, any of the above-described pharmaceutical compositions can be administered orally, parenterally, by inhalation spray, topically, rectally, nasally, buccally, vaginally or via an implanted reservoir. The term "parenteral" as used herein includes subcutaneous, intracutaneous, intravenous, intramuscular, intraarticular, intraarterial, intrasynovial, intrasternal, intrathecal, intralesional, and intracranial injection or infusion techniques. In accordance with some embodiments of the invention, a heterocyclic pyrazole compound of this invention may be administered intravenously, suitable carriers may include, but are not limited to, physiological saline or phosphate buffered saline (PBS), and solutions containing thickening and solubilizing agents, such as glucose, polyethylene glycol, and polypropylene glycol and mixtures thereof.

A sterile injectable composition, e.g., a sterile injectable aqueous or oleaginous suspension, can be formulated according to techniques known in the art using suitable dispersing or wetting agents (such as TWEEN 80) and suspending agents. The sterile injectable preparation can also be a sterile injectable solution or suspension in a non-toxic parenterally acceptable diluent or solvent, for example, as a solution in 1,3-butanediol. Among the acceptable vehicles and solvents that can be employed are mannitol, water, Ringer's solution and isotonic sodium chloride solution. In addition, sterile, fixed oils are conventionally employed as a solvent or suspending medium (e.g., synthetic mono- or diglycerides). Fatty acids, such as oleic acid and its glyceride derivatives are useful in the preparation of injectable, as are natural pharmaceutically acceptable oils, such as olive oil or castor oil, especially in their polyoxyethylated versions. These oil solutions or suspensions can also contain a long-chain alcohol diluent or dispersant, or carboxymethyl cellulose or similar dispersing agents. Other commonly used surfactants such as Tweens or Spans or other similar emulsifying agents or bioavailability enhancers which are commonly used in the manufacture of pharmaceutically acceptable solid, liquid, or other dosage forms can also be used for the purposes of formulation.

A composition for oral administration can be any orally acceptable dosage form including, but not limited to, capsules, tablets, emulsions and aqueous suspensions, dispersions and solutions. In the case of tablets for oral use, carriers that are commonly used include lactose and corn starch. Lubricating agents, such as magnesium stearate, are also typically added. For oral administration in a capsule form, useful diluents include lactose and dried corn starch. When aqueous suspensions or emulsions are administered orally, the active ingredient can be suspended or dissolved in an oily phase combined with emulsifying or suspending agents. If desired, certain sweetening, flavoring, or coloring agents can be added. A nasal aerosol or inhalation composition can be prepared according to techniques well known in the art of pharmaceutical formulation. A heterocyclic pyrazole compound-containing composition can also be administered in the form of suppositories for rectal administration.

A carrier in the pharmaceutical composition should be "acceptable" in the sense of being compatible with the active ingredient of the formulation (and preferably, capable of stabilizing it) and not deleterious to the subject to be treated. One or more solubilizing agents (e.g., cyclodextrin) which form more soluble complexes with the active heterocyclic pyrazole compounds can be utilized as pharmaceutical carriers for delivery of the active compounds. Examples of other carriers include colloidal silicon dioxide, magnesium stearate and sodium lauryl sulfate.

The above reaction schemes illustrate how heterocyclic pyrazole compounds of the invention may be prepared. One skilled in the art would appreciate that the reactions involved and the reagents used in these reactions are known in the art. Therefore, based on the above teachings and the common knowledge in the art, heterocyclic pyrazole compounds with various substituents, as defined herein, can be prepared by one skilled in the art without inventive efforts.

Without further elaboration, it is believed that the above description has adequately enabled the present invention. The following examples are, therefore, to be construed as merely illustrative, and not limitative of the remainder of the disclosure in any way whatsoever.

Example 1: Synthesis of the Compounds of Formula (I)

Exemplary heterocyclic pyrazole compounds are listed in Table 1. Their $^1$H NMR and Mass data are provided in Table 2.

TABLE 1

Heterocyclic pyrazole compounds

Example

| Example | Structure | Name |
|---|---|---|
| A | 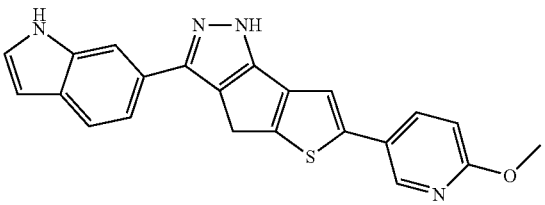 | 3-(1H-indol-6-yl)-6-(6-methoxypyridin-3-yl)-1,4-dihydrothieno[2',3':4,5]cyclopenta[1,2-c]pyrazole |

TABLE 1-continued

Heterocyclic pyrazole compounds

| | | |
|---|---|---|
| B | 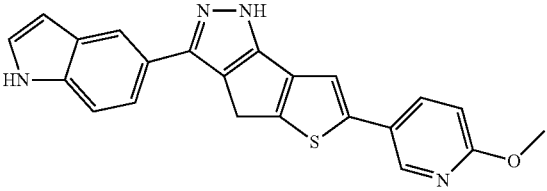 | 3-(1H-indol-5-yl)-6-(6-methoxypyridin-3-yl)-1,4-dihydrothieno[2',3':4,5]cyclopenta[1,2-c]pyrazole |
| C | 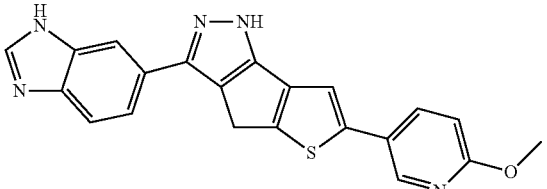 | 3-(1H-benzo[d]imidazol-6-yl)-6-(6-methoxypyridin-3-yl)-1,4-dihydrothieno[2',3':4,5]cyclopenta[1,2-c]pyrazole |
| D | 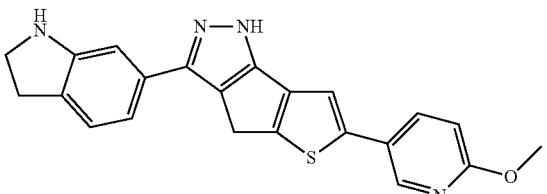 | 3-(indolin-6-yl)-6-(6-methoxypyridin-3-yl)-1,4-dihydrothieno[2',3':4,5]cyclopenta[1,2-c]pyrazole |
| E | 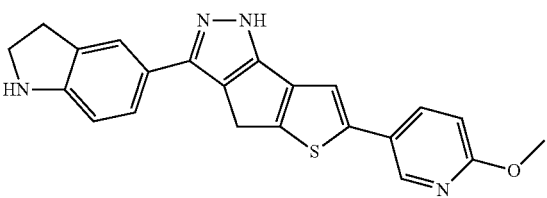 [SMILES: COc1ccc(-c2cc3c(s2)Cc2c(-c4ccc5c(c4)CCN5)n[nH]c2-3)cn1] | 3-(indolin-5-yl)-6-(6-methoxypyridin-3-yl)-1,4-dihydrothieno[2',3':4,5]cyclopenta[1,2-c]pyrazole |
| F |  | 3-(benzofuran-6-yl)-6-(6-methoxypyridin-3-yl)-1,4-dihydrothieno[2',3':4,5]cyclopenta[1,2-c]pyrazole |
| G | 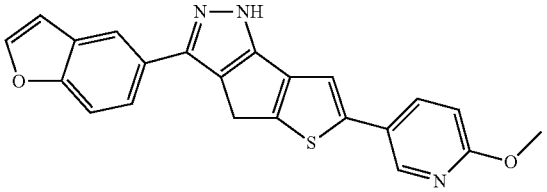 [SMILES: COc1ccc(-c2cc3c(s2)Cc2c(-c4ccc5occc5c4)n[nH]c2-3)cn1] | 3-(benzofuran-5-yl)-6-(6-methoxypyridin-3-yl)-1,4-dihydrothieno[2',3':4,5]cyclopenta[1,2-c]pyrazole |
| H | 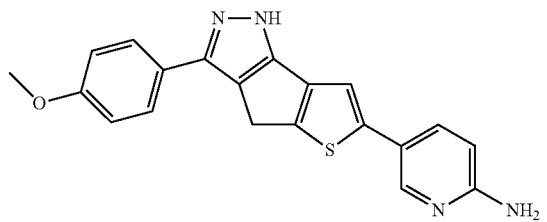 [SMILES: COc1ccc(-c2n[nH]c3c2Cc2sc(-c4ccc(N)nc4)cc2-3)cc1] | 5-(3-(4-methoxyphenyl)-1,4-dihydrothieno[2',3':4,5]cyclopenta[1,2-c]pyrazol-6-yl)pyridin-2-amine |

TABLE 1-continued

Heterocyclic pyrazole compounds

| | | |
|---|---|---|
| I | 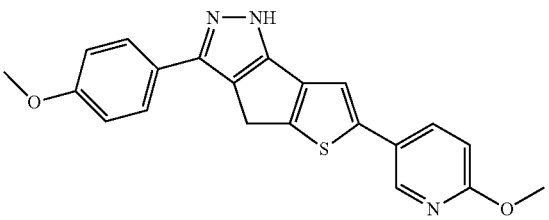 | 3-(4-methoxyphenyl)-6-(6-methoxypyridin-3-yl)-1,4-dihydrothieno[2',3':4,5]cyclopenta[1,2-c]pyrazole |
| J | 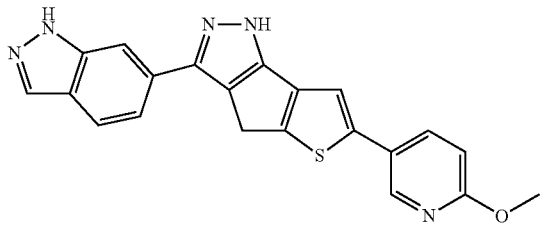 [SMILES: COc1ccc(-c2cc3c(s2)Cc2c(-c4ccc5cn[nH]c5c4)n[nH]c2-3)cn1] | N-(1H-indazol-5-yl)-6-(6-methoxypyridin-3-yl)-1,4-dihydrothieno[2',3':4,5]cyclopenta[1,2-c]pyrazol-3-amine |
| K | 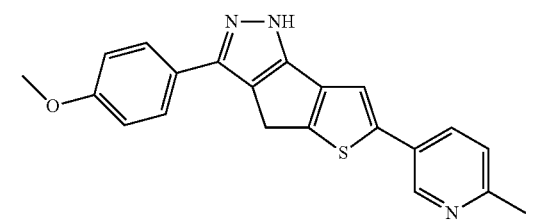 | 3-(4-methoxyphenyl)-6-(6-methylpyridin-3-yl)-1,4-dihydrothieno[2',3':4,5]cyclopenta[1,2-c]pyrazole |

Working Example

| Compound No. | Structure | Name |
|---|---|---|
| 1 | 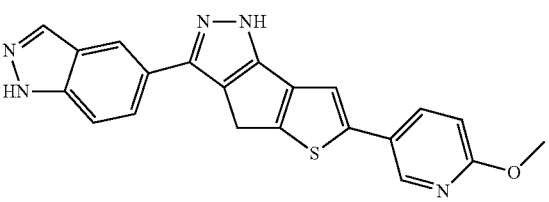 [SMILES: COc1ccc(-c2cc3c(s2)Cc2c(-c4ccc5[nH]ncc5c4)n[nH]c2-3)cn1] | 3-(1H-indazol-5-yl)-6-(6-methoxypyridin-3-yl)-1,4-dihydrothieno[2',3':4,5]cyclopenta[1,2-c]pyrazole |
| 2 | 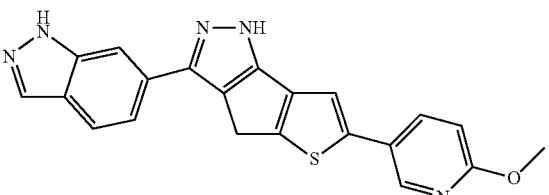 | 3-(1H-indazol-6-yl)-6-(6-methoxypyridin-3-yl)-1,4-dihydrothieno[2',3':4,5]cyclopenta[1,2-c]pyrazole |
| 3 | 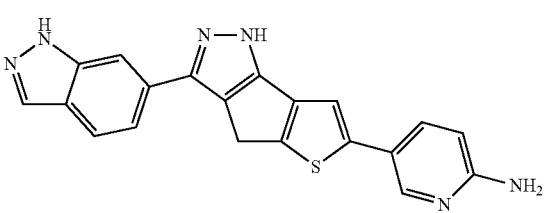 [SMILES: Nc1ccc(-c2cc3c(s2)Cc2c(-c4ccc5cn[nH]c5c4)n[nH]c2-3)cn1] | 5-(3-(1H-indazol-6-yl)-1,4-dihydrothieno[2',3':4,5]cyclopenta[1,2-c]pyrazol-6-yl)pyridin-2-amine |

TABLE 1-continued

Heterocyclic pyrazole compounds

| | | |
|---|---|---|
| 4 | | 6-(6-methoxypyridin-3-yl)-3-(1-methyl-1H-indazol-6-yl)-1,4-dihydrothieno[2',3':4,5]cyclopenta[1,2-c]pyrazole |
| 5 | | N,N-dimethyl-5-(3-(1-methyl-1H-indazol-6-yl)-1,4-dihydrothieno[2',3':4,5]cyclopenta[1,2-c]pyrazol-6-yl)pyridin-2-amine |
| 6 | | 4-(4-(3-(1H-indazol-6-yl)-1,4-dihydrothieno[2',3':4,5]cyclopenta[1,2-c]pyrazol-6-yl)benzyl)morpholine |
| 7 | | (2S,6R)-4-(4-(3-(1H-indazol-6-yl)-1,4-dihydrothieno[2',3':4,5]cyclopenta[1,2-c]pyrazol-6-yl)benzyl)-2,6-dimethylmorpholine |
| 8 | | 4-(4-(3-(1-methyl-1H-indazol-6-yl)-1,4-dihydrothieno[2',3':4,5]cyclopenta[1,2-c]pyrazol-6-yl)benzyl)morpholine |
| 9 | | (2S,6R)-2,6-dimethyl-4-((5-(3-(1-methyl-1H-indazol-6-yl)-1,4-dihydrothieno[2',3':4,5]cyclopenta[1,2-c]pyrazol-6-yl)pyridin-2-yl)methyl)morpholine |
| 10 | | 4-((5-(3-(1-methyl-1H-indazol-6-yl)-1,4-dihydrothieno[2',3':4,5]cyclopenta[1,2-c]pyrazol-6-yl)pyridin-2-yl)methyl)morpholine |

TABLE 1-continued

Heterocyclic pyrazole compounds

| 11 | 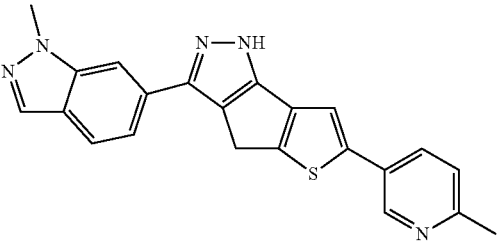 [SMILES: Cc1ccc(-c2cc3c(s2)Cc2c(-c4ccc5cnn(C)c5c4)n[nH]c2-3)cn1] | 3-(1-methyl-1H-indazol-6-yl)-6-(6-methylpyridin-3-yl)-1,4-dihydrothieno[2',3':4,5]cyclopenta[1,2-c]pyrazole |
| --- | --- | --- |
| 12 | 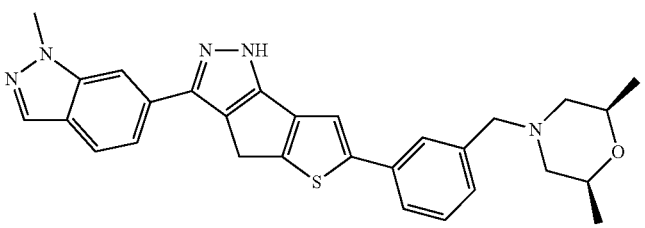 [SMILES: C[C@@H]1CN(Cc2cccc(-c3cc4c(s3)Cc3c(-c5ccc6cnn(C)c6c5)n[nH]c3-4)c2)C[C@H](C)O1] | (2S,6R)-2,6-dimethyl-4-(3-(3-(1-methyl-1H-indazol-6-yl)-1,4-dihydrothieno[2',3':4,5]cyclopenta[1,2-c]pyrazol-6-yl)benzyl)morpholine |
| 13 | 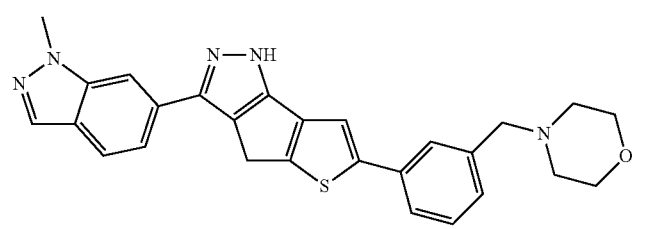 [SMILES: Cn1ncc2ccc(-c3n[nH]c4c3Cc3sc(-c5cccc(CN6CCOCC6)c5)cc3-4)cc21] | 4-(3-(3-(1-methyl-1H-indazol-6-yl)-1,4-dihydrothieno[2',3':4,5]cyclopenta[1,2-c]pyrazol-6-yl)benzyl)morpholine |
| 14 | 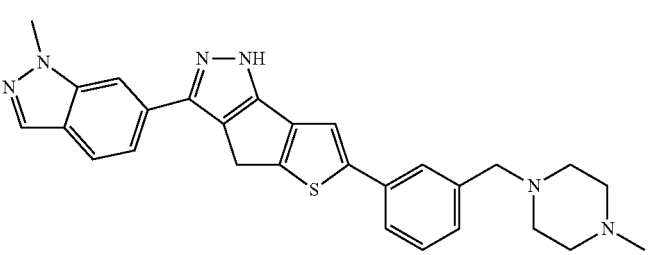 [SMILES: CN1CCN(Cc2cccc(-c3cc4c(s3)Cc3c(-c5ccc6cnn(C)c6c5)n[nH]c3-4)c2)CC1] | 3-(1-methyl-1H-indazol-6-yl)-6-(3-((4-methylpiperazin-1-yl)methyl)phenyl)-1,4-dihydrothieno[2',3':4,5]cyclopenta[1,2-c]pyrazole |
| 15 | 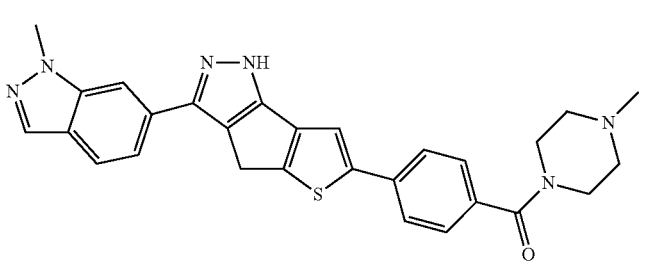 [SMILES: CN1CCN(C(=O)c2ccc(-c3cc4c(s3)Cc3c(-c5ccc6cnn(C)c6c5)n[nH]c3-4)cc2)CC1] | (4-(3-(1-methyl-1H-indazol-6-yl)-1,4-dihydrothieno[2',3':4,5]cyclopenta[1,2-c]pyrazol-6-yl)phenyl)(4-methylpiperazin-1-yl)methanone |
| 16 | 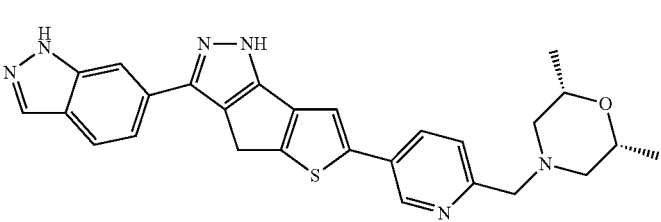 [SMILES: C[C@@H]1CN(Cc2ccc(-c3cc4c(s3)Cc3c(-c5ccc6cn[nH]c6c5)n[nH]c3-4)cn2)C[C@H](C)O1] | (2R,6S)-4-((5-(3-(1H-indazol-6-yl)-1,4-dihydrothieno[2',3':4,5]cyclopenta[1,2-c]pyrazol-6-yl)pyridin-2-yl)methyl)-2,6-dimethylmorpholine |

TABLE 1-continued

Heterocyclic pyrazole compounds

| 17 | 3-(1-methyl-1H-indazol-6-yl)-6-(2-methylpyridin-4-yl)-1,4-dihydrothieno[2',3':4,5]cyclopenta[1,2-c]pyrazole |
| 18 | 4-((5-(3-(1H-indazol-6-yl)-1,4-dihydrothieno[2',3':4,5]cyclopenta[1,2-c]pyrazol-6-yl)pyridin-2-yl)methyl)morpholine |
| 19 | ((2S,6R)-2,6-dimethylmorpholino)(4-(3-(1-methyl-1H-indazol-6-yl)-1,4-dihydrothieno[2',3':4,5]cyclopenta[1,2-c]pyrazol-6-yl)phenyl)methanone |
| 20 | 4-(1-(4-(3-(1-methyl-1H-indazol-6-yl)-1,4-dihydrothieno[2',3':4,5]cyclopenta[1,2-c]pyrazol-6-yl)phenyl)ethyl)morpholine |
| 21 | (4-(3-(1-methyl-1H-indazol-6-yl)-1,4-dihydrothieno[2',3':4,5]cyclopenta[1,2-c]pyrazol-6-yl)phenyl)(morpholino)methanone |
| 22 | 4-(4-(3-(1-methyl-1H-indazol-6-yl)-1,4-dihydrothieno[2',3':4,5]cyclopenta[1,2-c]pyrazol-6-yl)phenethyl)morpholine |

TABLE 1-continued

Heterocyclic pyrazole compounds

| 23 | 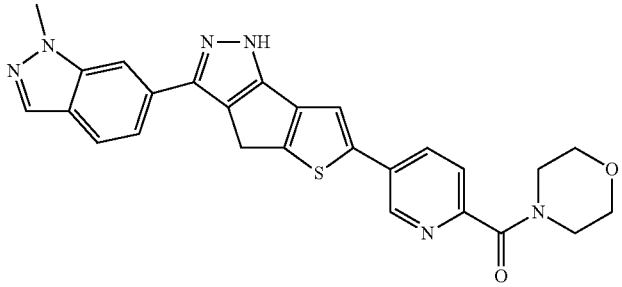 [SMILES: Cn1ncc2ccc(-c3n[nH]c4c3Cc3sc(-c5ccc(C(=O)N6CCOCC6)nc5)cc3-4)cc21] | (5-(3-(1-methyl-1H-indazol-6-yl)-1,4-dihydrothieno[2',3':4,5]cyclopenta[1,2-c]pyrazol-6-yl)pyridin-2-yl)(morpholino)methanone |
| --- | --- | --- |
| 24 | 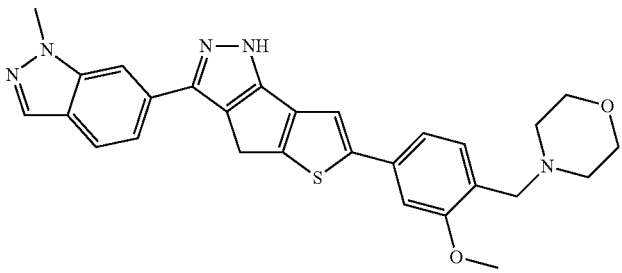 [SMILES: COc1cc(-c2cc3c(s2)Cc2c(-c4ccc5cnn(C)c5c4)n[nH]c2-3)ccc1CN1CCOCC1] | 4-(2-methoxy-4-(3-(1-methyl-1H-indazol-6-yl)-1,4-dihydrothieno[2',3':4,5]cyclopenta[1,2-c]pyrazol-6-yl)benzyl)morpholine |
| 25 | 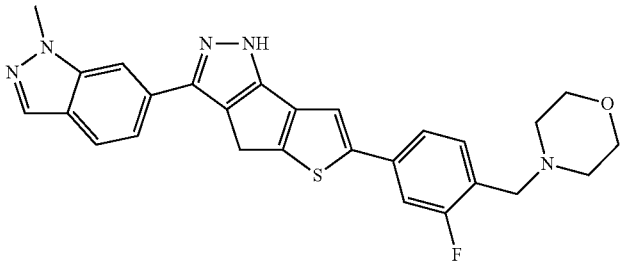 [SMILES: Cn1ncc2ccc(-c3n[nH]c4c3Cc3sc(-c5ccc(CN6CCOCC6)c(F)c5)cc3-4)cc21] | 4-(2-fluoro-4-(3-(1-methyl-1H-indazol-6-yl)-1,4-dihydrothieno[2',3':4,5]cyclopenta[1,2-c]pyrazol-6-yl)benzyl)morpholine |
| 26 | 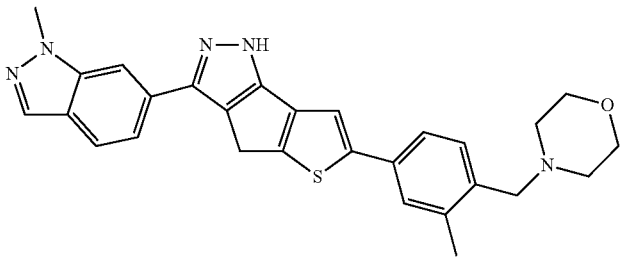 [SMILES: Cc1cc(-c2cc3c(s2)Cc2c(-c4ccc5cnn(C)c5c4)n[nH]c2-3)ccc1CN1CCOCC1] | 4-(2-methyl-4-(3-(1-methyl-1H-indazol-6-yl)-1,4-dihydrothieno[2',3':4,5]cyclopenta[1,2-c]pyrazol-6-yl)benzyl)morpholine |
| 27 | 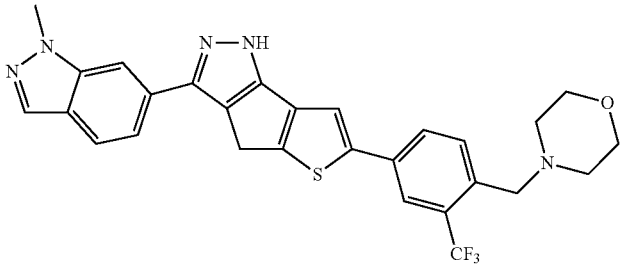 [SMILES: Cn1ncc2ccc(-c3n[nH]c4c3Cc3sc(-c5ccc(CN6CCOCC6)c(C(F)(F)F)c5)cc3-4)cc21] | 4-(4-(3-(1-methyl-1H-indazol-6-yl)-1,4-dihydrothieno[2',3':4,5]cyclopenta[1,2-c]pyrazol-6-yl)-2-(trifluoromethyl)benzyl)morpholine |

TABLE 1-continued

Heterocyclic pyrazole compounds

| 28 | | 4-(1-(4-(3-(1-methyl-1H-indazol-6-yl)-1,4-dihydro-thieno[2',3':4,5]cyclopenta[1,2-c]pyrazol-6-yl)phenyl)propyl)morpholine |
| 29 | | 4-(3-methoxy-4-(3-(1-methyl-1H-indazol-6-yl)-1,4-dihydrothieno[2',3':4,5]cyclopenta[1,2-c]pyrazol-6-yl)benzyl)morpholine |
| 30 | | 3-(1H-indazol-6-yl)-6-(6-methylpyridin-3-yl)-1,4-dihydrothieno[2',3':4,5]cyclopenta[1,2-c]pyrazole |
| 31 | | (5-(3-(1-methyl-1H-indazol-6-yl)-1,4-dihydrothieno[2',3':4,5]cyclopenta[1,2-c]pyrazol-6-yl)pyridin-3-yl)(morpholino)methanone |
| 32 | | 4-(3-fluoro-4-(3-(1-methyl-1H-indazol-6-yl)-1,4-dihydrothieno[2',3':4,5]cyclopenta[1,2-c]pyrazol-6-yl)benzyl)morpholine |
| 33 | | 3-(1-methyl-1H-indazol-6-yl)-6-(6-methylpyridin-3-yl)-1,4-dihydrothieno[2',3':4,5]cyclopenta[1,2-c]pyrazole |

TABLE 1-continued

Heterocyclic pyrazole compounds

| 34 | 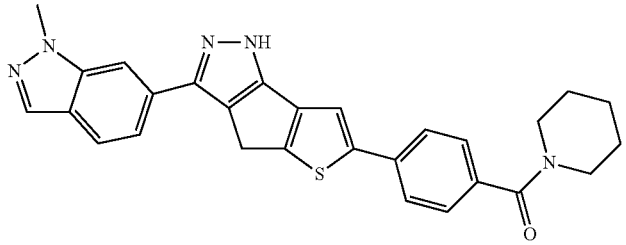 [SMILES: Cn1ncc2ccc(-c3n[nH]c4c3Cc3sc(-c5ccc(C(=O)N6CCCCC6)cc5)cc3-4)cc21] | (4-(3-(1-methyl-1H-indazol-6-yl)-1,4-dihydro-thieno[2',3':4,5]cyclopenta[1,2-c]pyrazol-6-yl)phenyl)(piperidin-1-yl)methanone |
| 35 | 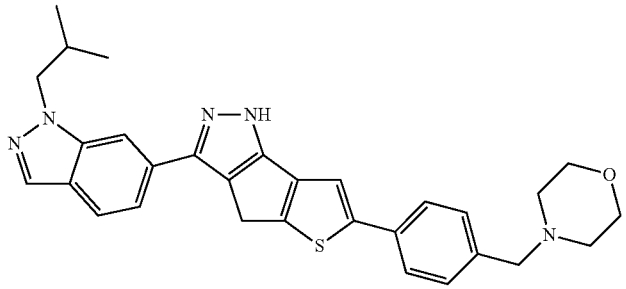 [SMILES: CC(C)Cn1ncc2ccc(-c3n[nH]c4c3Cc3sc(-c5ccc(CN6CCOCC6)cc5)cc3-4)cc21] | 4-(4-(3-(1-isobutyl-1H-indazol-6-yl)-1,4-dihydro-thieno[2',3':4,5]cyclopenta[1,2-c]pyrazol-6-yl)benzyl)morpholine |
| 36 | 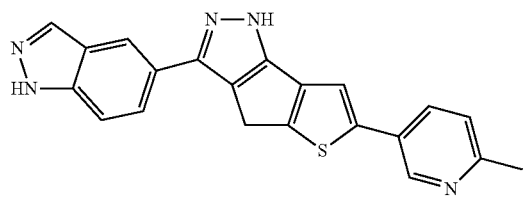 [SMILES: Cc1ccc(-c2cc3c(s2)Cc2c(-c4ccc5[nH]ncc5c4)n[nH]c2-3)cn1] | 3-(1H-indazol-5-yl)-6-(6-methylpyridin-3-yl)-1,4-dihydrothieno[2',3':4,5]cyclopenta[1,2-c]pyrazole |
| 37 | 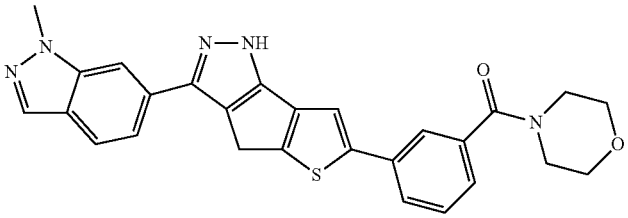 [SMILES: Cn1ncc2ccc(-c3n[nH]c4c3Cc3sc(-c5cccc(C(=O)N6CCOCC6)c5)cc3-4)cc21] | (3-(3-(1-methyl-1H-indazol-6-yl)-1,4-dihydro-thieno[2',3':4,5]cyclopenta[1,2-c]pyrazol-6-yl)phenyl)(morpholino)methanone |
| 38 | 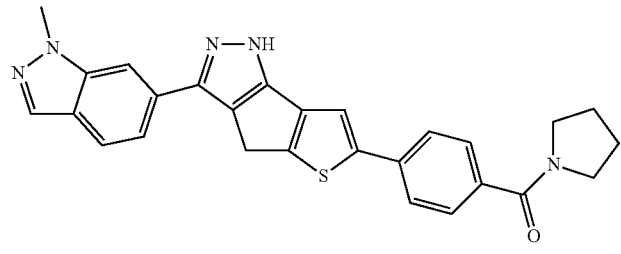 [SMILES: Cn1ncc2ccc(-c3n[nH]c4c3Cc3sc(-c5ccc(C(=O)N6CCCC6)cc5)cc3-4)cc21] | (4-(3-(1-methyl-1H-indazol-6-yl)-1,4-dihydro-thieno[2',3':4,5]cyclopenta[1,2-c]pyrazol-6-yl)phenyl)(pyrrolidin-1-yl)methanone |
| 39 | 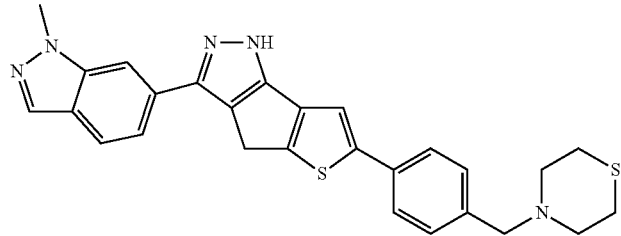 [SMILES: Cn1ncc2ccc(-c3n[nH]c4c3Cc3sc(-c5ccc(CN6CCSCC6)cc5)cc3-4)cc21] | 3-(1-methyl-1H-indazol-6-yl)-6-(4-(thiomorpholinomethyl)phenyl)-1,4-dihydrothieno[2',3':4,5]cyclopenta[1,2-c]pyrazole |

TABLE 1-continued

Heterocyclic pyrazole compounds

| | | |
|---|---|---|
| 40 | 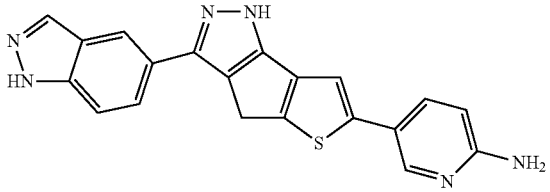 [SMILES: Nc1ccc(-c2cc3c(s2)Cc2c(-c4ccc5[nH]ncc5c4)n[nH]c2-3)cn1] | 5-(3-(1H-indazol-5-yl)-1,4-dihydrothieno[2',3':4,5]cyclopenta[1,2-c]pyrazol-6-yl)pyridin-2-amine |
| 41 | 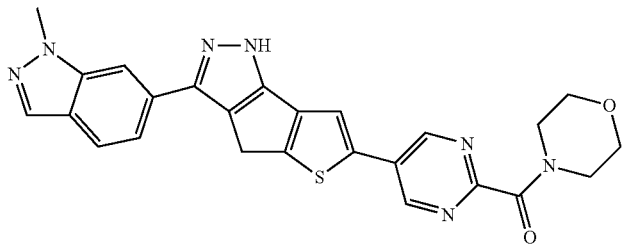 [SMILES: Cn1ncc2ccc(-c3n[nH]c4c3Cc3sc(-c5cnc(C(=O)N6CCOCC6)nc5)cc3-4)cc21] | (5-(3-(1-methyl-1H-indazol-6-yl)-1,4-dihydrothieno[2',3':4,5]cyclopenta[1,2-c]pyrazol-6-yl)pyrimidin-2-yl)(morpholino)methanone |
| 42 | 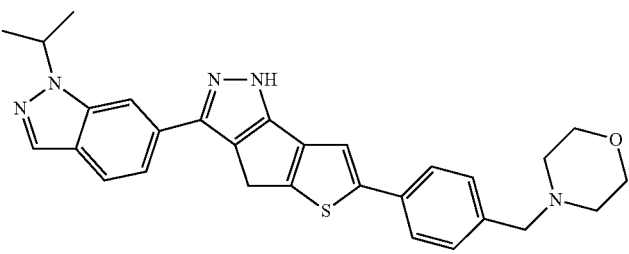 [SMILES: CC(C)n1ncc2ccc(-c3n[nH]c4c3Cc3sc(-c5ccc(CN6CCOCC6)cc5)cc3-4)cc21] | 4-(4-(3-(1-isopropyl-1H-indazol-6-yl)-1,4-dihydrothieno[2',3':4,5]cyclopenta[1,2-c]pyrazol-6-yl)benzyl)morpholine |
| 43 | 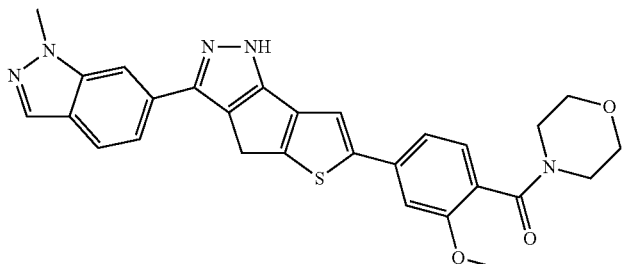 [SMILES: Cn1ncc2ccc(-c3n[nH]c4c3Cc3sc(-c5ccc(C(=O)N6CCOCC6)c(F)c5)cc3-4)cc21] | (2-methoxy-4-(3-(1-methyl-1H-indazol-6-yl)-1,4-dihydrothieno[2',3':4,5]cyclopenta[1,2-c]pyrazol-6-yl)phenyl)(morpholino)methanone |
| 44 | 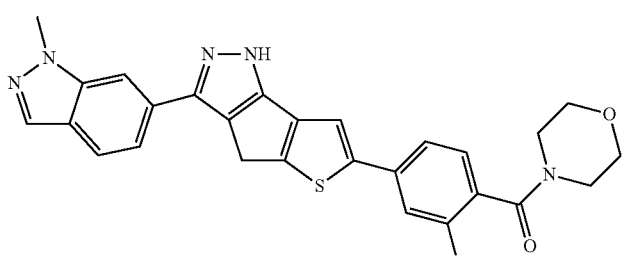 | (2-fluoro-4-(3-(1-methyl-1H-indazol-6-yl)-1,4-dihydrothieno[2',3':4,5]cyclopenta[1,2-c]pyrazol-6-yl)phenyl)(morpholino)methanone |
| 45 | 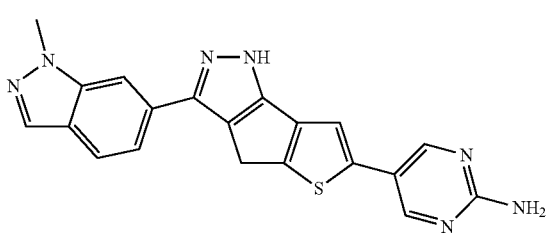 [SMILES: Cn1ncc2ccc(-c3n[nH]c4c3Cc3sc(-c5cnc(N)nc5)cc3-4)cc21] | 5-(3-(1-methyl-1H-indazol-6-yl)-1,4-dihydrothieno[2',3':4,5]cyclopenta[1,2-c]pyrazol-6-yl)pyrimidin-2-amine |

TABLE 1-continued

Heterocyclic pyrazole compounds

| 46 | 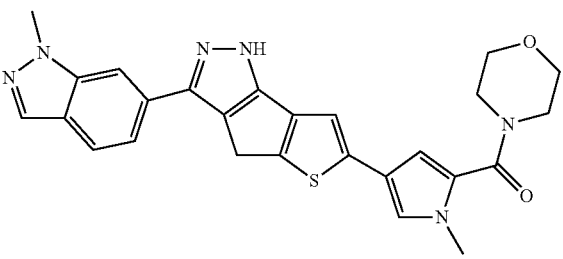 [SMILES: Cn1cc(-c2cc3c(s2)Cc2c(-c4ccc5cnn(C)c5c4)n[nH]c2-3)cc1C(=O)N1CCOCC1] | (1-methyl-4-(3-(1-methyl-1H-indazol-6-yl)-1,4-dihydrothieno[2',3':4,5]cyclopenta[1,2-c]pyrazol-6-yl)-1H-pyrrol-2-yl)(morpholino)methanone |
| --- | --- | --- |
| 47 | 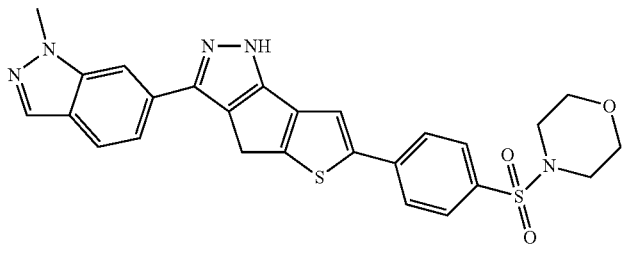 [SMILES: Cn1ncc2ccc(-c3n[nH]c4c3Cc3sc(-c5ccc(S(=O)(=O)N6CCOCC6)cc5)cc3-4)cc21] | 4-((4-(3-(1-methyl-1H-indazol-6-yl)-1,4-dihydrothieno[2',3':4,5]cyclopenta[1,2-c]pyrazol-6-yl)phenyl)sulfonyl)morpholine |
| 48 | 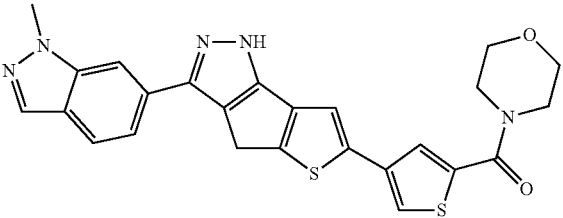 [SMILES: Cn1ncc2ccc(-c3n[nH]c4c3Cc3sc(-c5csc(C(=O)N6CCOCC6)c5)cc3-4)cc21] | (4-(3-(1-methyl-1H-indazol-6-yl)-1,4-dihydrothieno[2',3':4,5]cyclopenta[1,2-c]pyrazol-6-yl)thiophen-2-yl)(morpholino)methanone |
| 49 | 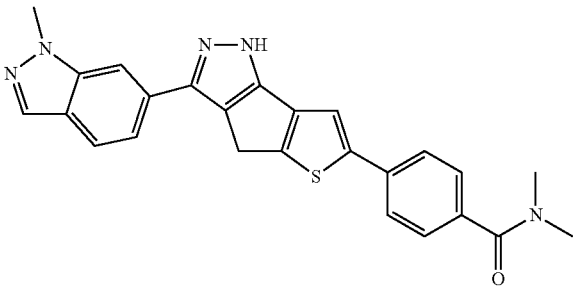 [SMILES: CN(C)C(=O)c1ccc(-c2cc3c(s2)Cc2c(-c4ccc5cnn(C)c5c4)n[nH]c2-3)cc1] | N,N-dimethyl-4-(3-(1-methyl-1H-indazol-6-yl)-1,4-dihydrothieno[2',3':4,5]cyclopenta[1,2-c]pyrazol-6-yl)benzamide |
| 50 | 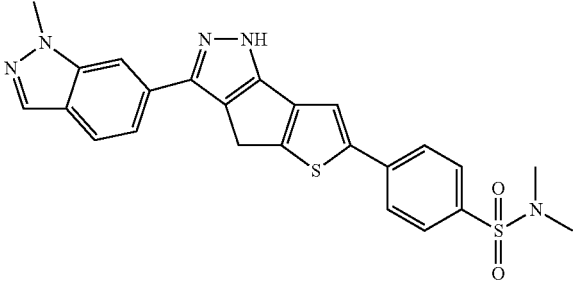 [SMILES: CN(C)S(=O)(=O)c1ccc(-c2cc3c(s2)Cc2c(-c4ccc5cnn(C)c5c4)n[nH]c2-3)cc1] | N,N-dimethyl-4-(3-(1-methyl-1H-indazol-6-yl)-1,4-dihydrothieno[2',3':4,5]cyclopenta[1,2-c]pyrazol-6-yl)benzenesulfonamide |
| 51 | 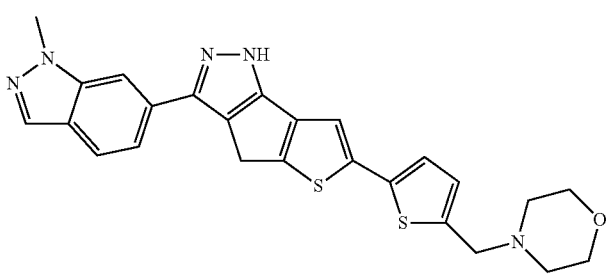 [SMILES: Cn1ncc2ccc(-c3n[nH]c4c3Cc3sc(-c5ccc(CN6CCOCC6)s5)cc3-4)cc21] | 4-((5-(3-(1-methyl-1H-indazol-6-yl)-1,4-dihydrothieno[2',3':4,5]cyclopenta[1,2-c]pyrazol-6-yl)thiophen-2-yl)methyl)morpholine |

TABLE 1-continued

Heterocyclic pyrazole compounds

| 52 | 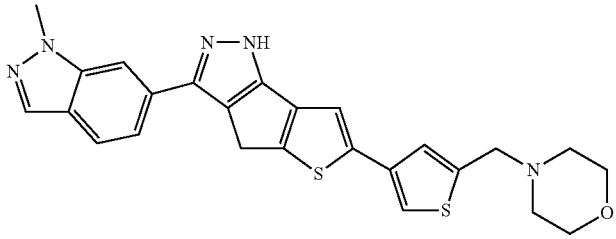 [SMILES: Cn1ncc2ccc(-c3n[nH]c4c3Cc3sc(-c5csc(CN6CCOCC6)c5)cc3-4)cc21] | 4-((4-(3-(1-methyl-1H-indazol-6-yl)-1,4-dihydro-thieno[2',3':4,5]cyclopenta[1,2-c]pyrazol-6-yl)thiophen-2-yl)methyl)morpholine |
| 53 | 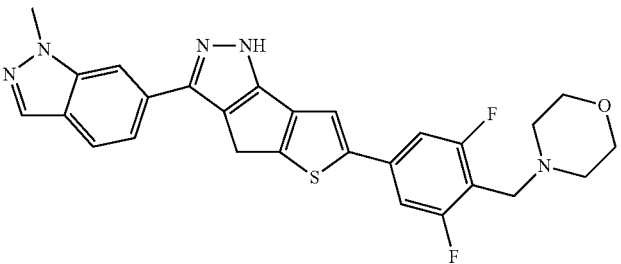 [SMILES: Cn1ncc2ccc(-c3n[nH]c4c3Cc3sc(-c5cc(F)c(CN6CCOCC6)c(F)c5)cc3-4)cc21] | 4-(2,6-difluoro-4-(3-(1-methyl-1H-indazol-6-yl)-1,4-dihydrothieno[2',3':4,5]cyclopenta[1,2-c]pyrazol-6-yl)benzyl)morpholine |
| 54 | 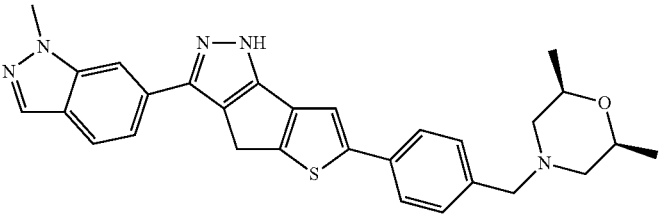 [SMILES: C[C@@H]1CN(Cc2ccc(-c3cc4c(s3)Cc3c(-c5ccc6cnn(C)c6c5)n[nH]c3-4)cc2)C[C@H](C)O1] | (2S,6R)-2,6-dimethyl-4-(4-(3-(1-methyl-1H-indazol-6-yl)-1,4-dihydro-thieno[2',3':4,5]cyclopenta[1,2-c]pyrazol-6-yl)benzyl)morpholine |
| 55 | 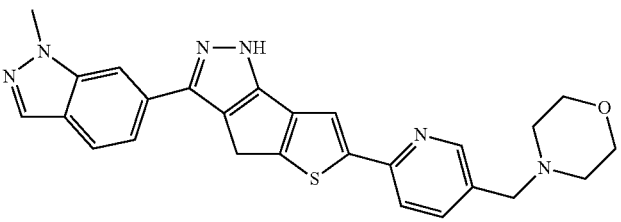 [SMILES: Cn1ncc2ccc(-c3n[nH]c4c3Cc3sc(-c5ccc(CN6CCOCC6)cn5)cc3-4)cc21] | 4-((6-(3-(1-methyl-1H-indazol-6-yl)-1,4-dihydro-thieno[2',3':4,5]cyclopenta[1,2-c]pyrazol-6-yl)pyridin-3-yl)methyl)morpholine |
| 56 | 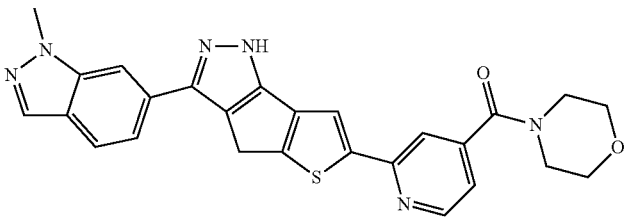 [SMILES: Cn1ncc2ccc(-c3n[nH]c4c3Cc3sc(-c5cc(C(=O)N6CCOCC6)ccn5)cc3-4)cc21] | (2-(3-(1-methyl-1H-indazol-6-yl)-1,4-dihydro-thieno[2',3':4,5]cyclopenta[1,2-c]pyrazol-6-yl)pyridin-4-yl)(morpholino)methanone |
| 57 | 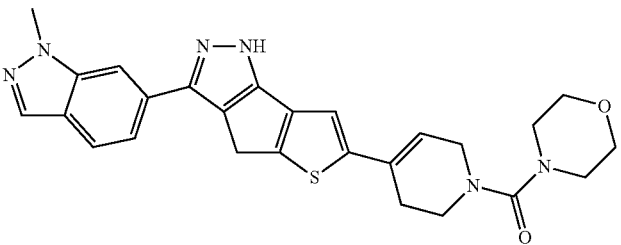 [SMILES: Cn1ncc2ccc(-c3n[nH]c4c3Cc3sc(C5=CCN(C(=O)N6CCOCC6)CC5)cc3-4)cc21] | (4-(3-(1-methyl-1H-indazol-6-yl)-1,4-dihydro-thieno[2',3':4,5]cyclopenta[1,2-c]pyrazol-6-yl)-3,6-dihydropyridin-1(2H)-yl)(morpholino)methanone |

TABLE 1-continued

Heterocyclic pyrazole compounds

| | | |
|---|---|---|
| 58 | 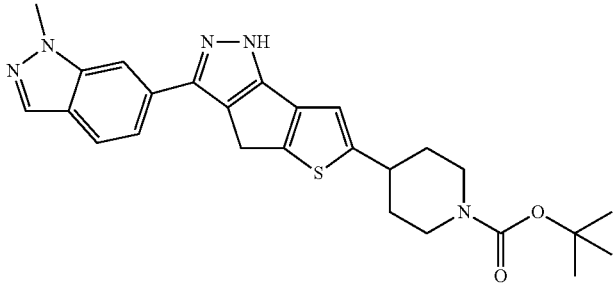 [SMILES: Cn1ncc2ccc(-c3n[nH]c4c3Cc3sc(C5CCN(C(=O)OC(C)(C)C)CC5)cc3-4)cc21] | tert-butyl-4-(3-(1-methyl-1H-indazol-6-yl)-1,4-dihydrothieno[2',3':4,5]cyclopenta[1,2-c]pyrazol-6-yl)piperidine-1-carboxylate |
| 59 | 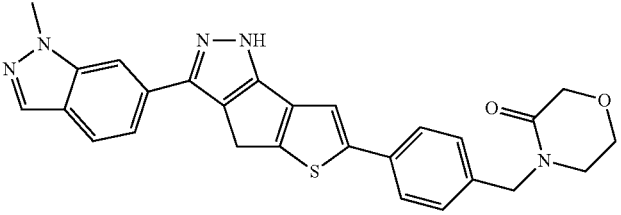 [SMILES: Cn1ncc2ccc(-c3n[nH]c4c3Cc3sc(-c5ccc(CN6CCOCC6=O)cc5)cc3-4)cc21] | 4-(4-(3-(1-methyl-1H-indazol-6-yl)-1,4-dihydro-thieno[2',3':4,5]cyclopenta[1,2-c]pyrazol-6-yl)benzyl)morpholin-3-one |
| 60 | 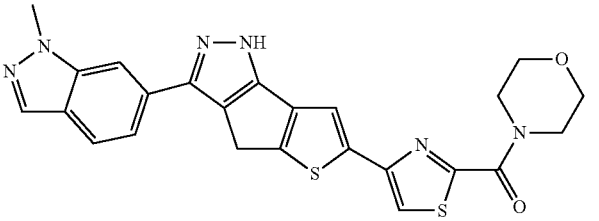 [SMILES: Cn1ncc2ccc(-c3n[nH]c4c3Cc3sc(-c5csc(C(=O)N6CCOCC6)n5)cc3-4)cc21] | (4-(3-(1-methyl-1H-indazol-6-yl)-1,4-dihydro-thieno[2',3':4,5]cyclopenta[1,2-c]pyrazol-6-yl)thiazol-2-yl)(morpholino)methanone |
| 61 | 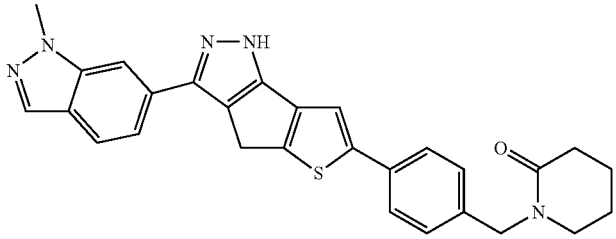 [SMILES: Cn1ncc2ccc(-c3n[nH]c4c3Cc3sc(-c5ccc(CN6CCCCC6=O)cc5)cc3-4)cc21] | 1-(4-(3-(1-methyl-1H-indazol-6-yl)-1,4-dihydro-thieno[2',3':4,5]cyclopenta[1,2-c]pyrazol-6-yl)benzyl)piperidin-2-one |
| 62 | 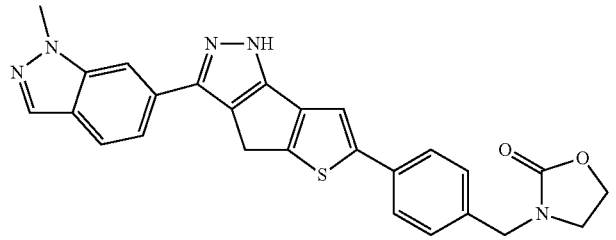 [SMILES: Cn1ncc2ccc(-c3n[nH]c4c3Cc3sc(-c5ccc(CN6CCOC6=O)cc5)cc3-4)cc21] | 3-(4-(3-(1-methyl-1H-indazol-6-yl)-1,4-dihydro-thieno[2',3':4,5]cyclopenta[1,2-c]pyrazol-6-yl)benzyl)oxazolidin-2-one |
| 63 | 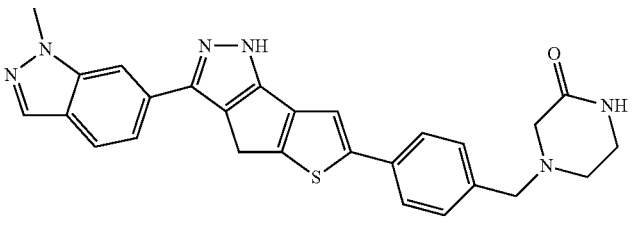 [SMILES: Cn1ncc2ccc(-c3n[nH]c4c3Cc3sc(-c5ccc(CN6CCNC(=O)C6)cc5)cc3-4)cc21] | 4-(4-(3-(1-methyl-1H-indazol-6-yl)-1,4-dihydro-thieno[2',3':4,5]cyclopenta[1,2-c]pyrazol-6-yl)benzyl)piperazin-2-one |

TABLE 1-continued

Heterocyclic pyrazole compounds

| 64 | 1-(4-(3-(1-methyl-1H-indazol-6-yl)-1,4-dihydrothieno[2',3':4,5]cyclopenta[1,2-c]pyrazol-6-yl)benzyl)pyrrolidin-2-one |
| 65 | 1,3-dimethyl-4-(4-(3-(1-methyl-1H-indazol-6-yl)-1,4-dihydrothieno[2',3':4,5]cyclopenta[1,2-c]pyrazol-6-yl)benzyl)piperazin-2-one |
| 66 | 4-(4-(3-(1-methyl-1H-indazol-6-yl)-1,4-dihydrothieno[2',3':4,5]cyclopenta[1,2-c]pyrazol-6-yl)phenethyl)morpholin-3-one |
| 67 | 6-(4-((3,3-difluoropyrrolidin-1-yl)methyl)phenyl)-3-(1-methyl-1H-indazol-6-yl)-1,4-dihydrothieno[2',3':4,5]cyclopenta[1,2-c]pyrazole |
| 68 | 4-(4-(3-(3-bromo-1H-indazol-6-yl)-1,4-dihydrothieno[2',3':4,5]cyclopenta[1,2-c]pyrazol-6-yl)benzyl)morpholine |
| 69 | 4-(2-(4-(3-(1-methyl-1H-indazol-6-yl)-1,4-dihydrothieno[2',3':4,5]cyclopenta[1,2-c]pyrazol-6-yl)phenoxy)ethyl)morpholine |
| 70 | 4-(2-(3-(3-(1-methyl-1H-indazol-6-yl)-1,4-dihydrothieno[2',3':4,5]cyclopenta[1,2-c]pyrazol-6-yl)phenoxy)ethyl)morpholine |

TABLE 1-continued

Heterocyclic pyrazole compounds

| 71 | | 4-(3-(3-(1-methyl-1H-indazol-6-yl)-1,4-dihydrothieno[2',3':4,5]cyclopenta[1,2-c]pyrazol-6-yl)prop-2-yn-1-yl)morpholine |
| --- | --- | --- |
| 72 | | N-(4-(3-(1-methyl-1H-indazol-6-yl)-1,4-dihydrothieno[2',3':4,5]cyclopenta[1,2-c]pyrazol-6-yl)phenyl)tetrahydro-2H-pyran-4-amine |
| 73 | | N-methyl-N-(4-(3-(1-methyl-1H-indazol-6-yl)-1,4-dihydrothieno[2',3':4,5]cyclopenta[1,2-c]pyrazol-6-yl)phenyl)tetrahydro-2H-pyran-4-amine |
| 74 | | (R)-3-methyl-4-(4-(3-(1-methyl-1H-indazol-6-yl)-1,4-dihydrothieno[2',3':4,5]cyclopenta[1,2-c]pyrazol-6-yl)benzyl)morpholine |
| 75 | | (S)-3-methyl-4-(4-(3-(1-methyl-1H-indazol-6-yl)-1,4-dihydrothieno[2',3':4,5]cyclopenta[1,2-c]pyrazol-6-yl)benzyl)morpholine |
| 76 | | 3-(1-methyl-1H-indazol-6-yl)-6-(4-((tetrahydro-4H-pyran-4-ylidene)methyl)phenyl)-1,4-dihydrothieno[2',3':4,5]cyclopenta[1,2-c]pyrazole |

TABLE 1-continued

Heterocyclic pyrazole compounds

| | | |
|---|---|---|
| 77 | 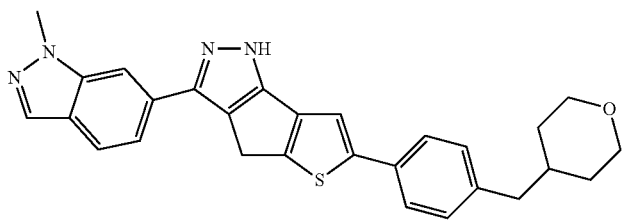 [SMILES: Cn1ncc2ccc(-c3n[nH]c4c3Cc3sc(-c5ccc(CC6CCOCC6)cc5)cc3-4)cc21] | 3-(1-methyl-1H-indazol-6-yl)-6-(4-((tetrahydro-2H-pyran-4-yl)methyl)phenyl)-1,4-dihydrothieno[2',3':4,5]cyclopenta[1,2-c]pyrazole |
| 78 | 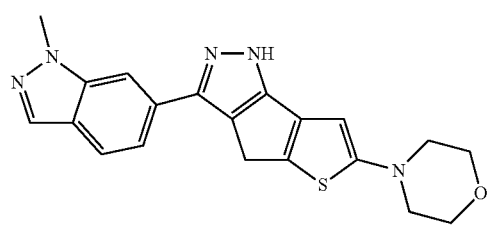 [SMILES: Cn1ncc2ccc(-c3n[nH]c4c3Cc3sc(N5CCOCC5)cc3-4)cc21] | 4-(3-(1-methyl-1H-indazol-6-yl)-1,4-dihydrothieno[2',3':4,5]cyclopenta[1,2-c]pyrazol-6-yl)morpholine |
| 79 | 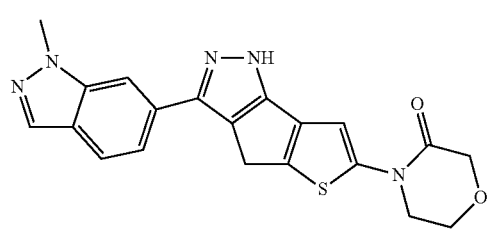 [SMILES: Cn1ncc2ccc(-c3n[nH]c4c3Cc3sc(N5CCOCC5=O)cc3-4)cc21] | 4-(3-(1-methyl-1H-indazol-6-yl)-1,4-dihydrothieno[2',3':4,5]cyclopenta[1,2-c]pyrazol-6-yl)morpholin-3-one |
| 80 | 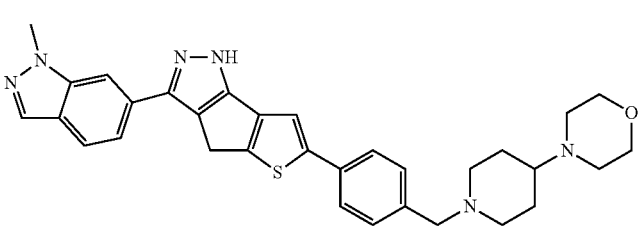 [SMILES: Cn1ncc2ccc(-c3n[nH]c4c3Cc3sc(-c5ccc(CN6CCC(N7CCOCC7)CC6)cc5)cc3-4)cc21] | 4-(1-(4-(3-(1-methyl-1H-indazol-6-yl)-1,4-dihydrothieno[2',3':4,5]cyclopenta[1,2-c]pyrazol-6-yl)benzyl)piperidin-4-yl)morpholine |
| 81 | 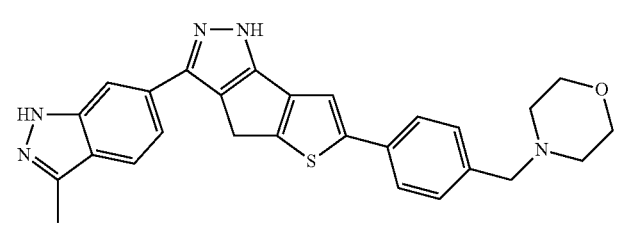 [SMILES: Cc1n[nH]c2cc(-c3n[nH]c4c3Cc3sc(-c5ccc(CN6CCOCC6)cc5)cc3-4)ccc12] | 4-(4-(3-(3-methyl-1H-indazol-6-yl)-1,4-dihydrothieno[2',3':4,5]cyclopenta[1,2-c]pyrazol-6-yl)benzyl)morpholine |
| 82 | 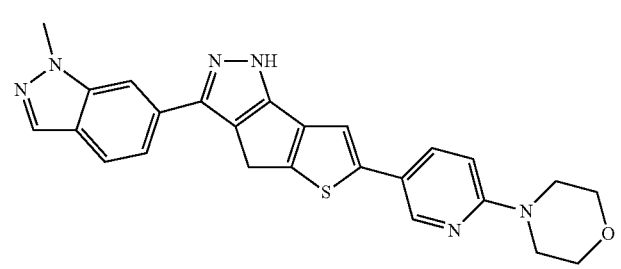 [SMILES: Cn1ncc2ccc(-c3n[nH]c4c3Cc3sc(-c5ccc(N6CCOCC6)nc5)cc3-4)cc21] | 4-(5-(3-(1-methyl-1H-indazol-6-yl)-1,4-dihydrothieno[2',3':4,5]cyclopenta[1,2-c]pyrazol-6-yl)pyridin-2-yl)morpholine |
| 83 | 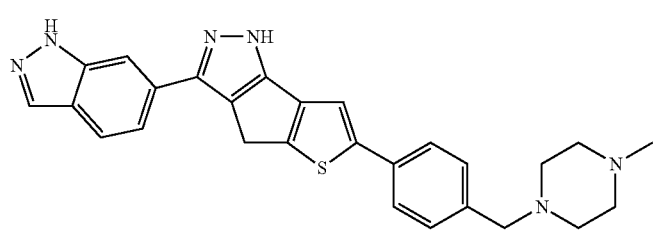 [SMILES: CN1CCN(Cc2ccc(-c3cc4c(s3)Cc3c(-c5ccc6cn[nH]c6c5)n[nH]c3-4)cc2)CC1] | 3-(1H-indazol-6-yl)-6-(4-((4-methylpiperazin-1-yl)methyl)phenyl)-1,4-dihydrothieno[2',3':4,5]cyclopenta[1,2-c]pyrazole |

TABLE 1-continued

Heterocyclic pyrazole compounds

| | | |
|---|---|---|
| 84 | | 3-(1-methyl-1H-indazol-6-yl)-6-(4-((4-methyl piperazin-1-yl)methyl)phenyl)-1,4-dihydrothieno[2',3':4,5]cyclopenta[1,2-c]pyrazole |
| 85 | | 3-(1-methyl-1H-indazol-6-yl)-6-(6-(4-methyl-piperazin-1-yl)pyridin-3-yl)-1,4-dihydrothieno[2',3':4,5]cyclopenta[1,2-c]pyrazole |
| 86 | | 6-(2-chloropyridin-4-yl)-3-(1-methyl-1H-indazol-6-yl)-1,4-dihydrothieno[2',3':4,5]cyclopenta[1,2-c]pyrazole |
| 87 | | 3-(1-methyl-1H-indazol-6-yl)-6-(2-(4-methyl-piperazin-1-yl)pyridin-4-yl)-1,4-dihydrothieno[2',3':4,5]cyclopenta[1,2-c]pyrazole |
| 88 | | 4-(2,3-difluoro-4-(3-(1-methyl-1H-indazol-6-yl)-1,4-dihydrothieno[2',3':4,5]cyclopenta[1,2-c]pyrazol-6-yl)benzyl)morpholine |
| 89 | | 4-(4-(3-(1-methyl-1H-benzo[d][1,2,3]triazol-6-yl)-1,4-dihydrothieno[2',3':4,5]cyclopenta[1,2-c]pyrazol-6-yl)benzyl)morpholine |

TABLE 1-continued

Heterocyclic pyrazole compounds

| | | |
|---|---|---|
| 90 | | 4-(4-(3-(1-methyl-1H-indazol-6-yl)-1,4-dihydro-thieno[2',3':4,5]cyclopenta[1,2-c]pyrazol-6-yl)-3-(trifluoromethoxy)benzyl)morpholine |
| 91 | | 4-(3-methyl-4-(3-(1-methyl-1H-indazol-6-yl)-1,4-dihydrothieno[2',3':4,5]cyclopenta[1,2-c]pyrazol-6-yl)benzyl)morpholine |
| 92 | | 5-(3-(1-methyl-1H-indazol-6-yl)-1,4-dihydro-thieno[2',3':4,5]cyclopenta[1,2-c]pyrazol-6-yl)pyridin-2-amine |
| 93 | | N,N-dimethyl-1-(5-(3-(1-methyl-1H-indazol-6-yl)-1,4-dihydrothieno[2',3':4,5]cyclopenta[1,2-c]pyrazol-6-yl)pyridin-2-yl)methanamine |
| 94 | | N,N-dimethyl-1-(4-(3-(1-methyl-1H-indazol-6-yl)-1,4-dihydrothieno[2',3':4,5]cyclopenta[1,2-c]pyrazol-6-yl)phenyl)methanamine |
| 95 | | 4-((6-(3-(1-methyl-1H-indazol-6-yl)-1,4-dihydro-thieno[2',3':4,5]cyclopenta[1,2-c]pyrazol-6-yl)pyridin-3-yl)methyl)morpholine |

TABLE 1-continued

Heterocyclic pyrazole compounds

| 96 | 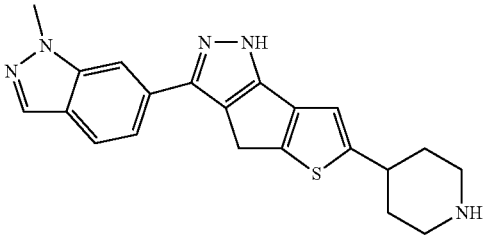 [SMILES: Cn1ncc2ccc(-c3n[nH]c4c3Cc3sc(C5CCNCC5)cc3-4)cc21] | 3-(1-methyl-1H-indazol-6-yl)-6-(piperidin-4-yl)-1,4-dihydrothieno[2',3':4,5]cyclopenta[1,2-c]pyrazole |
| --- | --- | --- |
| 97 | 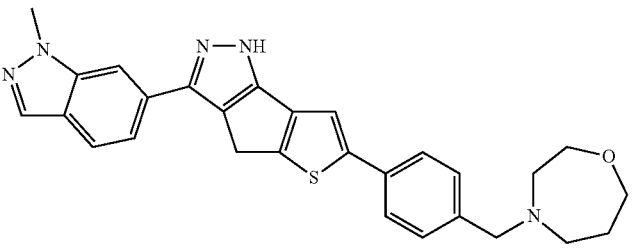 [SMILES: Cn1ncc2ccc(-c3n[nH]c4c3Cc3sc(-c5ccc(CN6CCCOCC6)cc5)cc3-4)cc21] | 4-(4-(3-(1-methyl-1H-indazol-6-yl)-1,4-dihydrothieno[2',3':4,5]cyclopenta[1,2-c]pyrazol-6-yl)benzyl)-1,4-oxazepane |
| 98 | 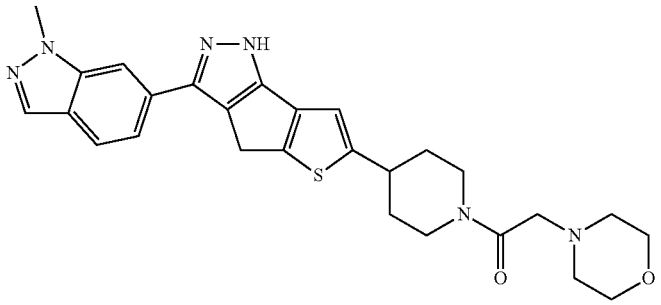 [SMILES: Cn1ncc2ccc(-c3n[nH]c4c3Cc3sc(C5CCN(C(=O)CN6CCOCC6)CC5)cc3-4)cc21] | 1-(4-(3-(1-methyl-1H-indazol-6-yl)-1,4-dihydrothieno[2',3':4,5]cyclopenta[1,2-c]pyrazol-6-yl)piperidin-1-yl)-2-morpholinoethan-1-one |
| 99 | 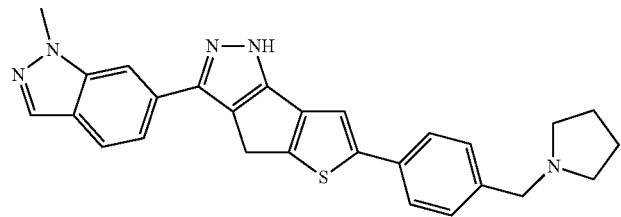 [SMILES: Cn1ncc2ccc(-c3n[nH]c4c3Cc3sc(-c5ccc(CN6CCCC6)cc5)cc3-4)cc21] | 3-(1-methyl-1H-indazol-6-yl)-6-(4-(pyrrolidin-1-ylmethyl)phenyl)-1,4-dihydrothieno[2',3':4,5]cyclopenta[1,2-c]pyrazole |
| 100 | 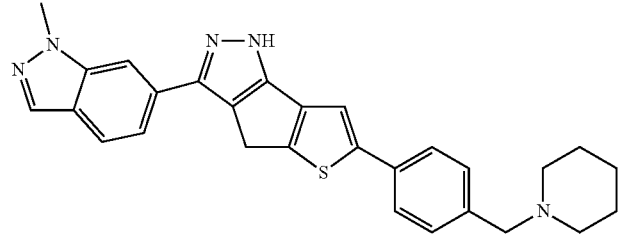 [SMILES: Cn1ncc2ccc(-c3n[nH]c4c3Cc3sc(-c5ccc(CN6CCCCC6)cc5)cc3-4)cc21] | 3-(1-methyl-1H-indazol-6-yl)-6-(4-(piperidin-1-ylmethyl)phenyl)-1,4-dihydrothieno[2',3':4,5]cyclopenta[1,2-c]pyrazole |
| 101 | 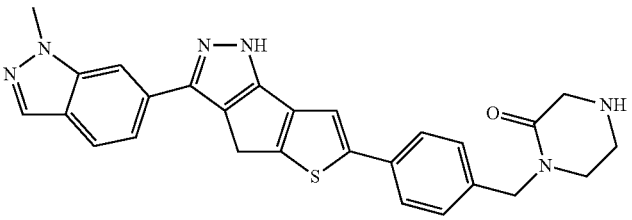 [SMILES: Cn1ncc2ccc(-c3n[nH]c4c3Cc3sc(-c5ccc(CN6CCNCC6=O)cc5)cc3-4)cc21] | 1-(4-(3-(1-methyl-1H-indazol-6-yl)-1,4-dihydrothieno[2',3':4,5]cyclopenta[1,2-c]pyrazol-6-yl)benzyl)piperazin-2-one |

TABLE 1-continued

Heterocyclic pyrazole compounds

| | | |
|---|---|---|
| 102 | | 6-(4-(3-(1-methyl-1H-indazol-6-yl)-1,4-dihydro-thieno[2',3':4,5]cyclopenta[1,2-c]pyrazol-6-yl)benzyl)-2-oxa-6-azaspiro[3.3]heptane |
| 103 | | 6-(4-(azetidin-1-ylmethyl)phenyl)-3-(1-methyl-1H-indazol-6-yl)-1,4-dihydro-thieno[2',3':4,5]cyclopenta[1,2-c]pyrazole |
| 104 | | 6-(4-((3,3-difluoroazetidin-1-yl)methyl)phenyl)-3-(1-methyl-1H-indazol-6-yl)-1,4-dihydrothieno[2',3':4,5]cyclopenta[1,2-c]pyrazole |
| 105 | | 6-(4-((3-methoxyazetidin-1-yl)methyl)phenyl)-3-(1-methyl-1H-indazol-6-yl)-1,4-dihydrothieno[2',3':4,5]cyclopenta[1,2-c]pyrazole |

TABLE 2

$^1$H NMR and Mass data

| Example | NMR | Mass (m/z) |
|---|---|---|
| A | $^1$H NMR (600 MHz, DMSO-d6, ppm) δ 12.92 (s, 1H), 11.29 (s, 1H), 8.51 (d, J = 2.3 Hz, 1H), 8.01 (dd, J = 8.6, 2.4 Hz, 1H), 7.76 (s, 1H), 7.67 (s, 1H), 7.60 (d, J = 8.2 Hz, 1H), 7.41-7.36 (m, 2H), 6.86 (d, J = 8.6 Hz, 1H), 6.42 (s, 1H), 5.56 (s, 2H), 3.93 (s, 2H), 3.84 (s, 3H). | 385.0 (M + H)$^+$ |
| B | $^1$H NMR (500 MHz, DMSO-d6, ppm) δ 12.86 (s, 1H), 11.24 (s, 1H), 8.56 (s, 1H), 8.08-8.04 (m, 1H), 7.98 (s, 1H), 7.70 (s, 1H), 7.56-7.48 (m, 2H), 7.42 (s, 1H), 6.95-6.89 (m, 1H), 6.51 (s, 1H), 3.98 (s, 2H), 3.91 (s, 3H). | 385.3 (M + H)$^+$ |
| C | $^1$H NMR (600 MHz, DMSO-d6, ppm) δ 8.57-8.53 (m, 2H), 8.07-8.03 (m, 2H), 7.76 (d, J = 8.4 Hz, 1H), 7.72 (s, 1H), 7.70 (s, 1H), 6.92 (dd, J = 8.6, 0.6 Hz, 1H), 4.01 (s, 2H), 3.90 (s, 3H). | 386.5 (M + H)$^+$ |

TABLE 2-continued

| | | ¹H NMR and Mass data | |
|---|---|---|---|
| | D | ¹H NMR (500 MHz, DMSO-d6, ppm) δ 13.82 (s, 1H), 8.54 (d, J = 2.5 Hz, 1H), 8.04 (dd, J = 8.6, 2.5 Hz, 1H), 7.68 (s, 1H), 7.12 (d, J = 7.5 Hz, 1H), 6.97-6.93 (m, 1H), 6.92 6.87 (m, 2H), 5.67 (s, 1H), 3.89 (s, 3H), 3.88 (s, 2H), 3.49-3.42 (m, 2H), 2.97-2.91 (m, 2H). | 386.70 (M + H)⁺ |
| | E | ¹H NMR (600 MHz, DMSO-d6, ppm) δ 12.63 (s, 1H), 8.54 (d, J = 2.5 Hz, 1H), 8.03 (dd, J = 8.6, 2.5 Hz, 1H), 7.67 (s, 1H), 7.44 (s, 1H), 7.34 (d, J = 8.0 Hz, 1H), 6.90 (d, J = 8.6 Hz, 1H), 6.57 (d, J = 8.0 Hz, 1H), 5.77 (s, 1H), 5.67 (s, 1H), 3.89 (s, 3H), 3.87 (s, 2H), 3.50-3.45 (m, 2H), 3.00-2.96 (m, 2H). | 387.22 (M + H)⁺ |
| | F | ¹H NMR (600 MHz, DMSO-d6, ppm): δ 13.06 (s, 1H), 8.57-8.54 (m, 1H), 8.08-8.03 (m, 2H), 8.00 (s, 1H), 7.78 (d, J = 8.1 Hz, 1H), 7.72-7.66 (m, 2H), 7.03-7.00 (m, 1H), 6.93-6.89 (m, 1H), 4.02 (s, 2H), 3.90 (s, 3H) ppm. | 386.09 (M + H)⁺ |
| | G | ¹H NMR (600 MHz, DMSO-d6, ppm): δ 13.02 (s, 1H), 8.55 (d, J = 2.5 Hz, 1H), 8.08-8.03 (m, 3H), δ 7.77-7.67 (m, 3H), 7.05 (d, J = 2.0 Hz, 1H), 6.90 (d, J = 8.5 Hz, 1H), 3.99 (s, 2H), 3.90 (s, 3H) ppm. | 386.03 (M + H)⁺ |
| | H | ¹H NMR (500 MHz, DMSO-d6, ppm) δ 8.49 (s, 1H), 8.00 (s, 1H), 7.93 (d, 1H), 7.82 (s, 1H), 7.71 (d, 2H), 7.07 (d, 2H), 4.03 (s, 2H), 3.81 (s, 3H). | 397.0 (M + H)⁺ |
| | I | ¹H NMR (500 MHz, DMSO-d6, ppm) δ 8.54 (d, 1H), 8.03 (d, 1H), 7.72-7.68 (m, 3H), 7.07 (d, 2H), 6.90 (d, H), 3.93 (s, 2H), 3.89 (s, 3H), 3.80 (s, 3H). | 376.0 (M + H)⁺ |
| | J | ¹H NMR (500 MHz, DMSO-d6, ppm): δ 12.79 (s br, 1H), 11.98 (s br, 1H), 8.52 (d, J = 2.5 Hz, 1H), 8.30-8.13 (m, 1H), 8.02 (dd, J = 2.5, 8.5 Hz, 1H), 7.89 (s, 1H), 7.63 (s br, 1H), 7.42-7.41 (m, 1H), 7.15-7.09 (m, 2H), 6.90 (d, J = 8.5 Hz, 1H), 3.89 (s, 2H), 3.57 (s, 3H). | 401.07 (M + H)⁺ |
| | K | ¹H NMR (600 MHz, DMSO-d6, ppm) δ 12.91 (s, 1H), 8.81 (d, J = 2.4 Hz, 1H), 7.99 (dd, J = 2.4, 8.4 Hz, 1H), 7.80 (s, 1H), 7.70 (d, J = 8.4 Hz, 2H), 7.31 (d, J = 7.8 Hz, 1H), 7.06 (d, J = 8.4 Hz, 2H), 3.94 (s, 2H), 3.80 (s, 3H). | 360.42 (M + H)⁺ |

| | Working Example | |
|---|---|---|
| Compound No. | NMR | Mass (m/z) |
| 1 | ¹H NMR (600 MHz, DMSO-d6, ppm) δ 13.23 (s, 1H), 13.02 (s, 1H), 8.56 (d, J = 2.3 Hz, 1H), 8.20-8.15 (m, 2H), 8.06 (dd, J = 8.6, 2.3 Hz, 1H), 7.80 (d, J = 7.3 Hz, 1H), 7.75-7.64 (m, 2H), 6.92 (d, J = 8.6 Hz, 1H), 4.01 (s, 2H), 3.91 (s, 3H). | 385.6 (M)⁺ |
| 2 | ¹H NMR (600 MHz, DMSO-d6, ppm) δ 13.28 (s, 1H), 13.16 (s, 1H), 8.57 (d, J = 1.9 Hz, 1H), 8.11 (t, J = 8.9 Hz, 1H), 8.06 (dd, J = 8.9, 2.5 Hz, 1H), 7.90 (dd, J = 8.5, 5.8 Hz, 1H), 7.72 (s, 1H), 7.59 (dd, J = 37.4, 8.1 Hz, 1H), 6.92 (d, J = 8.6 Hz, 1H), 5.79 (s, 1H), 4.07 (s, 1H), 4.03 (s, 1H), 3.91 (s, 3H). | 386.2 (M + H)⁺ |
| 3 | ¹H NMR (600 MHz, DMSO-d6, ppm) δ 8.29 (d, J = 2.5 Hz, 1H), 8.12 (s, 1H), 7.93 (s, 1H), 7.89 (d, J = 8.4 Hz, 1H), 7.73 (dd, J = 8.6, 2.5 Hz, 1H), 7.55 (dd, J = 8.4, 1.1 Hz, 1H), 7.49 (s, 1H), 6.52 (d, J = 8.6 Hz, 1H), 6.19 (s, 2H), 3.99 (s, 2H). | 371.0 (M + H)⁺ |
| 4 | ¹H NMR (600 MHz, DMSO-d6, ppm) δ 13.14 (s, 1H), 8.56 (d, J = 2.5 Hz, 1H), 8.09 (s, 1H), 8.06 (dd, J = 8.6, 2.5 Hz, 1H), 8.01 (s, 1H), 7.89 (d, J = 8.2 Hz, 1H), 7.64 (s, 1H), 7.56 (d, J = 8.2 Hz, 1H), 6.92 (d, J = 8.6 Hz, 1H), 4.11 (s, 3H), 4.08 (s, 2H), 3.91 (s, 3H). | 399.9 (M)⁺ |
| 5 | ¹H NMR (600 MHz, DMSO-d6, ppm) δ 13.10 (s, 1H), 8.47 (d, J = 2.3 Hz, 1H), 8.09 (s, 1H), 8.00 (s, 1H), 7.88 (d, J = 8.3 Hz, 1H), 7.83 (d, J = 8.9, 2.5 Hz, 1H), 7.58-7.54 (m, 2H), 6.71 (d, J = 8.9 Hz, 1H), 4.11 (s, 3H), 4.04 (s, 2H), 3.07 (m, 6H). | 413.1 (M + H)⁺ |
| 6 | ¹H NMR (600 MHz, DMSO-d6, ppm) δ 13.30 (s, 1H), 13.17 (s, 1H), 8.12 (s, 1H), 7.93 (s, 1H), 7.90 (d, J = 8.4 Hz, 1H), 7.73 (s, 1H), 7.70 (d, J = 8.0 Hz, 2H), 7.55 (d, J = 8.4 Hz, 1H), 7.37 (d, J = 8.0 Hz, 2H), 4.03 (s, 2H), 3.59 (t, J = 4.1 Hz, 4H), 3.49 (s, 2H), 2.38 (s, 4H). | 453.9 (M)⁺ |

TABLE 2-continued

| | ¹H NMR and Mass data | |
|---|---|---|
| 7 | ¹H NMR (600 MHz, DMSO-d6, ppm) δ 13.31 (s, 1H), 13.17 (s, 1H), 8.12 (s, 1H), 7.93 (s, 1H), 7.90 (d, J = 8.1 Hz, 1H), 7.73 (s, 1H), 7.70 (d, J = 7.9 Hz, 2H), 7.55 (d, J = 8.1 Hz, 1H), 7.36 (d, J = 7.9 Hz, 2H), 4.03 (s, 2H), 3.60-3.53 (m, 2H), 3.46 (s, 1H), 3.17 (d, J = 5.2 Hz, 1H), 2.69 (d, J = 10.7 Hz, 2H), 1.66 (t, J = 10.7 Hz, 2H), 1.04 (s, 3H), 1.03 (s, 3H). | 482.0 (M + H)⁺ |
| 8 | ¹H NMR (600 MHz, DMSO-d6, ppm) δ 13.14 (s, 1H), 8.10 (s, 1H), 8.01 (s, 1H), 7.89 (d, J = 8.3 Hz, 1H), 7.73 (s, 1H), 7.70 (d, J = 7.9 Hz, 2H), 7.57 (d, J = 8.3 Hz, 1H), 7.37 (d, J = 7.9 Hz, 2H), 4.11 (s, 3H), 4.08 (s, 2H), 3.59 (t, J = 4.1 Hz, 4H), 3.49 (s, 2H), 2.38 (s, 4H). | 467.8 (M)⁺ |
| 9 | ¹H NMR (600 MHz, DMSO-d6, ppm) δ 8.90 (d, J = 1.9 Hz, 1H), 8.10 (dd, J = 7.6, 1.6 Hz, 2H), 8.01 (s, 1H), 7.91-7.85 (m, 2H), 7.58 (d, J = 8.6 Hz, 1H), 7.50 (d, J = 8.2 Hz, 1H), 4.12 (s, 3H), 3.61 (s, 2H), 2.73 (d, J = 10.2 Hz, 2H), 2.65-2.60 (m, 1H), 2.41-2.37 (m, 1H), 1.78-1.74 (m, 2H), 1.04 (d, J = 6.3 Hz, 6H). | 496.8 (M)⁺ |
| 10 | ¹H NMR (600 MHz, DMSO-d6, ppm) δ 13.16 (s, 1H), 8.89 (s, 1H), 8.09 (d, J = 2.4 Hz, 1H), 8.08 (s, 1H), 8.00 (s, 1H), 7.88 (s, 1H), 7.87 (s, 1H), 7.55 (d, J = 8.4 Hz, 1H), 7.50 (d, J = 7.8 Hz, 1H), 4.10 (s, 5H), 3.61-3.60 (m, 6H), 2.43 (s, br, 4H). | 468.95 (M)⁺ |
| 11 | ¹H NMR (600 MHz, DMSO-d6, ppm) δ 13.15 (s, 1H), 8.83 (d, J = 2.4 Hz, 1H), 8.08 (s, 1H), 8.01-7.99 (m, 2H), 7.87 (d, J = 8.4 Hz, 1H), 7.83 (s, 1H), 7.55 (dd, J = 0.6, 8.4 Hz, 1H), 7.32 (d, J = 8.4 Hz, 1H), 4.10 (s, 3H), 4.09 (s, 2H), and the methyl signal on pyridine is hidden in the DMSO signal. | 384.36 (M + H)⁺ |
| 12 | ¹H NMR (600 MHz, DMSO-d6, ppm) δ 13.12 (s, 1H), 8.08 (s, 1H), 8.03 (s, 1H), 8.00 (s, 1H), 7.88 (d, J = 8.3 Hz, 1H), 7.73 (s, 1H), 7.63 (s, 1H), 7.57 (d, J = 5.3 Hz, 1H), 7.39 (d, J = 8.3 Hz, 1H), 7.26 (d, J = 7.5 Hz, 1H), 4.11 (s, 3H), 4.08 (s, 2H), 3.59 (d, J = 1.5 Hz, 1H), 3.50 (s, 2H), 3.16 (d, J = 5.2 Hz, 1H), 2.71 (d, J = 10.3 Hz, 2H), 1.68 (t, J = 10.8 Hz, 2H), 1.03 (d, J = 6.3 Hz, 6H). | 496.23 (M + H)⁺ |
| 13 | ¹H NMR (600 MHz, DMSO-d6, ppm) δ 13.13 (s, 1H), 8.09 (s, 1H), 8.00 (s, 1H), 7.88 (d, J = 8.3 Hz, 1H), 7.74 (s, 1H), 7.66-7.62 (m, 2H), 7.59-7.55 (m, 1H), 7.42-7.38 (m, 1H), 7.27 (d, J = 7.6 Hz, 1H), 4.11 (s, 3H), 4.08 (s, 2H), 3.58 (t, J = 4.5, 4.5 Hz, 4H), 3.53 (s, 2H), 2.42-2.37 (m, 4H) | 468.37 (M + H)⁺ |
| 14 | ¹H NMR (600 MHz, DMSO-d6, ppm) δ 13.11 (s, 1H), 8.08 (s, 1H), 8.00 (s, 1H), 7.87 (d, J = 8.4 Hz, 1H), 7.72 (s, 1H), 7.63-7.62 (m, 2H), 7.55 (d, J = 8.4 Hz, 1H), 7.38 (t, J = 8.4 Hz, 1H), 7.24 (d, J = 7.2 Hz, 1H), 4.10 (s, 3H), 4.07 (s, 2H), 3.51 (s, 2H), 3.31 (s br, 8H), 2.16 (s, 3H). | 481.40 (M + H)⁺ |
| 15 | ¹H NMR (600 MHz, DMSO-d6, ppm) δ 13.15 (s, 1H), 8.09 (s, 1H), 8.01 (s, 1H), 7.88 (d, J = 8.4 Hz, 1H), 7.85 (s, 1H), 7.80 (d, J = 8.1 Hz, 2H), 7.56 (d, J = 8.4 Hz, 1H), 7.45 (d, J = 8.1 Hz, 2H), 4.11 (s, 3H), 4.10 (s, 2H), 3.62 (s, 2H), 3.39 (s, 2H), 2.33 (d, J = 19.2 Hz, 4H), 2.20 (s, 3H) | 495.41 (M + H)⁺ |
| 16 | ¹H NMR (600 MHz, DMSO-d6, ppm) δ 13.29 (s, 1H), 13.19 (s, 1H), 8.90 (d, J = 2.2 Hz, 1H), 8.12 (s, 1H), 8.10 (dd, J = 8.1, 2.2 Hz, 1H), 7.94 (s, 1H), 7.90 (d, J = 8.3 Hz, 1H), 7.87 (s, 1H), 7.56 (d, J = 7.5 Hz, 1H), 7.49 (d, J = 8.1 Hz, 1H), 4.06 (s, 2H), 3.62-3.59 (m, 5H), 2.73 (d, J = 10.6 Hz, 2H), 1.76 (t, J = 10.6 Hz, 2H), 1.05 (s, 3H), 1.04 (s, 3H). | 483.36 (M + H)⁺ |
| 17 | ¹H NMR (600 MHz, DMSO-d6, ppm) δ 13.17 (s, 1H), 8.44 (d, J = 5.4 Hz, 1H), 8.08 (s, 1H), 8.04 (s, 1H), 8.00 (s, 1H), 7.87 (d, J = 8.4 Hz, 1H), 7.59 (s, 1H), 7.55 (d, J = 8.4 Hz, 1H), 7.53 (d, J = 4.8 Hz, 1H), 4.12 (s, 2H), 4.10 (s, 3H), 3.30 (s, 3H). | 384.33 (M + H)⁺ |
| 18 | ¹H NMR (600 MHz, DMSO-d6, ppm) δ 13.27 (s, 1H), 13.17 (s, 1H), 8.89 (s, 1H), 8.09 (s, 1H), 8.08 (dd, J = 4.8, 7.2 Hz, 1H), 7.92 (s, 1H), 7.88 (d, J = 8.4 Hz, 1H), 7.86 (s, 1H), 7.53 (d, J = 8.4 Hz, 1H), 7.50 (d, J = 8.4 Hz, 1H), 4.05 (s, 2H), 3.61-3.59 (m, 6H), 2.44-2.43 (m, 4H). | 455.23 (M + H)⁺ |

TABLE 2-continued

| | ¹H NMR and Mass data | |
|---|---|---|
| 19 | ¹H NMR (600 MHz, DMSO-d6, ppm) δ 13.16 (s, 1H), 8.10 (s, 1H), 8.02 (s, 1H), 7.89 (d, J = 8.4 Hz, 1H), 7.87 (s, 1H), 7.82 (d, J = 8.2 Hz, 2H), 7.57 (d, J = 8.3 Hz, 1H), 7.48 (d, J = 8.2 Hz, 2H), 4.38 (s, 1H), 4.12 (s, 3H), 4.11 (s, 2H), 3.57 (s, 4H), 2.86 (s, 1H), 1.15 (s, 3H). 1.02 (s, 3H). | 509.97 (M)⁺ |
| 20 | ¹H NMR (600 MHz, DMSO-d6, ppm) δ 13.11 (s, 1H), 8.08 (s, 1H), 8.00 (s, 1H), 7.87 (d, J = 8.4 Hz, 1H), 7.71 (s, 1H), 7.68 (d, J = 7.8 Hz, 2H), 7.55 (d, J = 8.4 Hz, 1H), 7.35 (d, J = 7.8 Hz, 2H), 4.10 (s, 3H), 4.06 (s, 2H), 3.56-3.54 (m, 4H), 3.36 (q, J = 6.6 Hz, 1H), 2.40 (s br, 2H), 2.30-2.27 (m, 2H), 1.29 (d, J = 6.6 Hz, 3H). | 482.25 (M + H)⁺ |
| 21 | ¹H NMR (600 MHz, DMSO-d6, ppm) δ 13.15 (s, 1H), 8.09 (s, 1H), 8.01 (s, 1H), 7.91-7.83 (m, 2H), δ 7.81 (d, J = 8.2 Hz, 2H), 7.60-7.54 (m, 1H), 7.48 (d, J = 8.2 Hz, 2H), 4.11 (s, 3H), 4.10 (s, 2H), 3.70-3.37 (m, 8H). | 482.22 (M + H)⁺ |
| 22 | ¹H NMR (600 MHz, DMSO-d6, ppm) δ 13.10 (s, 1H), 8.08 (s, 1H), 7.99 (s, 1H), 7.87 (d, J = 8.4 Hz, 1H), 7.69 (s, 1H), 7.63 (d, J = 7.8 Hz, 2H), 7.55 (d, J = 8.4 Hz, 1H), 7.29 (d, J = 7.8 Hz, 2H), 4.10 (s, 3H), 4.06 (s, 2H), 3.57 (s br, 4H), 2.77-2.74 (m, 2H), 2.53-2.52 (m, 2H), 2.43 (s br, 4H). | 482.26 (M + H)⁺ |
| 23 | ¹H NMR (600 MHz, DMSO-d6, ppm) δ 13.17 (s, 1H), 9.00 (d, J = 1.8 Hz, 1H), 8.24 (dd, J = 2.4, 7.8 Hz, 1H), 8.08 (s, 1H), 8.00 (s, 1H), 7.99 (s, 1H), 7.88 (d, J = 8.4 Hz, 1H), 7.68 (d, J = 8.4 Hz, 1H), 7.55 (d, J = 8.4 Hz, 1H), 4.12 (s, 2H), 4.10 (s, 3H), 3.67-3.66 (m, 4H), 3.58-3.3.57 (m, 2H), 3.55-3.54 (m, 2H). | 483.21 (M + H)⁺ |
| 24 | ¹H NMR (600 MHz, DMSO-d6, ppm) δ 13.13 (s, 1H), 8.09 (s, 1H), 8.00 (s, 1H), 7.88 (d, J = 8.3 Hz, 1H), 7.82 (s, 1H), 7.56 (d, J = 7.8 Hz, 1H), 7.38-7.31 (m, 2H), 7.25 (d, J = 7.8, 1.5 Hz, 1H), δ 4.11 (s, 3H), 4.08 (s, 2H), 3.89 (s, 3H), 3.59 (t, J = 4.4, 4.4 Hz, 4H), 3.47 (s, 2H), 2.43-2.34 (m, 4H). | 498.38 (M + H)⁺ |
| 25 | ¹H NMR (600 MHz, DMSO-d6, ppm) δ 13.14 (s, 1H), 8.08 (s, 1H), 8.00 (s, 1H), 7.91-7.81 (m, 2H), 7.62-7.51 (m, 3H), 7.45 (t, J = 9.5, 9.5 Hz, 1H), 4.11 (s, 3H), 4.09 (s, 2H), 3.61-3.55 (m, 4H), 3.53 (s, 2H), 2.44-2.37 (m, 4H); ¹⁹F NMR (471 MHz, DMSO-d6, ppm) δ −118.1. | 486.21 (M + H)⁺ |
| 26 | ¹H NMR (600 MHz, DMSO-d6, ppm) δ 13.11 (s, 1H), 8.08 (s, 1H), 8.00 (s, 1H), 7.88 (d, J = 8.3 Hz, 1H), 7.70 (s, 1H), 7.58-7.52 (m, 2H), 7.52-7.47 (m, 1H), 7.28 (d, J = 7.9 Hz, 1H), 4.11 (s, 3H), 4.07 (s, 2H), 3.59-3.54 (m, 4H), 3.44 (s, 2H), 2.40-2.35 (m, 7H). | 482.19 (M + H)⁺ |
| 27 | ¹H NMR (600 MHz, DMSO-d6, ppm) δ 13.15 (s, 1H), 8.08 (s, 1H), 8.03-7.99 (m, 2H), 7.97 (s, 1H), 7.94-7.86 (m, 2H), 7.84 (d, J = 9.8 Hz, 1H), 7.57 (d, J = 10.1 Hz, 1H), 4.11 (s, 3H), 4.10 (s, 2H), 3.65-3.59 (m, 6H), 2.45-2.39 (m, 4H); ¹⁹F NMR (471 MHz, DMSO-d6, ppm) δ −58.8 | 535.97 (M)⁺ |
| 28 | ¹H NMR (600 MHz, DMSO-d6, ppm) δ 13.11 (s, 1H), 8.08 (s, 1H), 8.00 (s, 1H), 7.87 (d, J = 8.4 Hz, 1H), 7.73 (s, 1H), 7.68 (d, J = 7.8 Hz, 2H), 7.55 (d, J = 8.4 Hz, 1H), 7.28 (d, J = 8.4 Hz, 2H), 4.10 (s, 3H), 4.07 (s, 2H), 3.55-3.53 (m, 4H), 3.21 (dd, J = 5.4, 8.4 Hz, 1H), 2.35 (s br, 2H), 2.30-2.29 (m, 2H), 1.92-1.86 (m, 1H), 1.70-1.62 (m, 1H), 0.71 (t, J = 7.2 Hz, 3H). | 409.51 (M-(morpholinyl) + H)⁺ |
| 29 | ¹H NMR (600 MHz, DMSO-d6, ppm) δ 13.08 (s, 1H), 8.09 (s, 1H), 8.02 (s, 1H), 7.89 (d, J = 8.3 Hz, 1H), 7.75 (s, 2H), 7.57 (d, J = 8.3 Hz, 1H), 7.10 (s, 1H), 7.00 (d, J = 7.9 Hz, 1H), 4.12 (s, 3H), 4.06 (s, 2H), 3.95 (s, 3H), 3.61 (t, J = 4.5 Hz, 4H), 3.51 (s, 2H), 2.40 (s, 4H). | 498.20 (M + H)⁺ |
| 30 | ¹H NMR (600 MHz, DMSO-d6, ppm) δ 13.29 (s, 1H), 13.18 (s, 1H), 8.84 (d, J = 2.2 Hz, 1H), 8.12 (s, 1H), 8.02 (dd, J = 8.3, 2.2 Hz, 1H), 7.94 (s, 1H), 7.90 (d, J = 8.3 Hz, 1H), 7.84 (s, 1H), 7.55 (d, J = 8.1 Hz, 1H), 7.34 (d, J = 8.1 Hz, 1H), 4.05 (s, 2H). | 370.15 (M + H)⁺ |
| 31 | ¹H NMR (600 MHz, DMSO-d6, ppm) δ 13.18 (s, 1H), 9.06 (d, J = 2.3 Hz, 1H), 8.55 (d, J = 1.8 Hz, 1H), 8.16 (t, J = 2.1 Hz, 1H), 8.10 (s, 1H), 8.01 (s, 2H), 7.89 (d, J = 8.4 Hz, 1H), 7.57 (d, J = 8.4 Hz, 1H), 4.13 (s, 2H), 4.12 (s, 3H), 3.69 (s, 4H), 3.61 (s, 2H), 3.42 (s, 2H). | 483.23 (M + H)⁺ |

TABLE 2-continued

| | ¹H NMR and Mass data | |
|---|---|---|
| 32 | ¹H NMR (600 MHz, DMSO-d6, ppm) δ 13.15 (s, 1H), 8.10 (s, 1H), 8.02 (s, 1H), 7.89 (d, J = 8.4 Hz, 1H), 7.84 (dd, J = 8.0, 8.0 Hz, 1H), 7.77 (s, 1H), 7.57 (d, J = 8.4 Hz, 1H), 7.29 (d, J = 12.4 Hz, 1H), 7.25 (d, J = 8.0 Hz, 1H), 4.12 (s, 3H), 4.11 (s, 2H), 3.60 (t, J = 4.4 Hz, 4H), 3.52 (s, 2H), 2.39 (s, 4H). | 486.24 (M + H)⁺ |
| 33 | ¹H NMR (600 MHz, DMSO-d6, ppm) δ 13.13 (s, 1H), 8.82 (d, J = 2.4 Hz, 1H), 8.08 (s, 1H), 8.00-7.99 (m, 2H), 7.87 (d, J = 8.4 Hz, 1H), 7.82 (s, 1H), 7.55 (d, J = 8.4 Hz, 1H), 7.32 (d, J = 7.8 Hz, 1H), 4.10 (s, 3H), 4.08 (s, 2H). | 384.59 (M + H)⁺ |
| 34 | ¹H NMR (600 MHz, DMSO-d6, ppm) δ 13.14 (s, 1H), 8.08 (s, 1H), 8.00 (s, 1H), 7.87 (d, J = 8.4 Hz, 1H), 7.83 (s, 1H), 7.79 (d, J = 8.4 Hz, 2H), 7.55 (d, J = 8.4 Hz, 1H), 7.42 (d, J = 7.8 Hz, 2H), 4.10 (s, 3H), 4.09 (s, 2H), 3.58 (br, 2H), 1.62-1.60 (m, 3H), 1.55-1.48 (m, 8H). | 480.60 (M + H)⁺ |
| 35 | ¹H NMR (600 MHz, DMSO-d6, ppm) δ 13.11 (s, 1H), 8.10 (s, 1H), 8.03 (s, 1H), 7.88 (d, J = 8.3 Hz, 1H), 7.75-7.65 (m, 3H), 7.53 (d, J = 7.9 Hz, 1H), 7.37 (d, J = 8.2 Hz, 2H), 4.27 (d, J = 7.2 Hz, 2H), 4.06 (s, 2H), 3.58 (t, J = 4.3, 4.3 Hz, 4H), 3.48 (s, 2H), 2.40-2.34 (m, 4H), 2.33-2.25 (m, 1H), 0.90 (d, J = 6.7 Hz, 6H). | 510.68 (M + H)⁺ |
| 36 | ¹H NMR (600 MHz, DMSO-d6, ppm) δ 7.94-7.92 (m, 2H), 7.91 (d, J = 9.0 Hz, 1H), 7.69 (dd, J = 0.6, 9.0 Hz, 1H), 7.67 (dd, J = 0.6, 5.4 Hz, 1H), 7.59 (d, J = 5.4 Hz, 1H), 7.07 (d, J = 9.0 Hz, 2H), 3.90 (s, 3H). | 370.14 (M + H)⁺ |
| 37 | ¹H NMR (500 MHz, DMSO-d6, ppm) δ 13.14 (s, 1H), 8.09 (s, 1H), 8.01 (s, 1H), 7.89 (d, J = 8.4 Hz, 1H), 7.86 (s, 1H), 7.83 (d, J = 7.8 Hz, 1H), 7.75 (s, 1H), 7.57 (d, J = 8.3 Hz, 1H), 7.52 (t, J = 7.7 Hz, 1H), 7.35 (d, J = 7.4 Hz, 1H), 4.12 (s, 3H), 4.10 (s, 2H), 3.67 (s, 6H), 3.41 (s, 2H). | 482.02 (M + H)⁺ |
| 38 | ¹H NMR (600 MHz, DMSO-d6, ppm) δ 13.15 (s, 1H), 8.09 (s, 1H), 8.01 (s, 1H), 7.88 (d, J = 8.4 Hz, 1H), 7.85 (s, 1H), 7.79 (d, J = 8.4 Hz, 2H), 7.58 (d, J = 8.4 Hz, 2H), 7.56 (d, J = 9.0 Hz, 1H), 4.11 (s, 3H), 4.10 (s, 2H), 3.46 (dt, J = 18, 6.6 Hz, 4H), 1.90-1.80 (m, 4H). | 466.53 (M + H)⁺ |
| 39 | ¹H NMR (600 MHz, DMSO-d6, ppm) δ 13.12 (s, 1H), 8.09 (s, 1H), 8.00 (s, 1H), 7.88 (d, J = 8.4 Hz, 1H), 7.73 (s, 1H), 7.69 (d, J = 8.4 Hz, 2H), 7.56 (d, J = 8.4 Hz, 1H), 7.35 (d, J = 7.8 Hz, 2H), 4.11 (s, 3H), 4.08 (s, 2H), 2.65-2.61 (m, 8H). | 484.40 (M + H)⁺ |
| 40 | ¹H NMR (600 MHz, DMSO-d6, ppm) δ 13.23 (s, 1H), δ 12.96 (s, 1H), 8.28 (d, J = 2.6 Hz, 1H), 8.16 (d, J = 7.3 Hz, 2H), 7.78 (d, J = 7.4 Hz, 1H), 7.72 (dd, J = 8.6, 2.5 Hz, 1H), 7.66 (d, J = 8.7 Hz, 1H), 7.48 (s, 1H), 6.52-6.50 (m, 1H), 6.18 (s, 2H), 3.96 (s, 2H). | 371.38 (M + H)⁺ |
| 41 | ¹H NMR (600 MHz, DMSO-d6, ppm) δ 13.22 (s, 1H), 9.28 (s, 2H), 8.11 (s, 1H), 8.10 (d, J = 0.8 Hz, 1H), 8.02 (s, 1H), 7.90 (d, J = 8.3 Hz, 1H), 7.57 (dd, J = 8.4, 1.3 Hz, 1H), 4.16 (s, 2H), 4.12 (s, 3H), 3.70 (d, J = 1.8 Hz, 4H), 3.57-3.55 (m, 2H), 3.31-3.29 (m, 2H). | 484.30 (M + H)⁺ |
| 42 | ¹H NMR (600 MHz, DMSO-d6, ppm) δ 13.22-13.10 (m, 1H), 8.10 (s, 1H), 8.06 (s, 1H), 7.87 (d, J = 8.2 Hz, 1H), 7.75-7.66 (m, 3H), 7.57-7.51 (m, 1H), 7.37 (d, J = 8.2 Hz, 2H), 5.07-5.00 (m, 1H), 4.07 (s, 2H), 3.58 (t, J = 4.4, 4.4 Hz, 4H), 3.48 (s, 2H), 2.41-2.32 (m, 4H), 1.54 (d, J = 6.6 Hz, 6H). | 496.55 (M + H)⁺ |
| 43 | ¹H NMR (600 MHz, DMSO-d6, ppm) δ 13.15 (s, 1H), 8.09 (s, 1H), 8.00 (s, 1H), 7.94 (s, 1H), 7.88 (d, J = 11.9 Hz, 1H), 7.57 (d, J = 8.3 Hz, 1H), 7.44 (s, 1H), δ 7.32 (dd, J = 7.8, 1.4 Hz, 1H), 7.25 (d, J = 7.7 Hz, 1H), 4.12-4.09 (m, 5H), 3.92 (s, 3H), 3.56-3.49 (m, 4H), 3.22-3.12 (m, 4H). | 512.38 (M + H)⁺ |
| 44 | ¹H NMR (600 MHz, DMSO-d6, ppm) δ 13.17 (s, 1H), δ8.09 (s, 1H), 8.01 (s, 1H), 7.94 (s, 1H), 7.89 (d, J = 8.3 Hz, 1H), 7.75 (dd, J = 10.9, 1.4 Hz, 1H), 7.63 (dd, J = 7.9, 1.7 Hz, 1H), 7.56 (d, J = 8.4 Hz, 1H), 7.47 (t, J = 7.6, 7.6 Hz, 1H), 4.12-4.10 (m, 5H), 3.66 (s, 4H), 3.57-3.54 (m, 2H), 3.31-3.29 (m, 2H); ¹⁹F NMR (471 MHz, DMSO-d6, ppm) δ −116.15. | 500.52 (M + H)⁺ |

TABLE 2-continued

| | ¹H NMR and Mass data | |
|---|---|---|
| 45 | ¹H NMR (600 MHz, DMSO-d6, ppm) δ 13.11 (s, 1H), 8.61 (s, 2H), 8.09 (s, 1H), 8.00 (s, 1H), 7.88 (d, J = 8.3 Hz, 1H), 7.62 (s, 1H), 7.56 (d, J = 8.2 Hz, 1H), 6.92 (s, 2H), 4.11 (s, 3H), 4.06 (s, 2H). | 386.31 (M + H)⁺ |
| 46 | ¹H NMR (600 MHz, DMSO-d6, ppm) δ 13.05 (s, 1H), 8.09 (s, 1H), 7.99 (s, 1H), 7.88 (d, J = 8.3 Hz, 1H), 7.56 (d, J = 8.4 Hz, 1H), 7.35 (d, J = 13.6 Hz, 2H), 6.69 (d, J = 1.5 Hz, 1H), 4.11 (s, 3H), 4.01 (s, 2H), 3.71 (s, 3H), 3.67-3.62 (m, 8H). | 485.03 (M + H)⁺ |
| 47 | ¹H NMR (600 MHz, DMSO-d6, ppm) δ 8.08 (d, J = 0.6 Hz, 1H), 8.03-8.01 (m, 3H), 7.99 (s, 1H), 7.88 (d, J = 8.4 Hz, 1H), 7.77 (d, J = 9.0 Hz, 2H), 7.57 (dd, J = 0.6, 7.8 Hz, 1H), 4.14 (s, 2H), 4.11 (s, 3H), 3.66-3.64 (m, 4H), 2.92-2.90 (m, 4H). | 518.49 (M + H)⁺ |
| 48 | ¹H NMR (600 MHz, DMSO-d6, ppm) δ 13.13 (s, 1H), 8.09 (s, 1H), 7.99 (s, 1H), 7.96 (s, 1H), 7.88 (d, J = 8.4 Hz, 1H), 7.81 (d, J = 0.6 Hz, 1H), 7.75 (s, 1H), 7.55 (d, J = 8.4 Hz, 1H), 4.11 (s, 3H), 4.07 (s, 2H), 3.70 (s br, 3H), 3.67-3.66 (m, 5H). | 488.25 (M + H)⁺ |
| 49 | ¹H NMR (600 MHz, DMSO-d6, ppm) δ 13.14 (s, 1H), 8.09 (s, 1H), 8.01 (s, 1H), 7.88 (d, J = 8.4 Hz, 1H), 7.84 (s, 1H), 7.79 (d, J = 8.4 Hz, 2H), 7.56 (d, J = 8.4 Hz, 1H), 7.47 (d, J = 8.4 Hz, 2H), 4.11 (s, 3H), 4.10 (s, 2H), 3.00 (s, 3H), 2.97 (s, 3H). | 440.37 (M + H)⁺ |
| 50 | ¹H NMR (600 MHz, DMSO-d6, ppm) δ 13.18 (s, 1H), 8.09 (s, 1H), 8.01-7.98 (m, 4H), 7.88 (d, J = 8.4 Hz, 1H), 7.78 (d, J = 8.4 Hz, 2H), 7.56 (d, J = 8.4 Hz, 1H), 4.13 (s, 2H), 4.11 (s, 3H), 2.65 (s, 6H). | 476.53 (M + H)⁺ |
| 51 | ¹H NMR (600 MHz, DMSO-d6, ppm) δ 13.12 (s, 1H), 8.08 (s, 1H), 8.00 (s, 1H), 7.87 (d, J = 8.4 Hz, 1H), 7.56 (d, J = 8.2 Hz, 1H), 7.46 (s, 1H), 7.22 (d, J = 3.5 Hz, 1H), 6.95 (d, J = 3.5 Hz, 1H), δ 4.10 (s, 3H), 4.06 (s, 2H), 3.67 (s, 2H), 3.60 (t, J = 4.4 Hz, 4H), δ 2.43 (s, 4H). | 474.10 (M + H)⁺ |
| 52 | ¹H NMR (600 MHz, DMSO-d6, ppm) δ 13.09 (s, 1H), δ 8.08 (d, J = 0.5 Hz, 1H), 7.99 (s, 1H), 7.87 (d, J = 8.4 Hz, 1H), 7.68 (d, J = 1.5 Hz, 1H), 7.58-7.54 (m, 2H), δ 7.37-7.35 (m, 1H), δ 4.10 (s, 3H), 4.04 (s, 2H), δ 3.70 (s, 2H), 3.59 (t, J = 4.4 Hz, 4H), 2.44 (s, 4H). | 474.19 (M + H)⁺ |
| 53 | ¹H NMR (600 MHz, DMSO-d6, ppm) δ 13.17 (s, 1H), 8.10 (s, 1H), 8.01 (s, 1H), 7.95 (s, 1H), 7.89 (d, J = 8.4 Hz, 1H), 7.56 (d, J = 7.7 Hz, 1H), 7.51 (d, J = 8.4 Hz, 2H), 4.13 4.09 (m, 5H), 3.58-3.54 (m, 6H), 2.41 (s, 4H). | 504.32 (M + H)⁺ |
| 54 | ¹H NMR (600 MHz, DMSO-d6, ppm) δ 13.13 (s, 1H), 8.09 (s, 1H), 8.01 (s, 1H), 7.89 (d, J = 8.4 Hz, 1H), 7.73 (s, 1H), 7.69 (d, J = 8.1 Hz, 2H), 7.56 (d, J = 8.4 Hz, 1H), 7.36 (d, J = 8.1 Hz, 2H), 4.11 (s, 3H), 4.07 (s, 2H), 3.58 (ddd, J = 9.9, 6.2, 2.0 Hz, 2H), 3.46 (s, 2H), 2.69 (d, J = 10.7 Hz, 2H), 1.66 (t, J = 10.7 Hz, 2H), 1.04 (s, 3H), 1.03 (s, 3H). | 496.31 (M + H)⁺ |
| 55 | ¹H NMR (600 MHz, DMSO-d6, ppm) δ 13.14 (s, 1H), 8.45 (d, J = 1.5 Hz, 1H), 8.09 (s, 1H), 8.05-8.00 (m, 2H), 8.00 (s, 1H), 7.89 (d, J = 8.2 Hz, 1H), 7.78-7.75 (m, 1H), 7.57 (d, J = 8.2 Hz, 1H), 4.12 (s, 3H), 4.09 (s, 2H), 3.62-3.57 (m, 4H), 3.52 (s, 2H), 2.39 (s, 4H). | 469.24 (M + H)⁺ |
| 56 | ¹H NMR (600 MHz, DMSO-d6, ppm) δ 13.15 (s, 1H), 8.62 (d, J = 4.9 Hz, 1H), 8.17 (s, 1H), 8.10 (s, 2H), 8.07 (s, 1H), 8.01 (s, 1H), 7.89 (d, J = 8.3 Hz, 1H), 7.57 (d, J = 9.0 Hz, 1H), 7.29 (dd, J = 4.9, 1.2 Hz, 1H), 4.12 (s, 5H), 3.75-3.65 (m, 5H), 3.61 (s, 3H). | 483.78 (M + H)⁺ |
| 57 | ¹H NMR (500 MHz, DMSO-d6, ppm) δ 13.06 (s, 1H), 8.07 (s, 1H), 7.98 (s, 1H), 7.86 (d, J = 6.9 Hz, 1H), 7.54 (d, J = 6.2 Hz, 1H), 7.30 (m, 1H), 6.18-6.13 (m, 1H), 4.10 (s, 3H), 4.01 (s, 2H), 3.93-3.88 (m, 2H), 3.62-3.57 (m, 4H), 3.20-3.13 (m, 4H), 2.62-2.56 (m, 2H). | 487.12 (M + H)⁺ |
| 58 | ¹H NMR (600 MHz, DMSO-d6, ppm) δ 12.99 (s, 1H), 8.07 (s, 1H), 7.97 (s, 1H), 7.86 (d, J = 8.0 Hz, 1H), 7.53 (d, J = 8.5 Hz, 1H), 7.11 (s, 1H), 4.10 (s, 3H), 4.05-4.03 (m, 2H), 3.96 (s, 2H), 3.05 (t, J = 11.5 Hz, 1H), 2.86 (s br, 2H), 1.99 (d, J = 10.5 Hz, 2H), 1.52 (qd, J = 4.0, 12.5 Hz, 2H), 1.42 (s, 9H). | 476.52 (M + H)⁺ |

TABLE 2-continued

| | ¹H NMR and Mass data | |
|---|---|---|
| 59 | ¹H NMR (500 MHz, DMSO-d6, ppm) δ 13.11 (s, 1H), 8.09 (s, 1H), 8.01 (s, 1H), 7.88 (d, J = 8.3 Hz, 1H), 7.77-7.70 (m, 3H), 7.56 (d, J = 8.1 Hz, 1H), 7.33 (d, J = 8.4 Hz, 2H), 4.57 (s, 2H), 4.14 (s, 2H), 4.11 (s, 3H), 4.08 (s, 2H), 3.83 (t, J = 5.2, 5.2 Hz, 2H), 3.31-3.28 (m, 2H). | 482.22 (M + H)⁺ |
| 60 | ¹H NMR (600 MHz, DMSO-d6, ppm) δ 13.13 (s, 1H), 8.34 (s, 1H), 8.09 (s, 1H), 8.00 (s, 1H), 7.88 (m, 2H), 7.55 (d, J = 9.0 Hz, 1H), 4.40 (s br, 2H), 4.11 (s, 3H), 7.08 (s, 2H), 3.73 (s br, 6H) | 489.17 (M + H)⁺ |
| 61 | ¹H NMR (500 MHz, DMSO-d6, ppm) δ 13.11 (s, 1H), 8.08 (s, 1H), 8.00 (s, 1H), 7.88 (d, J = 8.0 Hz, 1H), 7.72 (s, 1H), 7.69 (d, J = 8.0 Hz, 2H), 7.56 (d, J = 8.5 Hz, 1H), 7.29 (d, J = 8.0 Hz, 2H), 4.52 (s, 2H), 4.11 (s, 3H), 4.07 (s, 2H), 3.21 (s br, 2H), 2.32 (s br, 2H), 1.74-1.72 (m, 4H). | 480.28 (M + H)⁺ |
| 62 | ¹H NMR (600 MHz, DMSO-d6, ppm) δ 13.13 (s, 1H), 8.09 (s, 1H), 8.01 (s, 1H), 7.88 (d, J = 7.8 Hz, 1H), 7.76 (s, 1H), 7.74 (d, J = 7.8 Hz, 2H), 7.56 (d, J = 8.4 Hz, 1H), 7.35 (d, J = 7.8 Hz, 2H), 4.38 (s, 2H), 4.29 (t, J = 7.8 Hz, 2H), 4.11 (s, 3H), 4.08 (s, 2H), 3.46 (t, J = 7.8 Hz, 2H). | 468.12 (M + H)⁺ |
| 63 | ¹H NMR (600 MHz, DMSO-d6, ppm) δ 13.11 (s, 1H), 8.09 (s, 1H), 8.01 (s, 1H), 7.88 (d, J = 10.0 Hz, 1H), 7.77-7.69 (m, 4H), 7.56 (d, J = 10.7 Hz, 1H), 7.38 (d, J = 9.8 Hz, 2H), 4.11 (s, 3H), 4.08 (s, 2H), 3.57 (s, 2H), δ 3.19-3.13 (m, 2H), 2.93 (s, 2H), 2.59-2.54 (m, 2H). | 481.29 (M + H)⁺ |
| 64 | ¹H NMR (500 MHz, DMSO-d6, ppm) δ 13.11 (s, 1H), 8.08 (s, 1H), 7.99 (s, 1H), 7.87 (d, J = 8.5 Hz, 1H), 7.70 (d, J = 8.0 Hz, 2H), 7.55 (d, J = 9.5 Hz, 1H), 7.28 (d, J = 8.0 Hz, 2H), 4.39 (s, 2H), 4.10 (s, 3H), 4.07 (s, 2H), 3.26 (t, J = 7.0 Hz, 2H), 2.31 (t, J = 8.0 Hz, 2H), 1.97-1.90 (m, 2H). | 466.20 (M + H)⁺ |
| 65 | ¹H NMR (500 MHz, DMSO-d6, ppm) δ 13.09 (s, 1H), 8.08 (s, 1H), 8.00 (s, 1H), 7.87 (d, J = 8.4 Hz, 1H), 7.68 (s, 1H), 7.62-7.53 (m, 3H), 7.24 (d, J = 8.2 Hz, 2H), 4.11 (s, 3H), 4.06 (s, 2H), 3.23-3.09 (m, 3H), 3.07-2.96 (m, 2H), 2.93-2.85 (m, 1H), 2.81 (s, 3H), 2.48-2.43 (m, 1H), 2.33 (s, 3H). | 509.23 (M + H)⁺ |
| 66 | ¹H NMR (600 MHz, DMSO-d6, ppm) δ 13.12 (s, 1H), 8.09 (s, 1H), 8.00 (s, 1H), 7.88 (d, J = 8.8 Hz, 1H), 7.75-7.00 (m, 1H), 7.68 (d, J = 8.2 Hz, 2H), 7.60-7.53 (m, 1H), 7.31 (d, J = 8.2 Hz, 2H), 4.11 (s, 3H), δ 4.08 (s, 2H), 4.01 (s, 2H), 3.81-3.76 (m, 2H), 3.56 (d, J = 7.5 Hz, 2H), δ 3.33-3.29 (m, 2H), 2.87-2.81 (m, 2H). | 496.28 (M + H)⁺ |
| 67 | ¹H NMR (500 MHz, DMSO-d6, ppm) δ 13.10 (s, 1H), 8.08 (s, 1H), 8.00 (s, 1H), 7.88 (d, J = 8.4 Hz, 1H), 7.73 (s, 1H), 7.70 (d, J = 8.1 Hz, 2H), 7.57 (d, J = 8.0 Hz, 1H), 7.37 (d, J = 8.2 Hz, 2H), 4.11 (s, 3H), 4.07 (s, 2H), 3.64 (s, 2H), 2.88 (t, J = 13.3, 13.3 Hz, 2H), 2.71 (t, J = 7.0, 7.0 Hz, 2H), 2.31-2.21 (m, 2H); ¹⁹F NMR (471 MHz, DMSO-d6, ppm) δ −90.7. | 488.24 (M + H)⁺ |
| 68 | ¹H NMR (500 MHz, DMSO-d6, ppm) δ 13.64 (s, 1H), 13.23 (s, 1H), 7.95 (s, 1H), 7.90-7.79 (br, 3H), 7.75-7.62 (m, 2H), 7.60-7.49 (m, 2H), 4.48-4.29 (m, 2H), 4.06 (s, 2H), 4.02-3.91 (m, 2H), 3.73-3.57 (m, 2H), 3.21-3.05 (m, 2H). | 532.31 (M + H)⁺ |
| 69 | ¹H NMR (600 MHz, DMSO-d6, ppm) δ 13.08 (s, 1H), 8.09 (s, 1H), 8.01 (s, 1H), 7.88 (d, J = 8.3 Hz, 1H), 7.65 (d, J = 8.7 Hz, 1H), 7.61 (s, 1H), 7.56 (d, J = 8.3 Hz, 1H), 7.01 (d, J = 8.7 Hz, 1H), 4.14 (t, J = 5.8 Hz, 2H), 4.11 (s, 3H), 4.05 (s, 2H), 3.61-3.57 (m, 4H), 2.71 (t, J = 5.8 Hz, 2H), 2.49 (s, 4H). | 498.9 (M + H)⁺ |
| 70 | ¹H NMR (600 MHz, DMSO-d6, ppm) δ 13.12 (s, 1H), 8.09 (s, 1H), 8.01 (s, 1H), 7.89 (d, J = 8.4 Hz, 1H), 7.82 (s, 1H), 7.57 (d, J = 7.8 Hz, 1H), 7.34 (t, J = 7.9 Hz, 1H), 7.32 (s, 1H), 7.28 (d, J = 7.6 Hz, 1H), 6.91 (dd, J = 7.8, 1.9 Hz, 1H), 4.19 (t, J = 5.8 Hz, 2H), 4.12 (s, 3H), 4.08 (s, 2H), 3.62-3.59 (m, 4H), 2.73 (t, J = 5.8 Hz, 2H). | 498.21 (M + H)⁺ |
| 71 | ¹H NMR (500 MHz, CDCl₃) δ 8.00 (d, J = 0.8 Hz, 1H), 7.75 (d, J = 8.4 Hz, 1H), 7.66 (s, 1H), 7.33 (dd, J = 8.4, 1.2 Hz, 1H), 7.25 (s, 1H), 3.97 (s, 3H), 3.81-3.76 (m, 4H), 3.62 (s, 2H), 3.55 (s, 2H), 2.68-2.63 (m, 4H). | 416.89 (M + H)⁺ |

TABLE 2-continued

| | ¹H NMR and Mass data | |
|---|---|---|
| 72 | ¹H NMR (600 MHz, DMSO-d6, ppm) δ 13.04 (s, 1H), 8.09 (s, 1H), 8.00 (s, 1H), 7.87 (d, J = 8.1 Hz, 1H), 7.57 (s, 1H), 7.44 (t, J = 8.7 Hz, 2H), 7.42 (s, 1H), 6.67 (d, J = 8.7 Hz, 2H), 5.82 (d, J = 8.2 Hz, 1H), 4.11 (s, 3H), 4.02 (s, 2H), 3.91-3.86 (m, 2H), 3.52-3.47 (m, 1H), 3.44 (td, J = 11.5, 2.1 Hz, 3H), 1.90 (d, J = 13.3 Hz, 2H), 1.43-1.35 (m, 2H). | 468.76 (M + H)⁺ |
| 73 | ¹H NMR (500 MHz, DMSO-d6, ppm) δ 13.06 (s, 1H), 8.09 (s, 1H), 8.01 (s, 1H), 7.88 (d, J = 8.6 Hz, 1H), 7.58-7.51 (m, 3H), 7.49 (s, 1H), 6.89 (d, J = 8.8 Hz, 2H), 4.12 (s, 3H), 4.03 (s, 2H), 3.94 (d, J = 10.1 Hz, 3H), 3.48 (t, J = 11.0 Hz, 2H), 2.78 (s, 3H), 1.77 (ddd, J = 16.1, 12.3, 4.5 Hz, 2H), 1.59 (d, J = 10.1 Hz, 2H). | 482.39 (M + H)⁺ |
| 74 | ¹H NMR (500 MHz, DMSO-d6, ppm): d 12.65 (s, 1H), 9.31 (s, 1H), 7.68-7.66 (m, 3H), 7.35 (d, J = 8.5 Hz, 2H), 7.00 (s, 1H), 6.86 (dd, J = 2.0, 8.0 Hz, 1H), 6.72 (d, J = 8.0 Hz, 1H), 3.84 (s, 2H), 3.59-3.57 (m, 4H), 3.48 (s, 2H), 2.37-2.36 (m, 4H). | 482.77 (M + H)⁺ 445.33 [M-(CH) + H⁺] |
| 75 | ¹H NMR (500 MHz, DMSO-d6, ppm) δ 13.11 (s, 1H), 8.09 (s, 1H), 8.01 (s, 1H), 7.89 (d, J = 8.3 Hz, 1H), 7.73 (s, 1H), 7.69 (d, J = 8.2 Hz, 2H), 7.57 (d, J = 7.5 Hz, 1H), 7.38 (d, J = 8.2 Hz, 2H), 4.12 (s, 3H), 4.08 (s, 2H), 3.99 (d, J = 13.7 Hz, 1H), 3.65 (dd, J = 11.2, 3.2 Hz, 2H), 3.49-3.42 (m, 1H), 3.20-3.14 (m, 2H), 2.16-2.09 (m, 1H), 1.04 (d, J = 6.2 Hz, 3H). | 482.93 (M + H)⁺ |
| 76 | ¹H NMR (600 MHz, DMSO-d6, ppm) δ 13.11 (s, 1H), 8.09 (s, 1H), 8.01 (s, 1H), 7.89 (d, J = 8.3 Hz, 1H), 7.74 (s, 1H), 7.70 (d, J = 8.2 Hz, 2H), 7.57 (d, J = 8.6 Hz, 1H), 7.30 (d, J = 8.3 Hz, 2H), 6.36 (s, 1H), 4.12 (s, 3H), 4.08 (s, 2H), 3.70 (t, J = 5.5 Hz, 2H), 3.61 (t, J = 5.6 Hz, 2H), 2.37 (t, J = 5.0 Hz, 2H). | 465.17 (M + H)⁺ |
| 77 | ¹H NMR (600 MHz, DMSO-d6, ppm) δ 13.10 (s, 1H), 8.09 (s, 1H), 8.01 (s, 1H), 7.89 (d, J = 8.4 Hz, 1H), 7.70 (s, 1H), 7.65 (d, J = 8.1 Hz, 2H), 7.57 (d, J = 8.1 Hz, 1H), 4.11 (s, 3H), 4.07 (s, 2H), 3.83 (dd, J = 11.4, 2.6 Hz, 2H), 3.25 (td, J = 11.7, 1.9 Hz, 2H), 2.55 (d, J = 7.1 Hz, 2H), 1.78-1.74 (m, 1H), 1.51 (d, J = 13.0 Hz, 2H), 1.26-1.19 (m, 2H). | 467.19 (M + H)⁺ |
| 78 | ¹H NMR (600 MHz, DMSO-d6, ppm) δ 12.9 (s, 1H), 8.07 (s, 1H), 7.97 (s, 1H), 7.86 (d, J = 8.4 Hz, 1H), 7.53 (d, J = 8.3 Hz, 1H), 6.45 (s, 1H), 4.09 (s, 3H), 3.89 (s, 2H), 3.78-3.73 (m, 4H), 3.13-3.09 (m, 4H). | 377.70 (M)⁺ |
| 79 | ¹H NMR (600 MHz, DMSO-d6, ppm) δ 13.0 (s, 1H), 8.08 (s, 1H), 7.98 (s, 1H), 7.86 (d, J = 8.2 Hz, 1H), 7.55 (d, J = 7.7 Hz, 1H), 7.05 (s, 1H), 4.34 (s, 2H), 4.10 (s, 3H), 4.09 4.06 (m, 2H), 3.99-3.95 (m, 4H). | 392.00 (M + H)⁺ |
| 80 | ¹H NMR (600 MHz, DMSO-d6, ppm) δ 13.11 (s, 1H), 8.09 (s, 1H), 8.01 (s, 1H), 7.88 (d, J = 8.4 Hz, 1H), 7.72 (s, 1H), 7.68 (d, J = 8.4 Hz, 2H), 7.56 (d, J = 8.4 Hz, 1H), 7.34 (d, J = 7.8 Hz, 2H), 4.11 (s, 3H), 4.07 (s, 2H), 3.56-3.54 (m, 4H), 3.46 (s, 2H), 2.86-2.84 (m, 2H), 2.44 (s br, 4H), 2.10-2.08 (m, 1H), 1.9 -1.91 (m, 2H), 1.74-1.72 (m, 2H), 1.39 (dq, J = 3.0, 12 Hz, 2H). | 550.89 (M)⁺ |
| 81 | ¹H NMR (600 MHz, DMSO-d6, ppm) δ 13.12 (s, 1H), 12.85 (s, 1H), 7.87-7.79 (m, 2H), 7.76-7.66 (m, 3H), 7.51 (d, J = 8.3 Hz, 1H), 7.38 (d, J = 8.0 Hz, 2H), 4.05 (d, J = 27.7 Hz, 2H), 3.60 (d, J = 4.1 Hz, 4H), 3.49 (s, 2H), 2.39 (dt, J = 3.7, 1.8 Hz, 4H). | 468.19 (M + H)⁺ |
| 82 | ¹H NMR (600 MHz, DMSO-d6, ppm) δ 13.11 (s, 1H), δ 8.52 (d, J = 2.2 Hz, 1H), 8.09 (s, 1H), δ 8.00 (s, 1H), 7.92-7.85 (m, 2H), 7.63 (s, 1H), δ 7.60 (d, J = 8.2 Hz, 1H), 6.93 (d, J = 8.8 Hz, 1H), 4.10 (s, 3H), 4.06 (s, 2H), 3.74-3.70 (m, 4H), 3.52-3.48 (m, 4H). | 454.92 (M)⁺ |
| 83 | ¹H NMR (600 MHz, DMSO-d6, ppm) δ 13.28 (s, 1H), 13.14 (s, 1H), 8.11 (s, 1H), 7.92 (s, 1H), 7.88 (d, J = 8.4 Hz, 1H), 7.71 (s, 1H), 7.67 (d, J = 8.4 Hz, 2H), 7.53 (d, J = 8.4 Hz, 1H), 7.33 (d, J = 8.4 Hz, 2H), 4.02 (s, 2H), 3.46 (s, 2H), 2.39-2.25 (s br, 8H), 2.14 (s, 3H). | 467.04 (M + H)⁺ |

TABLE 2-continued

| | ¹H NMR and Mass data | |
|---|---|---|
| 84 | ¹H NMR (600 MHz, DMSO-d6, ppm) δ 13.12 (s, 1H), 8.08 (s, 1H), 7.99 (s, 1H), 7.87 (d, J = 8.4 Hz, 1H), 7.72 (s, 1H), 7.67 (d, J = 7.8 Hz, 2H), 7.55 (d, J = 7.2 Hz, 1H), 7.34 (d, J = 8.4 Hz, 2H), 4.10 (s, 3H), 4.07 (s, 2H), 3.46 (s, 2H), 2.39-2.39 (br, 8H), 2.17 (s, 3H). | 481.01 (M)⁺ |
| 85 | ¹H NMR (600 MHz, DMSO-d⁶, ppm) δ 13.11 (s, 1H), δ 8.49 (d, J = 2.4 Hz, 1H), δ 8.09 (s, 1H), δ 8.00 (s, 1H), δ 7.89-7.85 (m, 2H), δ 7.61 (s, 1H), δ 7.55 (d, J = 8.4 Hz, 1H), δ 6.91 (d, J = 8.8 Hz, 1H), δ 4.11 (s, 3H), δ 4.05 (s, 2H), δ 3.56-3.52 (m, 4H), δ 2.42-2.39 (m, 4H), δ 2.22 (s, 3H). | 468.42 (M + H)⁺ |
| 86 | ¹H NMR (600 MHz, DMSO-d6, ppm) δ 13.22 (s, 1H), 8.41 (d, J = 5.3 Hz, 1H), 8.20 (s, 1H), 8.09 (s, 1H), 8.01 (s, 1H), 7.90-7.87 (m, 2H), 7.74 (dd, J = 5.3, 1.6 Hz, 1H), 7.56 (d, J = 8.9 Hz, 1H), 4.16 (s, 2H), 4.11 (s, 3H). | 404.19 (M + H)⁺ |
| 87 | ¹H NMR (600 MHz, MeOH-d4, ppm) δ 8.16 (d, J = 5.3 Hz, 1H), 8.02 (s, 1H), 7.86 (s, 1H), 7.85 (s, 1H), 7.78 (s, 1H), 7.54 (d, J = 8.6 Hz, 1H), δ 7.14 (s, 1H), 7.07-7.05 (m, 1H), 4.74-4.49 (m, 4H), 4.12 (s, 3H), 4.00 (s, 2H), 3.41-3.32 (m, 4H), 2.94 (s, 3H). | 468.26 (M + H)⁺ |
| 88 | ¹H NMR (600 MHz, DMSO-d6, ppm) δ 13.14 (s, 1H), 8.08 (s, 1H), 8.00 (s, 1H), 7.87 (d, J = 8.5 Hz, 1H), 7.81 (s, 1H), 7.67-7.64 (m, 1H), 7.55 (d, J = 8.0 Hz, 1H), 7.30-7.27 (m, 1H), 4.11 (s, 2H), 4.10 (s, 3H), 3.58-3.57 (m, 6H), 2.41 (s br, 4H); ¹⁹F NMR (471 MHz, DMSO-d6, ppm): d −141.0 (d), −142.5 (d). | 504.54 (M + H)⁺ |
| 89 | ¹H NMR (600 MHz, DMSO-d6, ppm) δ 13.23 (s, 1H), 8.19-8.12 (m, 2H), 7.83 (s, 1H), 7.74-7.67 (m, 3H), 7.37 (d, J = 8.1 Hz, 2H), 4.36 (s, 3H), 4.09 (s, 2H), 3.59-3.57 (m, 4H), 3.48 (s, 2H), 2.37 (s, 4H). | 469.16 (M + H)⁺ |
| 90 | ¹H NMR (600 MHz, DMSO-d6, ppm) δ 13.17 (s, 1H), 8.09 (s, 1H), 8.00 (s, 1H), 7.90-7.84 (m, 2H), 7.75 (dd, J = 8.1, 1.7 Hz, 1H), 7.66 (s, 1H), 7.63 (d, J = 8.1 Hz, 1H), 7.56 (d, J = 7.6 Hz, 1H), 4.11 (s, 3H), 4.09 (s, 2H), 3.61-3.57 (m, 4H), 3.55 (s, 2H), 2.40 (s, 4H). | 552.36 (M + H)⁺ |
| 91 | ¹H NMR (600 MHz, DMSO-d6, ppm) δ 13.11 (s, 1H), 8.08 (s, 1H), 8.00 (s, 1H), 7.88 (d, J = 8.3 Hz, 1H), 7.56 (d, J = 8.3 Hz, 1H), 7.41 (d, J = 7.8 Hz, 1H), 7.37 (s, 1H), 7.27 (s, 1H), 7.21 (d, J = 8.5 Hz, 1H), 4.10 (s, 3H), 4.07 (s, 2H), 3.58 (t, J = 4.5 Hz, 4H), 3.45 (s, 2H), 2.46 (s, 3H), 2.37 (s, 4H). | 482.24 (M + H)⁺ |
| 92 | ¹H NMR (600 MHz, DMSO-d6, ppm) δ 13.07 (s, 1H), 8.28 (d, J = 2.4 Hz, 1H), 8.08 (s, 1H), 7.99 (s, 1H), 7.87 (d, J = 8.4 Hz, 1H), 7.72 (dd, J = 2.4, 8.4 Hz, 1H), 7.56 (d, J = 7.2 Hz, 1H), 7.49 (s, 1H), 6.51 (d, J = 8.4 Hz, 1H), 6.19 (s, 2H), 4.10 (s, 3H), 4.03 (s, 2H). | 385.20 (M + H)⁺ |
| 93 | ¹H NMR (600 MHz, DMSO-d6, ppm) δ 13.06 (s, 1H), 8.09 (s, 1H), 8.00 (s, 1H), 7.88 (d, J = 8.4 Hz, 1H), 7.62 (d, J = 5.0 Hz, 1H), 7.56 (dd, J = 8.4, 1.0 Hz, 1H), 7.32 (d, J = 5.0 Hz, 1H), 4.11 (s, 3H), 4.03 (s, 2H). | 427.25 (M + H)⁺ |
| 94 | ¹H NMR (600 MHz, DMSO-d6, ppm) δ 13.12 (s, 1H), 8.09 (s, 1H), 8.01 (s, 1H), 7.88 (d, J = 8.4 Hz, 1H), 7.72 (s, 1H), 7.68 (d, J = 8.4 Hz, 2H), 7.56 (d, J = 7.8 Hz, 1H), 7.35 (d, J = 7.8 Hz, 2H), 4.11 (s, 3H), 4.07 (s, 2H), 3.41 (s, 2H), 2.16 (s, 6H). | 426.29 (M + H)⁺ |
| 95 | ¹H NMR (600 MHz, DMSO-d6, ppm) δ 13.14 (s, 1H), 8.45 (s, 1H), 8.10 (s, 1H), 8.03 (s, 1H), 8.01 (d, J = 8.1 Hz, 2H), 7.89 (d, J = 8.1 Hz, 1H), 7.77 (d, J = 8.2 Hz, 1H), 7.57 (d, J = 8.2 Hz, 1H), 4.12 (d, J = 3.1 Hz, 3H), 4.10 (s, 2H), 3.61-3.58 (m, 4H), 3.52 (s, 2H), 2.40-2.38 (m, 4H). | 469.65 (M + H)⁺ |
| 96 | ¹H NMR (600 MHz, DMSO-d6, ppm) δ 13.03 (s, 1H), 8.08 (s, 1H), 7.99 (s, 1H), 7.86 (d, J = 8.5 Hz, 1H), 7.54 (d, J = 8.0 Hz, 1H), 7.13 (s, 1H), 4.10 (s, 3H), 3.98 (s, 2H), 3.21 (tt, J = 3.5, 12 Hz, 2H), 3.01 (td, J = 2.5, 12.5 Hz, 2H), 2.16 (d, J = 13 Hz, 2H), 1.84 (qd, J = 3.5, 12.5 Hz, 2H). | 376.06 (M + H)⁺ |
| 97 | ¹H NMR (600 MHz, DMSO-d6, ppm) δ 13.10 (s, 1H), 8.08 (s, 1H), 8.00 (s, 1H), 7.88 (d, J = 8.5 Hz, 1H), 7.71 (s, 1H), 7.68 (d, J = 8.0 Hz, 2H), 7.56 (d, J = 8.5 Hz, 1H), 7.38 (d, J = 8.0 Hz, 2H), 4.11 (s, 3H), 4.07 (s, 2H), 3.71 (t, J = 6.0 Hz, 2H), 3.64 (s, 2H), 3.63-3.61 (m, 2H), 2.65-2.61 (m, 4H), 1.82 (q, J = 6.0 Hz, 2H). | 482.19 (M + H)⁺ |

TABLE 2-continued

¹H NMR and Mass data

| | | |
|---|---|---|
| 98 | ¹H NMR (600 MHz, DMSO-d6, ppm) δ 13.01 (s, 1H), 8.08 (s, 1H), 7.98 (s, 1H), 7.86 (d, J = 8.4 Hz, 1H), 7.53 (d, J = 8.4 Hz, 1H), 7.11 (s, 1H), 4.10 (s, 3H), 3.96 (s, 2H), 3.59 (s br, 4H), 3.18-3.11 (m, 4H), 3.05 (d, J = 13.2 Hz, 2H), 2.71-2.67 (m, 2H), 2.41-2.40 (m, 4H), 2.07-2.02 (m, 2H), 1.68-1.65 (m, 1H), 1.47-1.44 (m, 1H). | 503.42 $(M + H)^+$ |
| 99 | ¹H NMR (600 MHz, DMSO-d6, ppm) δ 13.13 (s, 1H), 8.09 (s, 2H), 8.01 (s, 1H), 7.88 (d, J = 8.2 Hz, 1H), 7.70 (d, J = 3.0 Hz, 1H), 7.68 (d, J = 8.2 Hz, 2H), 7.58 (d, J = 8.3 Hz, 1H), 7.37 (d, J = 8.3 Hz, 2H), 4.11 (s, 3H), 4.08 (s, 2H), 3.60 (s, 2H), 2.46 (s, 4H), 1.72 (dd, J = 6.7, 3.3 Hz, 4H). | 452.19 $(M + H)^+$ |
| 100 | ¹H NMR (600 MHz, DMSO-d6, ppm) δ 13.10 (s br, 1H), 8.08 (s, 1H), 8.00 (s, 1H), 7.87 (d, J = 8.0 Hz, 1H), 7.69 (s, 1H), 7.67 (d, J = 8.0 Hz, 2H), 7.57 (d, J = 8.5 Hz, 1H), 7.34 (d, J = 8.0 Hz, 2H), 4.11 (s, 3H), 4.07 (s, 2H), 2.34 (s br, 4H), 1.53-1.48 (m, 4H), 1.39 (s br, 2H). | 466.09 $(M + H)^+$ |
| 101 | ¹H NMR (600 MHz, DMSO-d6, ppm) δ 13.36-12.95 (br, 1H), δ 8.08 (s, 1H), δ 8.01 (s, 1H), δ 7.87 (d, J = 8.3 Hz, 1H), δ 7.75-7.69 (m, 3H), δ 7.60-7.54 (m, 1H), δ 7.32 (d, J = 8.0 Hz, 2H), δ 4.53 (s, 2H), δ 4.11 (s, 3H), δ 4.08 (s, 2H), δ 3.31 (s, 3H), δ 3.19 (t, J = 5.2 Hz, 2H), δ 2.87 (t, J = 5.2 Hz, 2H). | 481.20 $(M + H)^+$ |
| 102 | ¹H NMR (600 MHz, DMSO-d6, ppm) δ 13.12 (s, 1H), 8.09 (s, 1H), 8.01 (s, 1H), 7.88 (d, J = 8.3 Hz, 1H), 7.71 (s, 1H), 7.67 (d, J = 8.2 Hz, 2H), 7.58 (s, 1H), 7.30 (d, J = 8.2 Hz, 2H), 4.62 (s, 4H), 4.12 (s, 3H), 4.08 (s, 2H), 3.51 (s, 2H), 3.30 (s, 4H). | 480.92 $(M + H)^+$ |
| 103 | ¹H NMR (600 MHz, DMSO-d6, ppm) δ 13.12 (s, 1H), 8.09 (s, 1H), 8.01 (s, 1H), 7.88 (d, J = 8.4 Hz, 1H), 7.74-7.66 (m, 4H), 7.56 (d, J = 7.8 Hz, 1H), 7.33 (d, J = 7.8 Hz, 1H), 4.11 (s, 3H), 4.07 (s, 2H), 3.94-3.91 (m, 1H), 3.58 (s br, 1H), 3.19 (s br, 2H), 2.99-2.95 (m, 1H), 2.04-1.99 (m, 1H). | 438.3 $(M + H)^+$ |
| 104 | ¹H NMR (500 MHz, DMSO-d6, ppm) δ 13.10 (s, 1H), 8.08 (s, 1H), 8.00 (s, 1H), 7.88 (d, J = 8.0 Hz, 1H), 7.73 (s, 1H), 7.69 (d, J = 8.5 Hz, 2H), 7.56 (d, J = 8.0 Hz, 1H), 7.36 (d, J = 8.0 Hz, 2H), 4.11 (s, 3H), 4.07 (s, 2H), 3.74 (s, 2H), 3.62 (t, J = 12.5 Hz, 4H); ¹⁹F NMR (471 MHz, CDCl₃, ppm) δ −97.5. | 474.29 $(M + H)^+$ |
| 105 | ¹H NMR (500 MHz, DMSO-d6, ppm) δ 13.10 (s, 1H), 8.08 (s, 1H), 8.00 (s, 1H), 7.88 (d, J = 9.0 Hz, 1H), 7.71 (s, 1H), 7.67-7.64 (m, 3H), 7.56 (d, J = 8.4 Hz, 1H), 7.32-7.31 (m, 2H), 4.11 (s, 3H), 4.07 (s, 2H), 3.59 (s, 2H), 3.50-3.48 (m, 2H), 3.25 (m, 2H), 2.86-2.85 (m, 2H). | 468.28 $(M + H)^+$ |

Example 2: Evaluation of Inhibition Activities of Compounds of Formula (I) in In Vitro Biochemical Assays Various compounds of Formula I were tested for their inhibition activities against a variety of receptor tyrosine kinases. Brief descriptions of different assays are described below.

FLT3 Kinase Assay

Inhibition of FLT3 kinase activity by a test compound disclosed herein was estimated by AlphaScreen (PerkinElmer, Akron, Ohio, USA). Standard assay conditions were 1.5 ng of recombinant FLT3 kinase (SignalChem, Richmond, BC, Canada) with 6 ng Biotin-conjugated Poly-(Glu 4: Tyr 1) (Cisbio, Bedford, MA, USA) in the assay buffer (10 µM ATP, 10 mM MOPs, pH7.0, 0.21 mM EDTA, 0.5% glycerol, 1 mg/mL BSA, 0.01% 2-mercaptoethanol, 0.001% Brij35, 10 mM MgCl₂) in a final volume of 25 µL. Reactions were incubated at 30° C. for 30 min and stopped by adding 5 µL of 50 mM EDTA. Analysis of resulting product using an AlphaScreen kit and counted with Enspire Alpha (PerkinElmer, Waltham, MA, USA). The readout from control reaction (complete reaction mixture) was designated as 0% inhibition and the readout for the reaction without enzyme as 100% inhibition. The IC50 values of inhibitors were determined after carrying out assays with each compound at serially diluted concentrations in duplication. The results were analyzed using linear regression software (GraphPad Prism 5; GraphPad Software Inc.)

FLT3-D835Y Mutant Kinase Assay

Inhibition of FLT3-D835Y mutant kinase activity by a test compound disclosed herein was estimated by AlphaScreen (PerkinElmer). Standard assay conditions were 1 ng of recombinant FLT3-D835Y mutant kinase (SignalChem) with 6 ng Biotin-conjugated Poly-(Glu 4: Tyr 1) (Cisbio) in the assay buffer (10 µM ATP, 10 mM MOPs, pH7.0, 0.21 mM EDTA, 0.5% glycerol, 1 mg/mL BSA, 0.01% 2-mercaptoethanol, 0.001% Brij35, 10 mM MgCl₂) in a final volume of 25 µL. Reactions were incubated at 30° C. for 30 min and stopped by adding 5 µL of 50 mM EDTA. Analysis of resulting product using an AlphaScreen kit and counted with Enspire Alpha (PerkinElmer). The readout from control reaction (complete reaction mixture) was designated as 0% inhibition and the readout for the reaction without enzyme as 100% inhibition. The $IC_{50}$ values of inhibitors were determined after carrying out assays with each compound at serially diluted concentrations in duplication. The results were analyzed using linear regression software (GraphPad Prism 5; GraphPad Software Inc.)

PDGFRα Kinase Assay

Inhibition of PDGFRα kinase activity by a test compound disclosed herein was estimated by AlphaScreen (PerkinElmer). Standard assay conditions were 1.5 ng of recombinant PDGFRα kinase (SignalChem) with 6 ng Biotin-conjugated Poly-(Glu 4: Tyr 1) (Cisbio) in the assay buffer (10 µM ATP, 10 mM MOPs, pH 7.0, 0.21 mM EDTA, 0.5% glycerol, 1 mg/mL BSA, 0.01% 2-mercaptoethanol, 0.001% Brij35, 10 mM $MgCl_2$) in a final volume of 25 µL. Reactions were incubated at 30° C. for 30 min and stopped by adding 5 g L of 50 mM EDTA. Analysis of resulting product using an AlphaScreen kit and counted with Enspire Alpha (PerkinElmer). The readout from control reaction (complete reaction mixture) was designated as 0% inhibition and the readout for the reaction without enzyme as 100% inhibition. The $IC_{50}$ values of inhibitors were determined after carrying out assays with each compound at serially diluted concentrations in duplication. The results were analyzed using linear regression software (GraphPad Prism 5; GraphPad Software Inc.)

MET Kinase Assay

The compounds disclosed herein were tested in the inhibition of MET kinase activity estimated by AlphaScreen (PerkinElmer) as counter screen (comparison) to demonstrate their selective kinase inhibition activity against Class III RTKs. Because MET kinase belonged to Class VIII RTK family have one transmembrane a chain linked with one extracellular β chain which is different form Class III RTK family with 5 Immunoglobin-like extracellular domains. Standard assay conditions were 1 ng of recombinant MET kinase (SignalChem) with 3 ng Biotin-conjugated Poly-(Glu 4: Tyr 1) (Cisbio) in the assay buffer (10 M ATP, 10 mM MOPs, pH 7.0, 0.21 mM EDTA, 0.5% glycerol, 1 mg/mL BSA, 0.01% 2-mercaptoethanol, 0.001% Brij35, 10 mM $MgCl_2$) in a final volume of 25 µL. Reactions were incubated at 30° C. for 45 min and stopped by adding 5 µL of 50 mM EDTA. Analysis of resulting product using an AlphaScreen kit and counted with Enspire Alpha (PerkinElmer). The readout from control reaction (complete reaction mixture) was designated as 0% inhibition and the readout for the reaction without enzyme as 100% inhibition. The IC50 values of inhibitors were determined after carrying out assays with each compound at serially diluted concentrations in duplication. The results were analyzed using linear regression software (GraphPad Prism 5; GraphPad Software Inc.)

Results

In comparison with MET kinase inhibition activity, the compounds of the invention were found to have unexpected and selective inhibition activities for Class III RTKs. More specifically, all compounds of the invention show the $IC_{50}$ values below 10 nM for FLT3 kinase as well as FLT3-D835Y mutant kinase, and 57 of 105 compounds of the invention show the $IC_{50}$ values below 10 nM for PDGFR kinase, demonstrating the high potencies of compounds of the invention for class III RTKs. The $IC_{50}$ values for compounds of the invention against FLT3, FLT3-D835Y mutant, PDGFRα, and Met kinases are summarized in Table 3. In the table, the symbol "A+" means $IC_{50}$ less than 1 nM, "A" means $IC_{50}$ is between 1-10 nM, "B" means $IC_{50}$ is between 10-30 nM, "C" means $IC_{50}$ is between 30-100 nM, "D" means $IC_{50}$ is between 100-300 nM, "E" means $IC_{50}$ is between 300-1000 nM, and "F" means $IC_{50}$ is greater than 1,000 nM.

TABLE 3

Ranking of $IC_{50}$ values for individual Receptor Tyrosine kinases

| Compound No. | FLT3 | FLT3-D835Y | PDGFRα | MET |
|---|---|---|---|---|
| 1 | A | A+ | B | F |
| 2 | A | A+ | B | F |
| 3 | A+ | A+ | A | F |
| 4 | A | A+ | B | F |
| 5 | A | A | B | F |
| 6 | A+ | A+ | A | F |
| 7 | A | A | A | F |
| 8 | A+ | A | A | F |
| 9 | A+ | A+ | A | F |
| 10 | A+ | A+ | A | F |
| 11 | A | A+ | B | F |
| 12 | A | A | C | F |
| 13 | A | A | B | F |
| 14 | A | A | B | F |
| 15 | A+ | A+ | A | F |
| 16 | A+ | A+ | A | F |
| 17 | A | A | B | F |
| 18 | A+ | A | A | F |
| 19 | A | A | A | F |
| 20 | A | A | A | F |
| 21 | A+ | A+ | A | F |
| 22 | A+ | A | B | F |
| 23 | A+ | A+ | A | F |
| 24 | A+ | A+ | A | F |
| 25 | A | A | A | F |
| 26 | A | A | B | F |
| 27 | A | A | D | F |
| 28 | A | A | B | F |
| 29 | A+ | A+ | B | F |
| 30 | A+ | A+ | A | F |
| 31 | A+ | A+ | D | F |
| 32 | A+ | A+ | B | F |
| 33 | A+ | A+ | A | F |
| 34 | A | A | C | F |
| 35 | A | A | C | F |
| 36 | A | A+ | A | F |
| 37 | A | A | A | F |
| 38 | A | A | B | F |
| 39 | A | A | B | F |
| 40 | A | A+ | A | F |
| 41 | A+ | A | B | F |
| 42 | A+ | A | B | F |
| 43 | A | A | A | F |
| 44 | A+ | A+ | A | F |
| 45 | A+ | A+ | B | F |
| 46 | A+ | A+ | A | F |
| 47 | A+ | A+ | A | F |
| 48 | A+ | A+ | A | F |
| 49 | A+ | A+ | A | F |
| 50 | A+ | A+ | B | F |
| 51 | A+ | A+ | B | F |
| 52 | A+ | A+ | B | F |
| 53 | A+ | A | C | F |
| 54 | A+ | A+ | A | F |
| 55 | A+ | A+ | A | F |
| 56 | A | A | A | F |
| 57 | A+ | A+ | B | F |
| 58 | A | A | C | F |
| 59 | A+ | A+ | A | F |

TABLE 3-continued

Ranking of IC$_{50}$ values for individual Receptor Tyrosine kinases

| Compound No. | FLT3 | FLT3-D835Y | PDGFRα | MET |
|---|---|---|---|---|
| 60 | A+ | A+ | A | F |
| 61 | A | A+ | A | F |
| 62 | A | A+ | B | F |
| 63 | A | A | A | F |
| 64 | A | A | B | F |
| 65 | A | A+ | A | F |
| 66 | A+ | A+ | F | F |
| 67 | A | A | B | F |
| 68 | A | A | A | F |
| 69 | A+ | A+ | B | F |
| 70 | A | A+ | B | F |
| 71 | A | A+ | C | F |
| 72 | A | A | B | F |
| 73 | A | A | C | F |
| 74 | A+ | A+ | A | F |
| 75 | A+ | A+ | A | F |
| 76 | A | A | D | F |
| 77 | A | A | C | F |
| 78 | A+ | A+ | A | F |
| 79 | A+ | A+ | A | F |
| 80 | A+ | A+ | A | E |
| 81 | A | A | A | F |
| 82 | A | A | D | F |
| 83 | A+ | A+ | A | E |
| 84 | A+ | A+ | A | F |
| 85 | A+ | A+ | A | E |
| 86 | A | A | B | F |
| 87 | A+ | A+ | A | E |
| 88 | A | A | C | F |
| 89 | A | A | A | F |
| 90 | A | A | D | F |
| 91 | A | A | C | F |
| 92 | A+ | A+ | A | F |
| 93 | A | A | D | F |
| 94 | A+ | A | A | E |
| 95 | A+ | A+ | A | F |
| 96 | A+ | A+ | A | F |
| 97 | A+ | A+ | C | F |
| 98 | A+ | A+ | A | F |
| 99 | A+ | A+ | A | F |
| 100 | A+ | A+ | A | D |
| 101 | A+ | A+ | A | F |
| 102 | A+ | A+ | A | E |
| 103 | A+ | A+ | A | E |
| 104 | A | A | C | F |
| 105 | A+ | A+ | A | E |

Example 3: Evaluation of Anti-Proliferative Activity of Compounds of Formula (I) Against Panel of Human Cancer Cell Lines with Different Signaling Dependency As noted above, compounds of the invention may be used to treat protein kinase-related diseases or disorders. The protein kinase-related disease may be cancer, an autoimmune disease, or a blood vessel proliferative disorder. The cancer may be lung cancer, colon cancer, colorectal cancer, breast cancer, prostate cancer, liver cancer, pancreatic cancer, bladder cancer, gastric cancer, renal cancer, salivary gland cancer, ovarian cancer, uterine body cancer, cervical cancer, oral cancer, skin cancer, brain cancer, lymphoma, or leukemia.

Inhibitions of cell growths by compounds were measured using CellTiter™-96 assay. The cytotoxicities of compounds of the invention were evaluated in cell line panels with different signaling pathway dependencies, including MV4-11 human acute myeloid leukemia cell with FLT3-ITD mutation, Molm-14 human acute myeloid leukemia cell with FLT3-ITD mutation, THP-1 human acute monocytic leukemia cell with NRAS G12D mutation, A375 melanoma cell with BRAF V600E mutation, and HCC827 NSCLC cell with EGFR exon 19 deletion mutation.

MV4-11 Cell Culture

The compounds disclosed herein were tested in MV4-11 cell proliferation assay to determine their cellular potencies against FLT3 signal pathway dependent cell growths. MV4-11 cells are human acute myeloid leukemia (AML) cells harboring ligand-independent FLT3-ITD activating mutation, which renders the abnormal proliferation of AML cells FLT3 signaling pathway dependent. Inhibition of FLT3 kinase activity will result in reduced growths and/or cell deaths. MV4-11 cells (catalog #CRL-9591) were obtained from the American Type Culture Collection (ATCC, Manassas, VA). Briefly, cells were grown in IMDM medium supplemented with 10% heat inactivated fetal bovine serum and incubated at 37° C. in 5% CO$_2$ atmosphere. Cells were allowed to expand until reaching saturation, at which point they were sub-cultured or harvested for assay use.

Molm-14 Cell Culture

The compounds disclosed herein were tested in Molm-14 cell proliferation assay to determine their cellular potencies against FLT3 signal pathway dependent cell growths. Molm-14 cells are human acute myeloid leukemia (AML) cells harboring ligand-independent FLT3-ITD activating mutation, which renders the abnormal proliferation of the AML cells FLT3 signaling pathway dependent. Inhibition of FLT3 kinase activity will result in reduced growths and/or cell deaths. Molm-14 cells (catalog #ACC-777) were obtained from the Deutsche Sammlung von Mikroorganismen und Zellkulturen (DSMZ, Braunschweig, Germany). Briefly, cells were grown in RPMI 1640 medium supplemented with 10% heat inactivated fetal bovine serum and incubated at 37° C. in 5% CO$_2$ atmosphere. Cells were allowed to expand until reaching saturation, at which point they were sub-cultured or harvested for assay use.

THP-1 Cell Culture

The compounds disclosed herein were tested in THP-1 cell proliferation assay as counter screen (comparison) to demonstrate their selective anti-proliferative activities for cell growths that rely on class III RTKs signaling. THP-1 cells are human acute monocytic leukemia cells with NRAS G12D mutation, which renders the cell growth independent of class III RTKs signaling. THP-1 cells (catalog #TIB-202) were obtained from the ATCC. Briefly, cells were grown in RPMI 1640 medium supplemented with 10% heat inactivated fetal bovine serum and 0.05 mM 2-mercaptoethanol and incubated at 37° C. in 5% CO$_2$ atmosphere. Cells were allowed to expand until reaching saturation, at which point they were sub-cultured or harvested for assay use.

A375 Cell Culture

The compounds disclosed herein were tested in A375 cell proliferation assay as counter screen to demonstrate their selective anti-proliferative activities for cell growths that rely on class III RTKs signaling. A375 cells are melanoma cells encoding BRFA V600E mutation, which renders the cell growth dependent on BRAF signaling instead of class III RTKs signaling. A375 cells (catalog #CRL-1619) were obtained from the ATCC. Briefly, cells were cultured in DMEM containing 10% FBS and incubated at 37° C. in 5% $CO_2$ atmosphere. Cells were allowed to expand until reaching saturation, at which point they were sub-cultured or harvested for assay use.

HCC827 Cell Culture

The compounds disclosed herein were tested in HCC827 cell proliferation assay as counter screen to demonstrate their selective anti-proliferative activities for cell growths that rely on class III RTKs signaling. HCC827 cells are non-small cell lung carcinoma (NSCLC) cells encoding EGFR exon 19 deletion mutation, which renders the cell growth dependent on EGFR signaling instead of class III RTKs signaling. HCC827 cells (catalog #CRL-2868) were obtained from the ATCC. Briefly, cells were cultured in RPMI1640 medium supplemented with 10% FBS and incubated at 37° C. in 5% $CO_2$ atmosphere. Cells were allowed to expand until reaching saturation, at which point they were sub-cultured or harvested for assay use.

MV4-11, Molm-14, THP-1, A375, and HCC827 cells were seeded into 96-well plates at 6500, 25000, 5000, 2000 and 8000 cells/well, respectively, and incubated at 37° C., 5% $CO_2$ overnight. Then, these seeded cells were treated with increasing concentrations of the test compounds and incubated for another 72 hours. At the end of the incubation, CellTiter96® AQueous One Solution Reagent (Promega, San Luis Obispo, CA, USA) was added and incubated for the additional 2~4 hours. Cell viability was determined by measuring absorbance at 490 nm using EMax® microplate reader (Molecular Devices, San Jose, CA, USA).

Results

In comparison with the anti-proliferation activity in THP-1, A375, or HCC827 cell, the compounds of the invention exhibited unexpected and selective cytotoxicities to cell growths that rely on Class III RTK signaling. More specifically, 68 compounds of the invention show the $IC_{50}$ values below 30 nM for leukemia cell growths with FLT3 signaling dependency, demonstrating high cellular potencies of compounds of the invention.

The 50% inhibitory concentration ($IC_{50}$) values were calculated by plotting the percentages of growth inhibition against the concentrations of compound, using GraphPad Prism 5 software for curve fitting. The anti-proliferative activities of compounds of the invention are summarized in Table 4. In the table, the symbol "A" represents that $IC_{50}$ less than 0.03 µM, "B" represents that $IC_{50}$ is between 0.03-0.1 µM, "C" represents that $IC_{50}$ is between 0.1-0.3 µM, "D" represents that $IC_{50}$ is between 0.3-1 µM, "E" represents that $IC_{50}$ is between 1-10 µM, and "F" represents that $IC_{50}$ is higher than 10 µM.

TABLE 4

Ranking of anti-proliferation activity against a cell line panel

| Compound No. | MV4-11 (FLT3-ITD) | Molm-14 (FLT3-ITD) | THP-1 $NRAS^{N12D}$ | A375 $BRAF^{V600E}$ | HCC827 $EGFR^{Exon19\_del}$ |
|---|---|---|---|---|---|
| 1 | B | B | F | F | F |
| 2 | B | B | F | F | F |
| 3 | A | A | F | F | F |
| 4 | C | C | F | F | F |
| 5 | B | C | F | F | F |
| 6 | A | A | F | F | F |
| 7 | A | A | F | F | F |
| 8 | A | B | F | F | F |
| 9 | A | A | F | F | F |
| 10 | A | A | F | F | F |
| 11 | A | B | F | F | F |
| 12 | B | C | F | F | F |
| 13 | B | B | F | F | F |
| 14 | A | B | F | E | F |
| 15 | A | A | F | F | F |
| 16 | A | A | F | F | F |
| 17 | A | B | F | F | F |
| 18 | A | A | F | F | F |
| 19 | A | A | F | F | F |
| 20 | A | B | F | F | F |
| 21 | A | A | F | F | F |
| 22 | A | B | F | F | F |
| 23 | A | B | F | F | F |
| 24 | A | B | F | F | F |
| 25 | A | B | F | F | F |
| 26 | C | C | F | F | F |
| 27 | D | E | F | F | F |
| 28 | B | B | F | F | F |
| 29 | A | B | F | F | F |
| 30 | B | B | F | F | F |
| 31 | A | A | E | E | E |
| 32 | B | C | F | F | F |
| 33 | B | B | F | F | F |
| 34 | B | B | F | F | F |
| 35 | C | C | E | F | F |
| 36 | A | B | F | F | F |
| 37 | A | B | F | F | F |
| 38 | A | B | F | F | F |
| 39 | B | B | F | F | F |
| 40 | A | A | E | E | E |
| 41 | A | A | F | F | F |

TABLE 4-continued

Ranking of anti-proliferation activity against a cell line panel

| Compound No. | MV4-11 (FLT3-ITD) | Molm-14 (FLT3-ITD) | THP-1 NRAS$^{N12D}$ | A375 BRAF$^{V600E}$ | HCC827 EGFR$^{Exon19\_del}$ |
|---|---|---|---|---|---|
| 42 | B | C | F | F | F |
| 43 | B | B | F | F | F |
| 44 | A | A | F | F | F |
| 45 | A | A | F | F | F |
| 46 | A | A | F | F | F |
| 47 | A | A | F | F | F |
| 48 | A | A | F | F | F |
| 49 | A | A | F | F | F |
| 50 | A | B | F | F | F |
| 51 | A | B | F | F | F |
| 52 | A | B | F | F | F |
| 53 | B | C | F | F | F |
| 54 | A | B | F | F | F |
| 55 | A | A | F | F | F |
| 56 | A | B | F | F | F |
| 57 | A | A | F | F | F |
| 58 | B | C | F | F | F |
| 59 | A | A | F | F | F |
| 60 | A | A | E | E | E |
| 61 | A | A | F | F | F |
| 62 | A | B | F | F | F |
| 63 | A | A | F | F | F |
| 64 | A | A | F | F | F |
| 65 | A | A | F | F | F |
| 66 | A | A | F | F | F |
| 67 | C | C | F | F | F |
| 69 | A | B | F | F | F |
| 70 | B | C | F | F | F |
| 71 | A | B | E | E | F |
| 72 | B | C | F | F | F |
| 73 | C | D | F | F | F |
| 74 | A | B | F | F | F |
| 75 | A | B | F | F | F |
| 76 | D | D | F | F | F |
| 77 | C | C | E | E | F |
| 78 | A | A | F | E | F |
| 79 | A | A | F | E | E |
| 80 | A | A | F | F | F |
| 81 | C | D | E | E | F |
| 82 | C | D | F | E | F |
| 83 | A | A | F | F | F |
| 84 | A | A | F | F | F |
| 85 | A | D | F | E | F |
| 86 | B | C | F | F | F |
| 87 | B | D | F | F | F |
| 88 | D | D | F | F | F |
| 89 | B | B | F | F | F |
| 90 | D | D | F | F | F |
| 91 | C | C | E | F | F |
| 92 | A | A | E | E | F |
| 93 | B | C | F | F | F |
| 94 | A | A | E | E | E |
| 95 | A | A | F | F | F |
| 96 | A | A | D | E | E |
| 97 | A | A | E | E | F |
| 98 | A | A | D | E | F |
| 99 | A | A | E | F | F |
| 100 | A | A | E | F | F |
| 101 | A | A | F | F | F |
| 102 | B | A | F | F | F |
| 103 | A | B | F | F | F |
| 104 | B | C | E | E | F |
| 105 | A | A | F | F | F |

Data in the Table 4 clearly indicates that compounds of the invention have unexpected and selective anti-proliferation activities for cancer cell growths that rely on the Class III RTK signaling pathway. Therefore, these compounds may be used in the treatments of protein kinase-related diseases, such as a disease or disorder mediated by FLT3, PDGFR, c-KIT, and/or CSF-1R kinases, or mediated by a mutant kinase of FLT3, PDGFR, c-KIT, and/or CSF-1R kinases. A method in accordance with one embodiment of the invention comprises administering to a subject in need thereof an effective amount of a compound of the invention.

Example 4: Identify Heterocyclic Pyrazole Derivatives Conjugated 6,5-Fused Bicyclic Heteroaryl at 5 or 6 Position with 2 Position as a Nitrogen Atom (Formula I) Exhibiting an Unexpected and Superior Potency Against FLT3 Kinase as Well as its Mutant

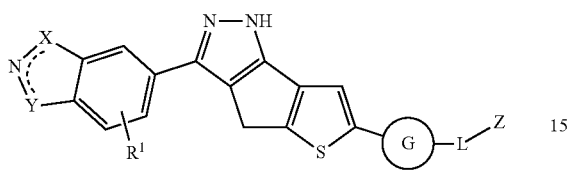

Formula (I)

As shown in Table 5, Compound 1 and Compound 2 are almost identical in structure to Examples A to G, respectively, except that 6,5-fused bicyclic heteroaryl rings in Compound 1 and Compound 2 each contain 2 nitrogen atoms at 2 positions, as compared to Example A to G.

TABLE 5

Comparison of in vitro potency of the inventive compounds of formula (I) with the similar compounds

| Example | Structure | Biochemical activity (Mean IC$_{50}$, nM) | |
| --- | --- | --- | --- |
| | | FLT3 | FLT3-D835Y |
| Example A | | 4 | 6 |
| Example B | | 64 | 80 |
| Example C | | 13 | 7 |
| Example D | | 24 | 17 |

TABLE 5-continued

Comparison of in vitro potency of the inventive compounds of formula (I) with the similar compounds

| Example | Structure | Biochemical activity (Mean IC$_{50}$, nM) | |
|---|---|---|---|
| | | FLT3 | FLT3-D835Y |
| Example E | | 27 | 27 |
| Example F | | 30 | 48 |
| Example G | | 70 | 106 |
| Compound 1 | | 1.5 | 0.5 |
| Compound 2 | | 1.0 | 0.5 |

Unexpectedly, it was observed that Compound 1 and Compound 2 exhibited superior potencies, as compared to those of Examples A to G, in inhibiting FLT3 kinase as well as FLT3-D835Y mutant with approximately 5 folds or more better potencies. Base on the above results, the 6,5-fused bicyclic heteroaryl containing 2 nitrogen atoms at 2 positions is unexpected found to exhibit extremely potent inhibitory activities against FLT3 kinase and its mutants.

Example 5: Comparison of the Potency of a Compound of Formula (I) with a Structurally Close Compounds in the Prior Art The compounds of Example H to K were found or covered in the prior art (U.S. Pat. No. 8,853,207B2). Compound 40 and Compound 3 were selected to compare their in vitro potencies with the potencies of compounds Example H. Compound 1 and Compound 2 were selected to compare their in vitro potencies with the potencies of Example I and J. Compound 36 and Compound 30 were selected to compare their in vitro potencies with the potencies of Example K.

As shown in Table 6, Compound 40, Compound 3, Compound 1, Compound 2, Compound 36, and Compound 30 are almost identical in structure to the compounds of Example H to K, respectively, except that the compounds of the invention each have a substituted indazole moiety directly attached to pyrazole, as compared to the prior art compounds of Example H to K.

TABLE 6

Comparison of in vitro potency of the inventive compounds with the compounds covered in the prior art

| Example | Structure | Biochemical activity (Mean IC$_{50}$, nM) | |
|---|---|---|---|
| | | FLT3 | FLT3-D835Y |
| Example H (Ex-78 in US8853207B2) | | 8 | 15 |
| Compound 40 | | 0.5 | 0.4 |
| Compound 3 | | 0.2 | 0.3 |
| Example I (Ex-76 in US8853207B2) | | 12 | 31 |
| Example J [Formula (I) in US8853207B2) | | 138 | 89 |
| Compound 1 | | 1.5 | 0.5 |

TABLE 6-continued

Comparison of in vitro potency of the inventive compounds with the compounds covered in the prior art

| Example | Structure | Biochemical activity (Mean IC$_{50}$, nM) | |
| --- | --- | --- | --- |
| | | FLT3 | FLT3-D835Y |
| Compound 2 |  | 1.0 | 0.5 |
| Example K [Formula (I) in US8853207B2] | 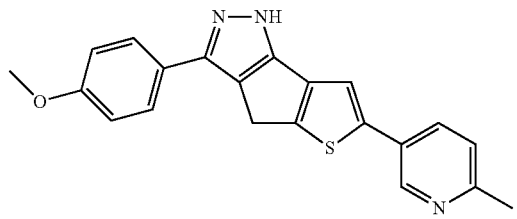 | 6 | 26 |
| Compound 36 | 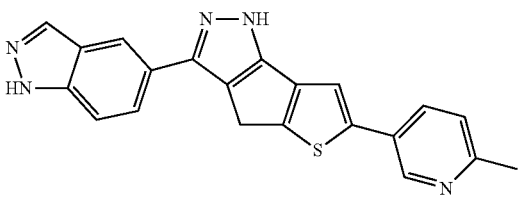 [SMILES: Cc1ccc(-c2cc3c(s2)Cc2c(-c4ccc5[nH]ncc5c4)n[nH]c2-3)cn1] | 0.5 | 0.4 |
| Compound 30 | 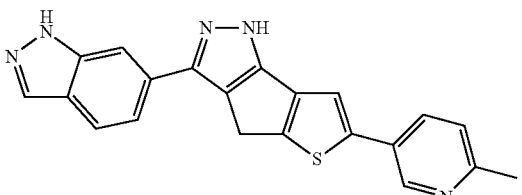 | 0.1 | 0.3 |

Unexpectedly, as compared to the prior art compounds of Example H to K, the compounds of the invention exhibited superior potencies in inhibiting FLT3 kinase and its mutant with approximately 10 folds or more potencies.

Example 6: Evaluation of the Cellular Potencies of Compounds of Formula (I) Against Phosphorylation of FLT3 and it Down Effector STAT5 in MV4-11 Leukemia Cell Line with Constitutive Activation of FLT3 Signal FLT3 is expressed in AML cells of most patients, and FLT3 is mutated in approximately 30% of AML cells. Mutations include internal tandem duplications (ITD), present on AML cells in approximately 25% of patients, and point mutations in the tyrosine kinase domain (TKD), present in approximately 5% of patients. Both ITD and TKD mutations are activating, causing ligand-independent, or constitutive, FLT3 receptor signaling, and thereby promoting cytokine-independent AML cell survival and proliferation (Blood 2002; 100:1532-42.). Both FLT3-ITD and FLT3 TKD mutations result in constitutive activation of FLT3 signaling, which involves FLT3 kinase and its downstream proliferative signaling pathways, including the Ras/MAPK kinase (MEK)/extracellular signal-regulated kinase (ERK) pathway and PI3K/Akt pathway. In addition, in contrast to the wild-type FLT3 signaling, FLT3-ITD potently activates the STAT5 pathway. STAT5 induces its target genes, such as cyclin D1, c-myc, and the anti-apoptotic gene p21, which are important for cell growth. These effects may indicate a role of FLT3-ITD in the aberrant cell growth of leukemia cells. FLT3-ITD constitutive activation of STAT5 may accelerate AML cell growth (J Hematol Oncol. 2011; 4: 13.).

The potent compounds of formula (I) in EXAMPLE 2 were evaluated, by western blotting assay, for their cellular potencies against phosphorylation of FLT3 and its downstream effector STAT5 in MV4-11 leukemia cell line with constitutive activation of FLT3 signaling. For western blotting experiments, MV4-11 cells were cultured in IMDM medium containing 0.1% FBS overnight. On the assay day, three million cells were treated with or without compounds for 3 hours in 15 mL tubes. Then, the whole cell lysates were harvested, following extraction by adding 2×SDS Sample Buffer and boiling on hot plate at 105° C. for 15 minutes. The resulting cell lysates were separated by SDS-PAGE electrophoresis and transferred to PVDF membrane. Protein expression was detected using immunoblot with corresponding primary antibody and secondary antibody following the standard procedures. Antibody against p-FLT3 (Tyr-591), anti-rabbit IgG HRP-linked secondary antibody, and antimouse IgG HRP-linked secondary antibody were purchased from Cell Signaling Technology. Antibody against p-STAT5 (Tyr-694) was purchased from BD biosciences. Antibody against actin was purchased from R&D system. Immunoblots were revealed by chemiluminescence (SuperSignal™ West Femto Maximum Sensitivity Substrate, Thermo) and detected by ChemiDoc™ MP Imaging System (Bio-Rad). Band intensities of western blot were also quantified by ChemiDoc™ MP Imaging System. Relative intensities of bandscorresponding to drug treatments at a single concentration (30 nM) were compared to the DMSO control group. The percentage (%) inhibition at each drug concentration was calculated using the formula:

Percentage(%)inhibition=(1−Relative intensity)×100.

The selected compounds of formula I exhibiting more than 50% inhibition against phosphorylation of FLT3 and its down-stream effector STAT5 at 30 nM treatment were listed in following Table 7.

TABLE 7

Inhibition of phosphorylation of FLT3 and it down effector STAT5 in FLT3-ITD positive MV4-11 leukemia cells

| | |
|---|---|
| Compound with >50% inhibition activity against phosphorylation of FLT3 and its down-stream effector STAT5 (at 30 nM treatment) | Compound 1, 2, 3, 6, 7, 8, 9, 10, 11, 12, 13, 15, 16, 17, 18, 19, 20, 21, 22, 23, 24, 25, 28, 29, 30, 31, 32, 33, 34, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 69, 71, 72, 74, 75, 78, 79, 80, 83, 84, 89, 92, 94, 95, 96, 97, 98, 99, 100, 101, 102, 103, 105. |

Some embodiments of the invention relate to methods for treating a protein kinase-related disease. A method in accordance with one embodiment of the invention comprises administering to a subject in need thereof an effective amount of a compound of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A compound of formula (I):

Formula (I)

or a stereoisomer, a tautomer, a pharmaceutically acceptable salt, a binder of a Proteolysis-Targeting Chimera (PROTAC) thereof, wherein X is selected from the group consisting of $CR^2$ and $NR^3$;
Y is selected from the group consisting of $CR^2$ and $NR^3$;
G is selected from the group consisting of optionally substituted aryl, optionally substituted heteroaryl, optionally substituted heterocyclyl, alkynyl, and a direct bond;
L is selected from the group consisting of —CH=, —CHR$^4$—, —(CH$_2$)$_q$—, —NR$^5$—, —O—, —O(CH$_2$)$_q$—, —C(O)—, —C(O)(CH$_2$)$_q$—, —SO$_2$—, and a direct bond, wherein each q is individually and independently an integer from 1 to 4;
Z is selected from the group consisting of hydrogen, deuterium, halogen, $C_1$-$C_4$ alkyl, $C_1$-$C_4$ alkylamine, $C_1$-$C_4$ dialkylamine, optionally substituted heterocyclyl, and heterocyclic spiro compound;
$R^1$ is selected from the group consisting of hydrogen, deuterium, halogen, hydroxyl, amino, cyano, trifluoromethyl, nitro, $C_1$-$C_6$ alkyl, $C_1$-$C_6$ alkoxy, $C_1$-$C_6$ alkylamino and $C_1$-$C_6$ dialkylamino;
$R^2$ is selected from the group consisting of hydrogen, deuterium, halogen, $C_1$-$C_6$ alkyl, $C_2$-$C_6$ alkenyl, $C_2$-$C_6$ alkynyl, $C_3$-$C_6$ cycloalkyl, $C_5$-$C_6$ cycloalkenyl, $C_1$-$C_6$ alkylamino, $C_1$-$C_6$ dialkylamino, $C_3$-$C_6$ cycloalkylamino, $C_1$-$C_6$ alkoxy, $C_3$-$C_6$ cycloalkoxy, aryl, a 3-to-6 membered heterocyclyl, and a 5-to-6 membered heteroaryl, wherein the alkylamino, dialkylamino, alkoxy, alkyl, alkenyl, alkynyl, cycloalkyl, cycloalkenyl, cycloalkylamino, cycloalkoxy, heterocyclyl, aryl and heteroaryl are optionally substituted with halogen, amino, hydroxyl, cyano, nitro, acyl, acyloxy, $C_1$-$C_4$ alkyl, hydroxyl $C_1$-$C_4$ alkyl, alkoxy $C_1$-$C_4$ alkyl, acyloxy $C_1$-$C_4$ alkyl, $C_1$-$C_4$ alkoxy, $C_1$-$C_4$ dialkylamino, $C_3$-$C_6$ cycloalkyl, a 3-to-6 membered heterocyclyl, aryl, and a 5-to-6 membered heteroaryl;
$R^3$ is selected from the group consisting of hydrogen, deuterium, $C_1$-$C_6$ alkyl, $C_1$-$C_6$ alkyl carbonyl, $C_2$-$C_6$ alkenyl carbonyl, $C_1$-$C_6$ alkoxy carbonyl, amino carbonyl, $C_1$-$C_6$ alkylamino carbonyl, and $C_1$-$C_6$ dialkylamino carbonyl;
$R^4$ is selected from the group consisting of deuterium and $C_1$-$C_6$ alkyl; and
$R^5$ is selected from the group consisting of hydrogen and $C_1$-$C_6$ alkyl.

2. The compound of claim 1, wherein the compound is of Formula (II),

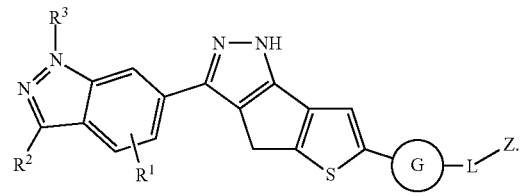

Formula (II)

3. The compound of claim 1, wherein the compound is of Formula (III),

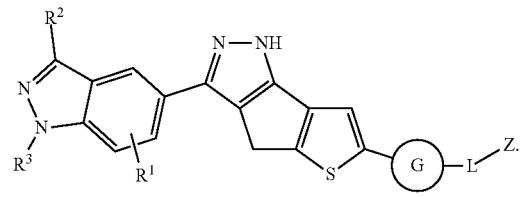

Formula (III)

4. The compound of claim 1, wherein the compound is of Formula (IV),

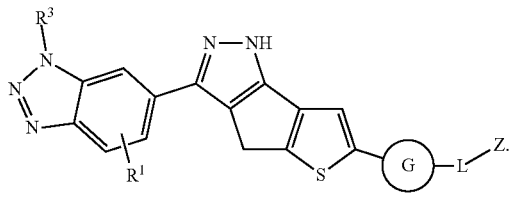

Formula (IV)

5. The compound of claim 1, wherein the compound is of Formula (V),

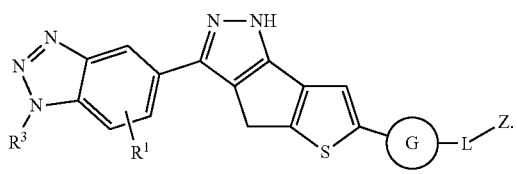

Formula (V)

6. The compound of claim 1, wherein ring G is an optionally substituted aryl, an optionally substituted heteroaryl, an optionally substituted heterocyclyl, or alkynyl.

7. The compound of claim 6, wherein ring G is selected from the group consisting of:

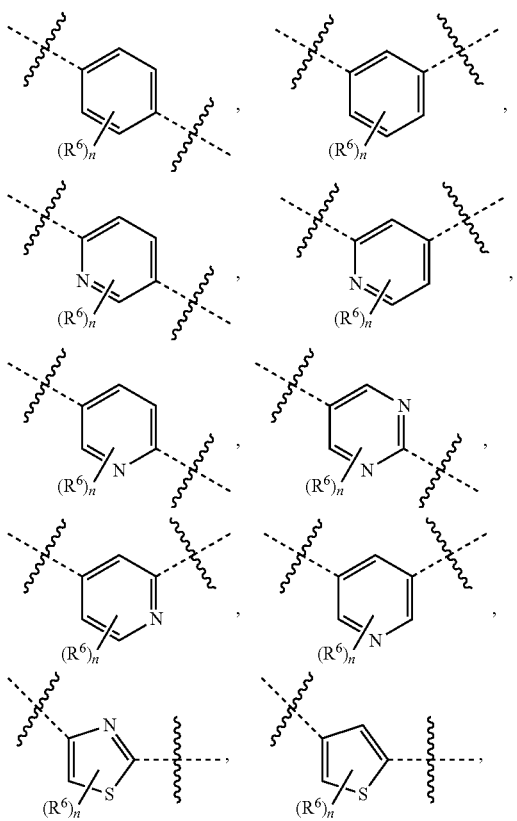

-continued

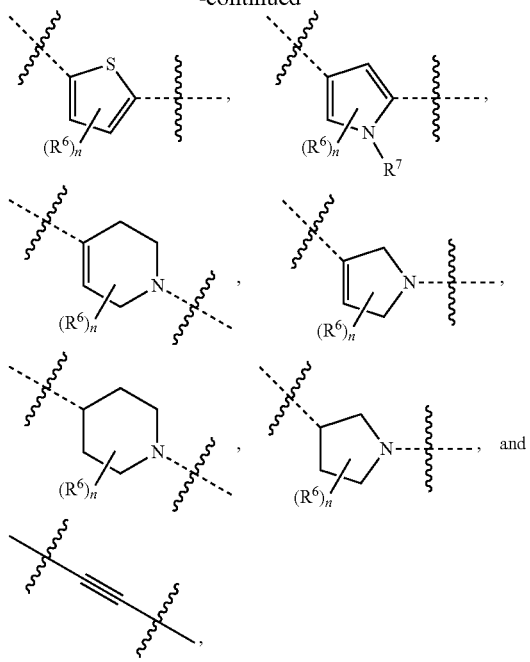

wherein $R^6$ is selected from the group consisting of hydrogen, deuterium, halogen, nitro, cyano, trifluoromethyl, trifluoromethoxy, $C_1$-$C_6$ alkyl, $C_1$-$C_6$ haloalkyl, $C_1$-$C_6$ alkylamino$C_1$-$C_6$ alkyl, $C_1$-$C_6$ dialkylamino$C_1$-$C_6$ alkyl, $C_1$-$C_6$ alkylamino, $C_1$-$C_6$ alkoxy$C_1$-$C_6$ alkyl, $C_1$-$C_6$ dialkylamino, $C_1$-$C_6$ alkoxy, carboxylic acid, $C_1$-$C_6$ alkoxycarbonyl, $C_1$-$C_6$ alkylaminocarbonyl, and $C_1$-$C_6$ dialkylaminocarbonyl;

each n is individually and independently an integer from 0 to 4; and $R^7$ is selected from the group consisting of hydrogen, $C_1$-$C_6$ alkyl, $C_1$-$C_6$ haloalkyl, and $C_1$-$C_6$-alkyl carbonyl.

8. The compound of claim 1, wherein Z is fluoride, chloride, bromide, dimethylamino, or an optionally substituted four-, five-, six-, or seven-membered heterocyclic or heterocyclic spiro compound.

9. The compound of claim 8, wherein Z is selected from the group consisting of:

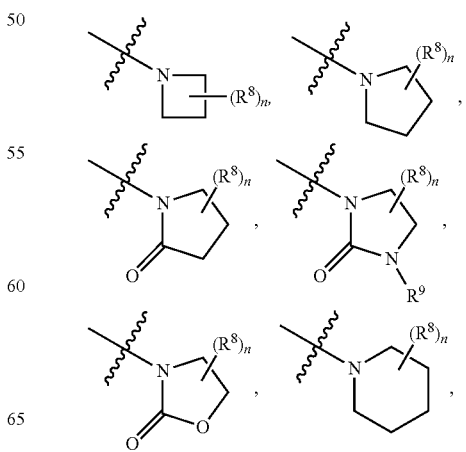

-continued

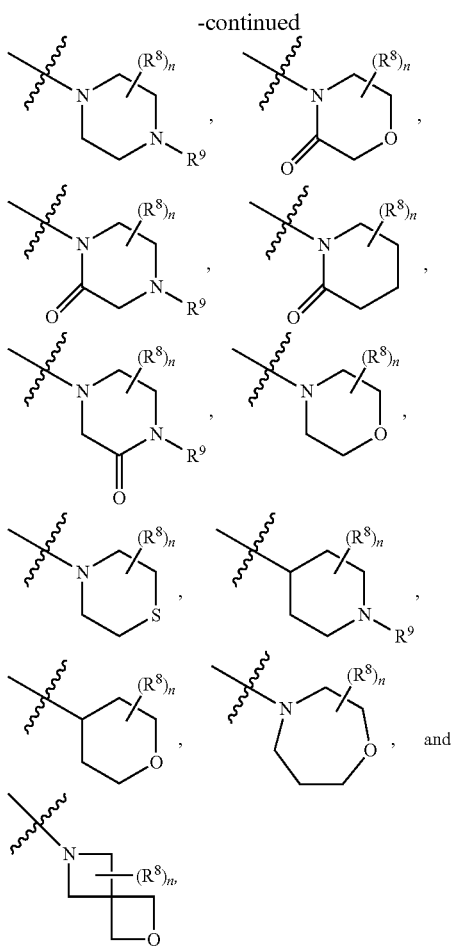

wherein
R⁸ is selected from the group consisting of hydrogen, deuterium, halogen, nitro, cyano, trifluoromethyl, trifluoromethoxy, 4-morpholinyl, $C_1$-$C_6$ alkyl, $C_1$-$C_6$ haloalkyl, $C_1$-$C_6$ alkylamino, $C_1$-$C_6$ dialkylamino, $C_1$-$C_6$ alkoxy, carboxylic acid, $C_1$-$C_6$ alkoxycarbonyl, $C_1$-$C_6$ alkylaminocarbonyl and $C_1$-$C_6$ dialkylaminocarbonyl;
each n is individually and independently an integer from 0 to 4; and
R⁹ is selected from the group consisting of hydrogen, deuterium, $C_1$-$C_6$ alkyl, $C_1$-$C_6$ haloalkyl, $C_1$-$C_6$ alkoxycarbonyl, $C_1$-$C_6$ alkylaminocarbonyl and $C_1$-$C_6$ dialkylaminocarbonyl.

10. The compound of claim 1, where the compound is:
3-(1H-indazol-5-yl)-6-(6-methoxypyridin-3-yl)-1,4-dihydrothieno[2',3':4,5]cyclopenta[1,2-c]pyrazole,
3-(1H-indazol-6-yl)-6-(6-methoxypyridin-3-yl)-1,4-dihydrothieno[2',3':4,5]cyclopenta[1,2-c]pyrazole,
5-(3-(1H-indazol-6-yl)-1,4-dihydrothieno[2',3':4,5]cyclopenta[1,2-c]pyrazol-6-yl)pyridin-2-amine,
6-(6-methoxypyridin-3-yl)-3-(1-methyl-1H-indazol-6-yl)-1,4-dihydrothieno [2',3':4,5]cyclopenta[1,2-c]pyrazole,
N,N-dimethyl-5-(3-(1-methyl-1H-indazol-6-yl)-1,4-dihydrothieno[2',3':4,5]cyclopenta[1,2-c]pyrazol-6-yl)pyridin-2-amine,
4-(4-(3-(1H-indazol-6-yl)-1,4-dihydrothieno[2',3':4,5]cyclopenta[1,2-c]pyrazol-6-yl)benzyl)morpholine,
(2S,6R)-4-(4-(3-(1H-indazol-6-yl)-1,4-dihydrothieno[2',3':4,5]cyclopenta[1,2-c]pyrazol-6-yl)benzyl)-2,6-dimethylmorpholine,
4-(4-(3-(1-methyl-1H-indazol-6-yl)-1,4-dihydrothieno[2',3':4,5]cyclopenta[1,2-c]pyrazol-6-yl)benzyl)morpholine,
(2S,6R)-2,6-dimethyl-4-((5-(3-(1-methyl-1H-indazol-6-yl)-1,4-dihydrothieno [2',3':4,5] cyclopenta[1,2-c]pyrazol-6-yl)pyridin-2-yl)methyl)morpholine,
4-((5-(3-(1-methyl-1H-indazol-6-yl)-1,4-dihydrothieno[2',3':4,5]cyclopenta[1,2-c]pyrazol-6-yl)pyridin-2-yl)methyl)morpholine,
3-(1-methyl-1H-indazol-6-yl)-6-(6-methylpyridin-3-yl)-1,4-dihydrothieno [2',3':4,5]cyclopenta[1,2-c]pyrazole,
(2S,6R)-2,6-dimethyl-4-(3-(3-(1-methyl-1H-indazol-6-yl)-1,4-dihydrothieno [2',3':4,5] cyclopenta[1,2-c]pyrazol-6-yl)benzyl)morpholine,
4-(3-(3-(1-methyl-1H-indazol-6-yl)-1,4-dihydrothieno[2',3':4,5]cyclopenta[1,2-c]pyrazol-6-yl) benzyl)morpholine,
3-(1-methyl-1H-indazol-6-yl)-6-(3-((4-methylpiperazin-1-yl)methyl)phenyl)-1,4-dihydrothieno [2',3':4,5]cyclopenta[1,2-c]pyrazole,
(4-(3-(1-methyl-1H-indazol-6-yl)-1,4-dihydrothieno[2',3':4,5]cyclopenta[1,2-c]pyrazol-6-yl) phenyl)(4-methylpiperazin-1-yl)methanone,
(2R,6S)-4-((5-(3-(1H-indazol-6-yl)-1,4-dihydrothieno[2',3':4,5]cyclopenta[1,2-c]pyrazol-6-yl) pyridin-2-yl)methyl)-2,6-dimethylmorpholine,
3-(1-methyl-1H-indazol-6-yl)-6-(2-methylpyridin-4-yl)-1,4-dihydrothieno [2',3':4,5]cyclopenta [1,2-c]pyrazole,
4-((5-(3-(1H-indazol-6-yl)-1,4-dihydrothieno[2',3':4,5] cyclopenta[1,2-c]pyrazol-6-yl)pyridin-2-yl)methyl)morpholine,
((2S,6R)-2,6-dimethylmorpholino)(4-(3-(1-methyl-1H-indazol-6-yl)-1,4-dihydrothieno[2',3':4,5] cyclopenta [1,2-c]pyrazol-6-yl)phenyl)methanone,
4-(1-(4-(3-(1-methyl-1H-indazol-6-yl)-1,4-dihydrothieno[2',3':4,5]cyclopenta[1,2-c]pyrazol-6-yl)phenyl)ethyl)morpholine,
(4-(3-(1-methyl-1H-indazol-6-yl)-1,4-dihydrothieno[2',3':4,5]cyclopenta[1,2-c]pyrazol-6-yl) phenyl)(morpholino)methanone,
4-(4-(3-(1-methyl-1H-indazol-6-yl)-1,4-dihydrothieno[2',3':4,5]cyclopenta[1,2-c]pyrazol-6-yl) phenethyl) morpholine,
(5-(3-(1-methyl-1H-indazol-6-yl)-1,4-dihydrothieno[2',3':4,5]cyclopenta[1,2-c]pyrazol-6-yl) pyridin-2-yl)(morpholino)methanone,
4-(2-methoxy-4-(3-(1-methyl-1H-indazol-6-yl)-1,4-dihydrothieno[2',3':4,5]cyclopenta[1,2-c] pyrazol-6-yl)benzyl)morpholine,
4-(2-fluoro-4-(3-(1-methyl-1H-indazol-6-yl)-1,4-dihydrothieno[2',3':4,5]cyclopenta[1,2-c] pyrazol-6-yl)benzyl)morpholine,
4-(2-methyl-4-(3-(1-methyl-1H-indazol-6-yl)-1,4-dihydrothieno[2',3':4,5]cyclopenta[1,2-c] pyrazol-6-yl)benzyl)morpholine,
4-(4-(3-(1-methyl-1H-indazol-6-yl)-1,4-dihydrothieno[2',3':4,5]cyclopenta[1,2-c]pyrazol-6-yl)-2-(trifluoromethyl)benzyl)morpholine,
4-(1-(4-(3-(1-methyl-1H-indazol-6-yl)-1,4-dihydrothieno[2',3':4,5]cyclopenta[1,2-c]pyrazol-6-yl)phenyl)propyl)morpholine,
4-(3-methoxy-4-(3-(1-methyl-1H-indazol-6-yl)-1,4-dihydrothieno[2',3':4,5]cyclopenta[1,2-c] pyrazol-6-yl)benzyl)morpholine,
3-(1H-indazol-6-yl)-6-(6-methylpyridin-3-yl)-1,4-dihydrothieno[2',3':4,5]cyclopenta[1,2-c] pyrazole, (5-(3-(1-methyl-1H-indazol-6-yl)-1,4-dihydrothieno[2',3':4,5]cyclopenta[1,2-c]pyrazol-6-yl) pyridin-3-yl)(morpholino)methanone, 4-(3-fluoro-4-(3-(1-methyl-1H-indazol-6-yl)-1,4-dihydrothieno[2',3':4,5]cyclopenta[1,2-c] pyrazol-6-yl)benzyl)morpholine, 3-(1-methyl-1H-indazol-6-yl)-6-(6-methylpyridin-3-yl)-1,4-dihydrothieno [2',3':4,5]cyclopenta [1,2-c]pyrazole, (4-(3-(1-methyl-1H-indazol-6-yl)-1,4-dihydrothieno[2',3':4,5]cyclopenta[1,2-c]pyrazol-6-yl) phenyl)(piperidin-1-yl)methanone, 4-(4-(3-(1-isobutyl-1H-indazol-6-yl)-1,4-dihydrothieno[2',3':4,5]cyclopenta[1,2-c]pyrazol-6-yl) benzyl)morpholine, 3-(1H-indazol-5-yl)-6-(6-methylpyridin-3-yl)-1,4-dihydrothieno[2',3':4,5]cyclopenta[1,2-c]pyrazole, (3-(3-(1-methyl-1H-indazol-6-yl)-1,4-dihydrothieno[2',3':4,5]cyclopenta[1,2-c]pyrazol-6-yl) phenyl)(morpholino)methanone, (4-(3-(1-methyl-1H-indazol-6-yl)-1,4-dihydrothieno[2',3':4,5]cyclopenta[1,2-c]pyrazol-6-yl) phenyl)(pyrrolidin-1-yl)methanone, 3-(1-methyl-1H-indazol-6-yl)-6-(4-(thiomorpholinomethyl)phenyl)-1,4-dihydrothieno[2',3':4,5] cyclopenta[1,2-c]pyrazole, 5-(3-(1H-indazol-5-yl)-1,4-dihydrothieno[2',3':4,5]cyclopenta[1,2-c]pyrazol-6-yl)pyridin-2-amine, (5-(3-(1-methyl-1H-indazol-6-yl)-1,4-dihydrothieno[2',3':4,5]cyclopenta[1,2-c]pyrazol-6-yl)pyrimidin-2-yl)(morpholino)methanone, 4-(4-(3-(1-isopropyl-1H-indazol-6-yl)-1,4-dihydrothieno[2',3':4,5]cyclopenta[1,2-c]pyrazol-6-yl)benzyl)morpholine, (2-methoxy-4-(3-(1-methyl-1H-indazol-6-yl)-1,4-dihydrothieno[2',3':4,5]cyclopenta[1,2-c]pyrazol-6-yl)phenyl)(morpholino)methanone, (2-fluoro-4-(3-(1-methyl-1H-indazol-6-yl)-1,4-dihydrothieno[2',3':4,5]cyclopenta[1,2-c]pyrazol-6-yl)phenyl)(morpholino)methanone, 5-(3-(1-methyl-1H-indazol-6-yl)-1,4-dihydrothieno[2',3':4,5]cyclopenta[1,2-c]pyrazol-6-yl)pyrimidin-2-amine, methyl-4-(3-(1-methyl-1H-indazol-6-yl)-1,4-dihydrothieno[2',3':4,5]cyclopenta [1,2-c]pyrazol-6-yl)-1H-pyrrol-2-yl)(morpholino)methanone, 4-((4-(3-(1-methyl-1H-indazol-6-yl)-1,4-dihydrothieno[2',3':4,5]cyclopenta[1,2-c]pyrazol-6-yl)phenyl)sulfonyl)morpholine, (4-(3-(1-methyl-1H-indazol-6-yl)-1,4-dihydrothieno[2',3':4,5]cyclopenta[1,2-c]pyrazol-6-yl)thiophen-2-yl)(morpholino)methanone, N,N-dimethyl-4-(3-(1-methyl-1H-indazol-6-yl)-1,4-dihydrothieno[2',3':4,5]cyclopenta[1,2-c]pyrazol-6-yl)benzamide, N,N-dimethyl-4-(3-(1-methyl-1H-indazol-6-yl)-1,4-dihydrothieno[2',3':4,5]cyclopenta[1,2-c]pyrazol-6-yl)benzenesulfonamide, 4-((5-(3-(1-methyl-1H-indazol-6-yl)-1,4-dihydrothieno[2',3':4,5]cyclopenta[1,2-c]pyrazol-6-yl)thiophen-2-yl)methyl)morpholine, 4-((4-(3-(1-methyl-1H-indazol-6-yl)-1,4-dihydrothieno[2',3':4,5]cyclopenta[1,2-c]pyrazol-6-yl)thiophen-2-yl)methyl)morpholine, 4-(2,6-difluoro-4-(3-(1-methyl-1H-indazol-6-yl)-1,4-dihydrothieno[2',3':4,5]cyclopenta[1,2-c]pyrazol-6-yl)benzyl)morpholine, (2S,6R)-2,6-dimethyl-4-(4-(3-(1-methyl-1H-indazol-6-yl)-1,4-dihydrothieno [2',3':4,5]cyclopenta[1,2-c]pyrazol-6-yl)benzyl)morpholine, 4-((6-(3-(1-methyl-1H-indazol-6-yl)-1,4-dihydrothieno[2',3':4,5]cyclopenta[1,2-c]pyrazol-6-yl)pyridin-3-yl)methyl)morpholine, (2-(3-(1-methyl-1H-indazol-6-yl)-1,4-dihydrothieno[2',3':4,5]cyclopenta[1,2-c]pyrazol-6-yl)pyridin-4-yl)(morpholino)methanone, (4-(3-(1-methyl-1H-indazol-6-yl)-1,4-dihydrothieno[2',3':4,5]cyclopenta[1,2-c]pyrazol-6-yl)-3,6-dihydropyridin-1(2H)-yl)(morpholino)methanone, tert-butyl-4-(3-(1-methyl-1H-indazol-6-yl)-1,4-dihydrothieno[2',3':4,5]cyclopenta [1,2-c]pyrazol-6-yl)piperidine-1-carboxylate, 4-(4-(3-(1-methyl-1H-indazol-6-yl)-1,4-dihydrothieno[2',3':4,5]cyclopenta[1,2-c]pyrazol-6-yl)benzyl)morpholin-3-one, (4-(3-(1-methyl-1H-indazol-6-yl)-1,4-dihydrothieno[2',3':4,5]cyclopenta[1,2-c]pyrazol-6-yl)thiazol-2-yl)(morpholino)methanone, 1-(4-(3-(1-methyl-1H-indazol-6-yl)-1,4-dihydrothieno[2',3':4,5]cyclopenta[1,2-c]pyrazol-6-yl)benzyl)piperidin-2-one, 3-(4-(3-(1-methyl-1H-indazol-6-yl)-1,4-dihydrothieno[2',3':4,5]cyclopenta[1,2-c]pyrazol-6-yl)benzyl)oxazolidin-2-one, 4-(4-(3-(1-methyl-1H-indazol-6-yl)-1,4-dihydrothieno[2',3':4,5]cyclopenta[1,2-c]pyrazol-6-yl)benzyl)piperazin-2-one, 1-(4-(3-(1-methyl-1H-indazol-6-yl)-1,4-dihydrothieno[2',3':4,5]cyclopenta[1,2-c]pyrazol-6-yl)benzyl)pyrrolidin-2-one, 1,3-dimethyl-4-(4-(3-(1-methyl-1H-indazol-6-yl)-1,4-dihydrothieno[2',3':4,5]cyclopenta[1,2-c]pyrazol-6-yl)benzyl)piperazin-2-one, 4-(4-(3-(1-methyl-1H-indazol-6-yl)-1,4-dihydrothieno[2',3':4,5]cyclopenta[1,2-c]pyrazol-6-yl)phenethyl)morpholin-3-one, 6-(4-(((3,3-difluoropyrrolidin-1-yl)methyl)phenyl)-3-(1-methyl-1H-indazol-6-yl)-1,4-dihydrothieno[2',3':4,5]cyclopenta[1,2-c]pyrazole, 4-(4-(3-(3-bromo-1H-indazol-6-yl)-1,4-dihydrothieno[2',3':4,5]cyclopenta[1,2-c]pyrazol-6-yl)benzyl)morpholine, 4-(2-(4-(3-(1-methyl-1H-indazol-6-yl)-1,4-dihydrothieno[2',3':4,5]cyclopenta[1,2-c]pyrazol-6-yl)phenoxy)ethyl)morpholine, 4-(2-(3-(3-(1-methyl-1H-indazol-6-yl)-1,4-dihydrothieno[2',3':4,5]cyclopenta[1,2-c]pyrazol-6-yl)phenoxy)ethyl)morpholine, 4-(3-(3-(1-methyl-1H-indazol-6-yl)-1,4-dihydrothieno[2',3':4,5]cyclopenta[1,2-c]pyrazol-6-yl)prop-2-yn-1-yl)morpholine, N-(4-(3-(1-methyl-1H-indazol-6-yl)-1,4-dihydrothieno[2',3':4,5]cyclopenta[1,2-c]pyrazol-6-yl)phenyl)tetrahydro-2H-pyran-4-amine, N-methyl-N-(4-(3-(1-methyl-1H-indazol-6-yl)-1,4-dihydrothieno[2',3':4,5]cyclopenta[1,2-c]pyrazol-6-yl)phenyl)tetrahydro-2H-pyran-4-amine, (R)-3-methyl-4-(4-(3-(1-methyl-1H-indazol-6-yl)-1,4-dihydrothieno[2',3':4,5]cyclopenta[1,2-c]pyrazol-6-yl)benzyl)morpholine, (S)-3-methyl-4-(4-(3-(1-methyl-1H-indazol-6-yl)-1,4-dihydrothieno[2',3':4,5]cyclopenta[1,2-c]pyrazol-6-yl)benzyl)morpholine, 3-(1-methyl-1H-indazol-6-yl)-6-(4-((tetrahydro-4H-pyran-4-ylidene)methyl) phenyl)-1,4-dihydrothieno[2',3':4,5]cyclopenta[1,2-c]pyrazole, 3-(1-methyl-1H-indazol-6-yl)-6-(4-((tetrahydro-2H-pyran-4-yl)methyl)phenyl)-1,4-dihydrothieno[2',3':4,5]cyclopenta[1,2-c]pyrazole, 4-(3-(1-methyl-1H-indazol-6-yl)-1,4-dihydrothieno[2',3':4,5]cyclopenta[1,2-c]pyrazol-6-yl) morpholine, 4-(3-(1-methyl-1H-indazol-6-yl)-1,4-dihydrothieno[2',3':4,5]cyclopenta[1,2-c]pyrazol-6-yl) morpholin-3-one, 4-(1-(4-(3-(1-methyl-1H-indazol-6-yl)-1,4-dihydrothieno[2',3':4,5]cyclopenta[1,2-c]pyrazol-6-yl)benzyl)piperidin-4-yl)morpholine, 4-(4-(3-(3-methyl-1H-indazol-6-yl)-1,4-dihydrothieno[2',3':4,5]cyclopenta[1,2-c]pyrazol-6-yl)benzyl)morpholine, 4-(5-(3-(1-methyl-1H-indazol-6-yl)-1,4-dihydrothieno[2',3':4,5]cyclopenta[1,2-c]pyrazol-6-yl)pyridin-2-yl)morpholine, 3-(1H-indazol-6-yl)-6-(4-((4-methylpiperazin-1-yl)methyl)phenyl)-1,4-dihydrothieno[2',3':4,5] cyclopenta[1,2-c]pyrazole, 3-(1-methyl-1H-indazol-6-yl)-6-(4-((4-methylpiperazin-1-yl)methyl)phenyl)-1,4-dihydrothieno [2',3':4,5]cyclopenta[1,2-c]pyrazole, 3-(1-methyl-1H-indazol-6-yl)-6-(6-(4-methylpiperazin-1-yl)pyridin-3-yl)-1,4-dihydrothieno [2',3':4,5]cyclopenta[1,2-c]pyrazole, 6-(2-chloropyridin-4-yl)-3-(1-methyl-1H-indazol-6-yl)-1,4-dihydrothieno [2',3':4,5]cyclopenta [1,2-c]pyrazole, 3-(1-methyl-1H-indazol-6-yl)-6-(2-(4-methylpiperazin-1-yl)pyridin-4-yl)-1,4-dihydrothieno [2',3':4,5]cyclopenta[1,2-c]pyrazole, 4-(2,3-difluoro-4-(3-(1-methyl-1H-indazol-6-yl)-1,4-dihydrothieno[2',3':4,5]cyclopenta[1,2-c]pyrazol-6-yl)benzyl)morpholine, 4-(4-(3-(1-methyl-1H-benzo[d][1,2,3]triazol-6-yl)-1,4-dihydrothieno[2',3':4,5]cyclopenta[1,2-c]pyrazol-6-yl)benzyl)morpholine, 4-(4-(3-(1-methyl-1H-indazol-6-yl)-1,4-dihydrothieno[2',3':4,5]cyclopenta[1,2-c]pyrazol-6-yl)-3-(trifluoromethoxy)benzyl)morpholine, 4-(3-methyl-4-(3-(1-methyl-1H-indazol-6-yl)-1,4-dihydrothieno[2',3':4,5]cyclopenta[1,2-c]pyrazol-6-yl)benzyl)morpholine, 5-(3-(1-methyl-1H-indazol-6-yl)-1,4-dihydrothieno[2',3':4,5]cyclopenta[1,2-c]pyrazol-6-yl)pyridin-2-amine, N,N-dimethyl-1-(5-(3-(1-methyl-1H-indazol-6-yl)-1,4-dihydrothieno[2',3':4,5]cyclopenta[1,2-c]pyrazol-6-yl)pyridin-2-yl)methanamine, N,N-dimethyl-1-(4-(3-(1-methyl-1H-indazol-6-yl)-1,4-dihydrothieno[2',3':4,5]cyclopenta[1,2-c]pyrazol-6-yl)phenyl)methanamine, 4-((6-(3-(1-methyl-1H-indazol-6-yl)-1,4-dihydrothieno[2',3':4,5]cyclopenta[1,2-c]pyrazol-6-yl)pyridin-3-yl)methyl)morpholine, 3-(1-methyl-1H-indazol-6-yl)-6-(piperidin-4-yl)-1,4-dihydrothieno[2',3':4,5]cyclopenta[1,2-c]pyrazole, 4-(4-(3-(1-methyl-1H-indazol-6-yl)-1,4-dihydrothieno[2',3':4,5]cyclopenta[1,2-c]pyrazol-6-yl)benzyl)-1,4-oxazepane, 1-(4-(3-(1-methyl-1H-indazol-6-yl)-1,4-dihydrothieno[2',3':4,5]cyclopenta[1,2-c]pyrazol-6-yl)piperidin-1-yl)-2-morpholinoethan-1-one, 3-(1-methyl-1H-indazol-6-yl)-6-(4-(pyrrolidin-1-ylmethyl)phenyl)-1,4-dihydrothieno[2',3':4,5]cyclopenta[1,2-c]pyrazole, 3-(1-methyl-1H-indazol-6-yl)-6-(4-(piperidin-1-ylmethyl)phenyl)-1,4-dihydrothieno[2',3':4,5] cyclopenta[1,2-c]pyrazole, 1-(4-(3-(1-methyl-1H-indazol-6-yl)-1,4-dihydrothieno[2',3':4,5]cyclopenta[1,2-c]pyrazol-6-yl)benzyl)piperazin-2-one, 6-(4-(3-(1-methyl-1H-indazol-6-yl)-1,4-dihydrothieno[2',3':4,5]cyclopenta[1,2-c]pyrazol-6-yl)benzyl)-2-oxa-6-azaspiro[3.3]heptane, 6-(4-(azetidin-1-ylmethyl)phenyl)-3-(1-methyl-1H-indazol-6-yl)-1,4-dihydrothieno[2',3':4,5] cyclopenta[1,2-c]pyrazole, 6-(4-((3,3-difluoroazetidin-1-yl)methyl)phenyl)-3-(1-methyl-1H-indazol-6-yl)-1,4-dihydrothieno [2',3':4,5] cyclopenta[1,2-c]pyrazole, or 6-(4-((3-methoxyazetidin-1-yl)methyl)phenyl)-3-(1-methyl-1H-indazol-6-yl)-1,4-dihydrothieno [2',3':4,5] cyclopenta[1,2-c]pyrazole.

11. A pharmaceutical composition, comprising the compound according to claim 1, a stereoisomer thereof, or a pharmaceutically acceptable salt thereof, and a pharmaceutically acceptable diluent or carrier, or a protein targeting module.

12. A method for treating a disease or disorder mediated by FLT3, PDGFR, c-KIT, and/or CSF-1R kinases, or mediated by a mutant kinase of FLT3, PDGFR, c-KIT, and/or CSF-1R kinases, comprising: administering to a subject in need thereof a therapeutically effective amount of the pharmaceutical composition of claim 11.

13. The method according to claim 12, wherein the disease or disorder is a cancer.

14. The method according to claim 13, wherein the cancer is selected from the group consisting of multiple myeloma, acute myeloid leukemia (AML), chronic myeloid leukemia (CML), prostate cancer, breast cancer, ovarian cancer, melanoma, glioblastoma multiforme, giant cell tumor of bone, non-small-cell lung cancers, giant cell tumor of the tendon sheath, metastasis of tumors to other tissues, myelofibrosis, pigmented villonodular synovitis, or gastrointestinal stromal tumor.

* * * * *